US007631001B2

(12) United States Patent
Wakeam et al.

(10) Patent No.: US 7,631,001 B2
(45) Date of Patent: Dec. 8, 2009

(54) ELECTRONIC INK PROCESSING

(75) Inventors: Jamie Wakeam, Redmond, WA (US);
Richard Duncan, Kirkland, WA (US);
Herry Sutanto, Kirkland, WA (US);
Sashi Raghupathy, Redmond, CA (US);
Timothy H. Kannapel, Bellevue, WA (US); Zoltan Szilagyi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 64 days.

(21) Appl. No.: 11/423,020

(22) Filed: Jun. 8, 2006

(65) Prior Publication Data

US 2006/0218171 A1  Sep. 28, 2006

Related U.S. Application Data

(62) Division of application No. 10/646,472, filed on Aug. 21, 2003.

(51) Int. Cl.
*G06F 17/30* (2006.01)
*G06F 17/00* (2006.01)
*G06F 7/00* (2006.01)

(52) U.S. Cl. .............. 707/101; 707/1; 707/8; 707/9; 707/201; 707/202; 707/203

(58) Field of Classification Search .......... 707/1, 707/101, 200, 9, 8, 201–203
See application file for complete search history.

(56) References Cited

U.S. PATENT DOCUMENTS

| 5,287,499 | A | | 2/1994 | Nemes |
| 5,392,390 | A | | 2/1995 | Crozier |
| 5,394,484 | A | | 2/1995 | Casey et al. |
| 5,455,901 | A | | 10/1995 | Friend et al. |
| 5,546,538 | A | | 8/1996 | Cobbley et al. |
| 5,559,897 | A | | 9/1996 | Brown et al. |
| 5,588,147 | A | * | 12/1996 | Neeman et al. ............... 707/1 |
| 5,600,834 | A | | 2/1997 | Howard |
| 5,710,916 | A | * | 1/1998 | Barbara et al. ............... 707/9 |
| 5,806,074 | A | | 9/1998 | Souder |
| 5,911,013 | A | | 6/1999 | Taniishi |
| 6,240,414 | B1 | * | 5/2001 | Beizer et al. .................. 707/8 |

(Continued)

OTHER PUBLICATIONS

"Robust Annotation Positioning in Digital Documents", by: Gupta, Brush, Bargeron, and Cadiz, Published Sep. 22, 2000, ftp://ftp.research.microsoft.com/pub/tr/tr-2000-95.pdf.*

(Continued)

*Primary Examiner*—Apu M Mofiz
*Assistant Examiner*—Chelcie Daye
(74) *Attorney, Agent, or Firm*—Workman Nydegger

(57) ABSTRACT

A method of reconciling a first data structure with a second data structure that is a subsequently modified version of the first data structure. Initially, each node in the first data structure for which a change has been made to a corresponding node in the second data structure is accessed. For each accessed node, a determination is made as to whether the change made to the corresponding node in the second data structure creates a collision with the first data structure. If the change made to the corresponding node in the second data structure does not create a collision with the first data structure, then the change is made to the accessed node in the first data structure.

2 Claims, 34 Drawing Sheets

U.S. PATENT DOCUMENTS

| | | | |
|---|---|---|---|
| 6,292,857 | B1 | 9/2001 | Sidoroff et al. |
| 6,377,259 | B1 | 4/2002 | Tenev et al. |
| 6,442,555 | B1 | 8/2002 | Shmueli et al. |
| 6,535,897 | B1 | 3/2003 | Altman et al. |
| 6,603,881 | B2 | 8/2003 | Perrone et al. |
| 7,016,921 | B1 | 3/2006 | Berger |
| 7,085,779 | B2 * | 8/2006 | Holtz et al. .................. 707/200 |
| 2001/0012401 | A1 | 8/2001 | Nagy |
| 2002/0085002 | A1 | 7/2002 | Lamping et al. |
| 2002/0133507 | A1 * | 9/2002 | Holenstein et al. .......... 707/200 |
| 2002/0191452 | A1 | 12/2002 | Fujihara |
| 2003/0028851 | A1 | 2/2003 | Leung et al. |
| 2006/0224610 | A1 | 10/2006 | Wakeam |

OTHER PUBLICATIONS

H. Kitakami et al., "A Constraint Solver for Reconciling Heterogeneous Trees," IC•AI '00 International Conference, 2000, pp. 1419-1425.

M. van Veller et al., "Methods in Vicariance Biogeography: Assessment of the Implementations of Assumptions 0, 1, and 2," Cladistics 16, 2000, pp. 319-345.

V. V'yugin et al., "Tree Reconciliation: Reconstruction of Species Phylogeny by Phylogenetic Gene Trees," Molecular Biology, vol. 36, No. 5, 2002, pp. 650-658.

H. Prodinger, "A q-Analog of the Path Length of Binary Search Trees," Oct. 14, 1999, pp. 1-9.

R. Page, "Extracting Species Trees From Complex Gene Trees: Reconciled Trees and Vertebrate Phylogeny," Molecular Phylogenetics and Evolution, vol. 14, No. 1, 2000, pp. 89-106.

M. van Veller et al., "A posteriori and a priori methodologies for testing hypotheses of causal processes in vicariance biogeography," Willi Hennig Society, 2001, pp. 26.

A. Martin, "Choosing among Alternative Trees of Multigene Families," Molecular Phylogenetics and Evolution, vol. 16, No. 3, 2000, pp. 430-439.

M.T. Hallett et al., "Efficient Algorithms for Lateral Gene Transfer Problems," RECOMB, 2001, pp. 149-156.

R. Neininger, "On binary search tree recursions with monomials as toll functions," Journal of Computational and Applied Mathematics, 2002, pp. 185-196.

M. Hofri et al., "Efficient Reorganization of Binary Search Trees," Proceedings of the 2nd Italian Conference on Algorithms and Complexity, 1994, pp. 1-25.

M. Hallett et al., "New Algorithms for the Duplication-Loss Model," RECOMB, 2000, pp. 138-146.

B. Ma et al., "From Gene Trees to Species Trees," Second Annual International Conference on Computational Molecular Biology, 1998, pp. 1-29.

Hajime Kitakami et al., "Constraint Satisfaction for Reconciling Heterogeneous Tree Databases," DEXA 2000, LNCS 1873, pp. 624-633.

Miklos Csuros, "Fast recovery of evolutionary trees with thousands of nodes," Department of Computer Science, Yale University, 2002, 36 pages.

Ramachandran et al., "An Architecture for Ink Annotations on Web Documents," Aug. 2003, vol. 1, pp. 256-260.

Gupta, et al., "Robust Annotation Positioning in Digital Documents," Sep. 22, 2000, ftp://ftp.research.microsoft.com/pub/tr/tr-2000-95.pdf.

International Search Report, PCT/US03/26172, mailed Dec. 22, 2003.

Wilcox L et al Association for Computing Machinery: "Dynomite: a dynamically organized ink and audio notebook" CHI 97. Human Factors in Computing Systems. Atlanta, Mar. 22-27, 1997, Conference on Human Factors in Computing Systems, New York, ACM, US, Mar. 22, 1997, pp. 186-193.

Brad A Myers: "Using Handhelds Andpcs Together" Internet Citation, [Online] Nov. 2001, XP002351044 Retrieved from the Internet: URL:http://www.cs.cmu.edu/afs/cs.cmu.edu/project/pebbles/www/papers/pebblescacm.pdf> [retrieved on Oct. 26, 2005].

EP Search Report dtd Sep. 19, 2007, EP Appln. 03814403.

International Search Report, PCT/US03/26143, mailed Jun. 8, 2004.

International Search Report, PCT/US03/26171, mailed Feb. 27, 2004.

International Search Report, PCT/US03/26170, mailed Dec. 18, 2003.

Office Action dated Mar. 10, 2006 cited in U.S. Appl. No. 10/646,472.

Office Action dated Aug. 23, 2008 cited in U.S. Appl. No. 10/646,472.

Office Action dated Feb. 1, 2007 cited in U.S. Appl. No. 10/646,472.

Office Action dated Jul. 17, 2007 cited in U.S. Appl. No. 10/646,472.

Office Action dated Dec. 26, 2007 cited in U.S. Appl. No. 10/646,472.

Notice of Allowance dated Sep. 12, 2008 cited in U.S. Appl. No. 10/646,472.

Office Action dated Apr. 17, 2008 cited in U.S. Appl. No. 11/423,030.

* cited by examiner

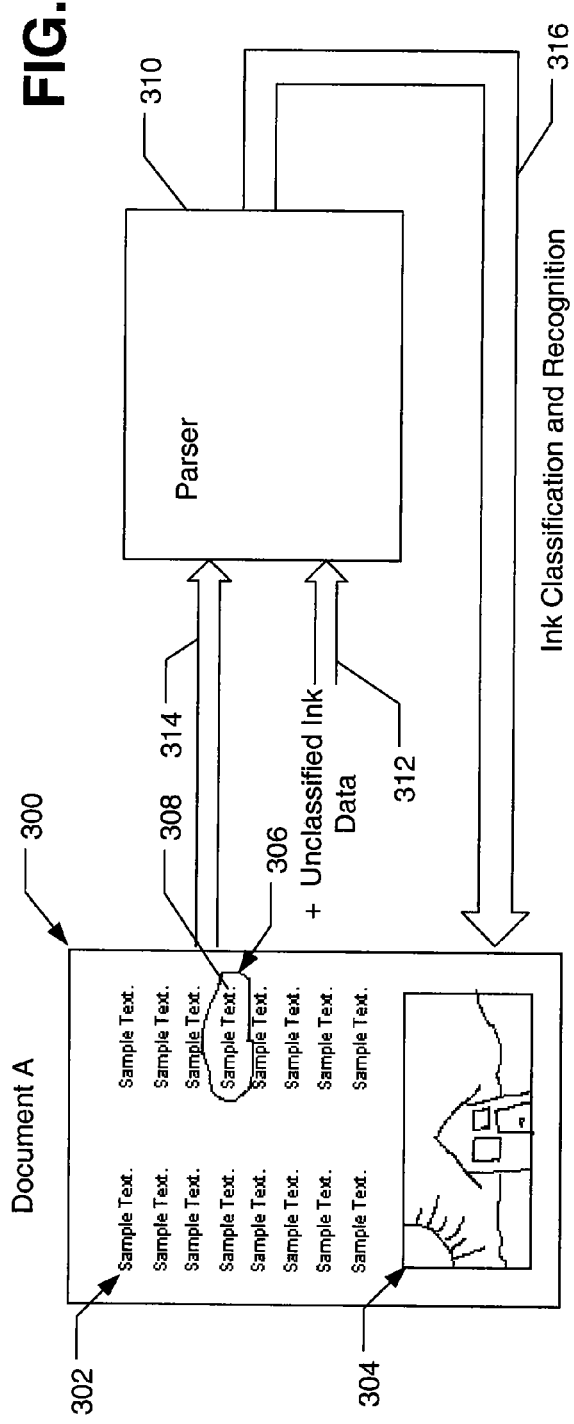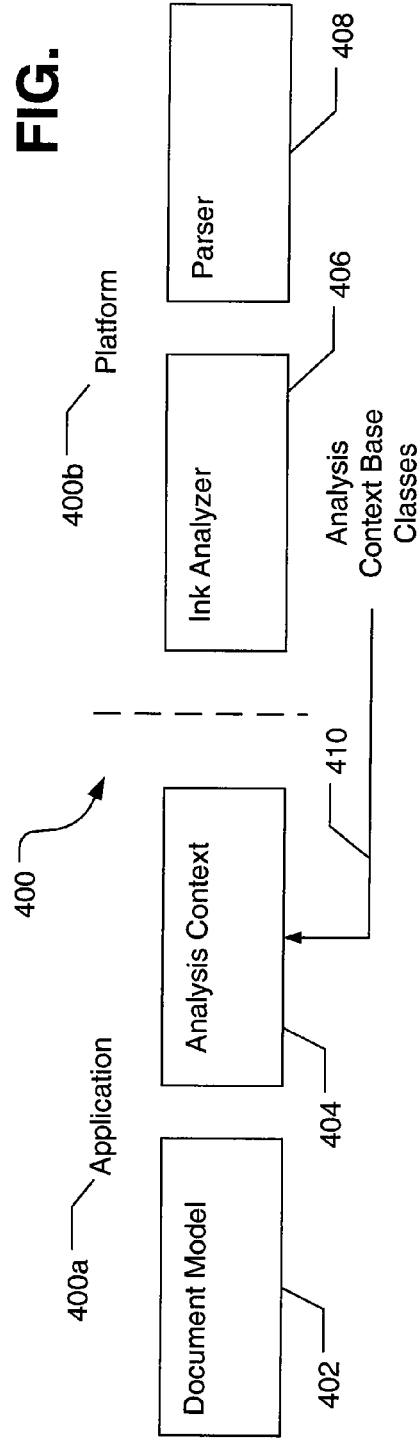

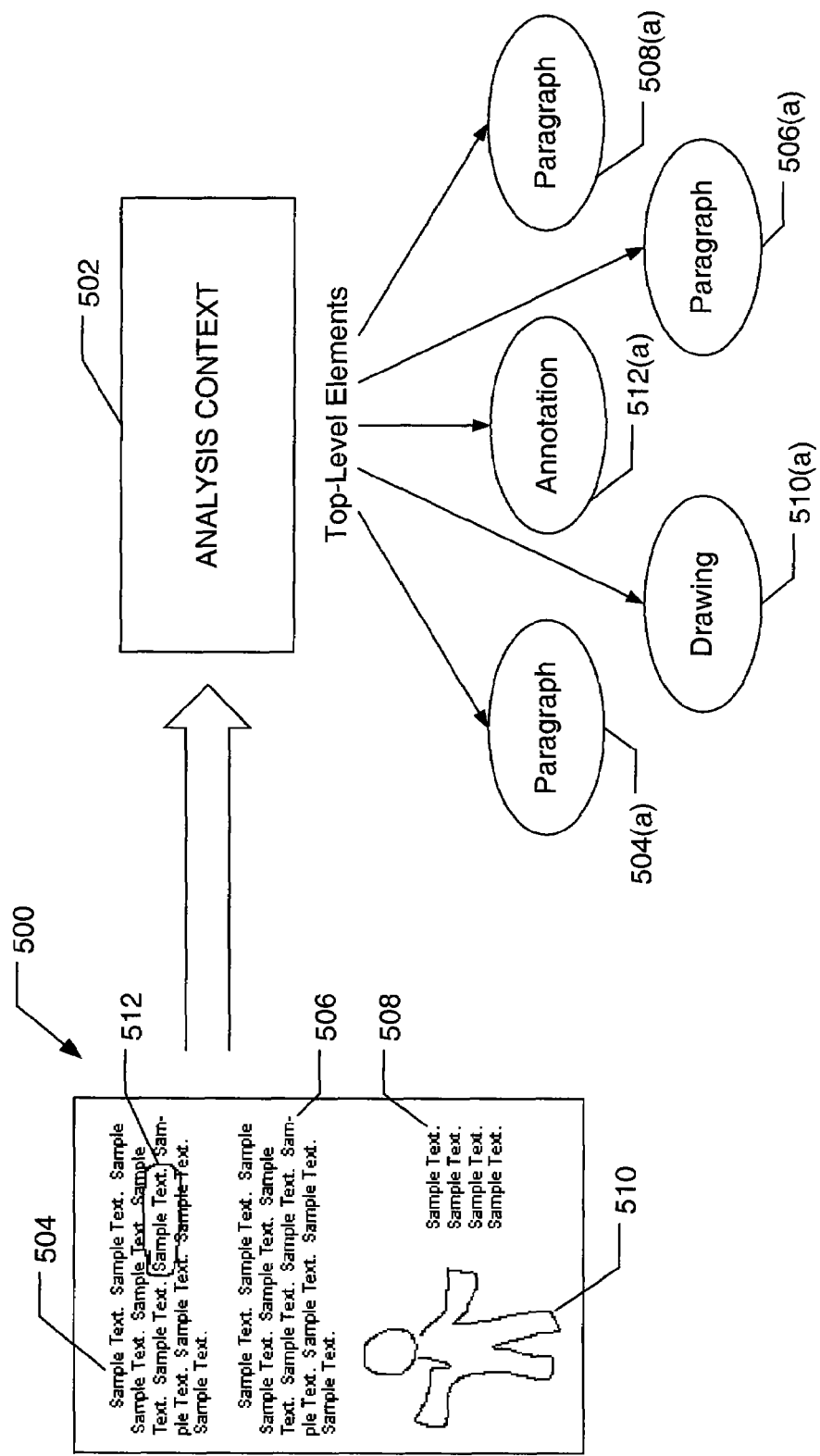

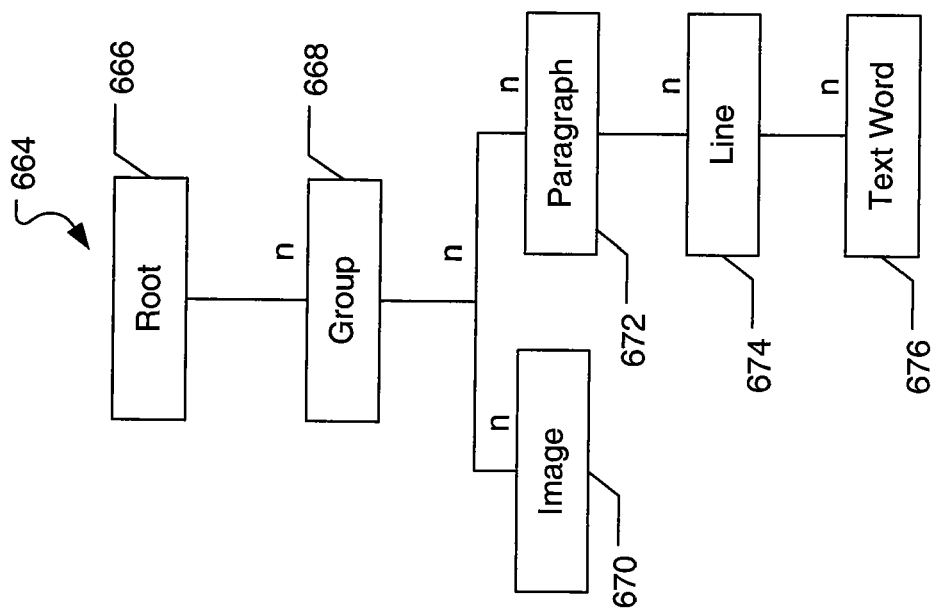
FIG. 6G
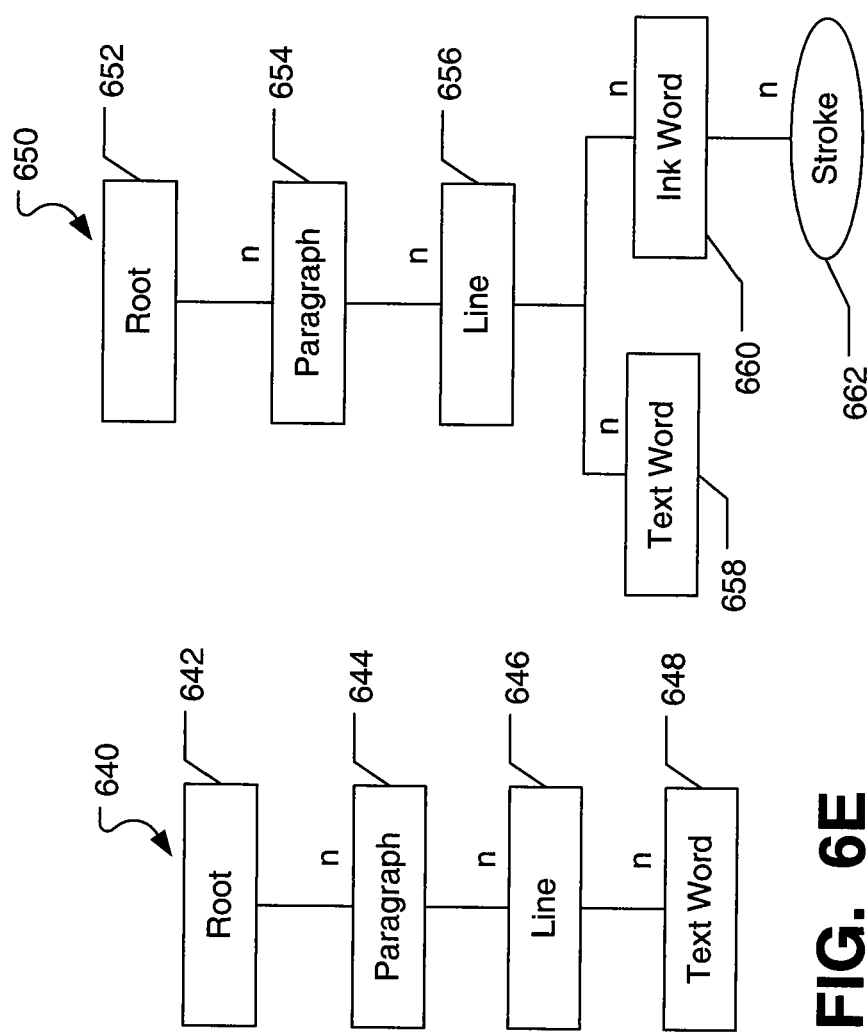
FIG. 6F
FIG. 6E

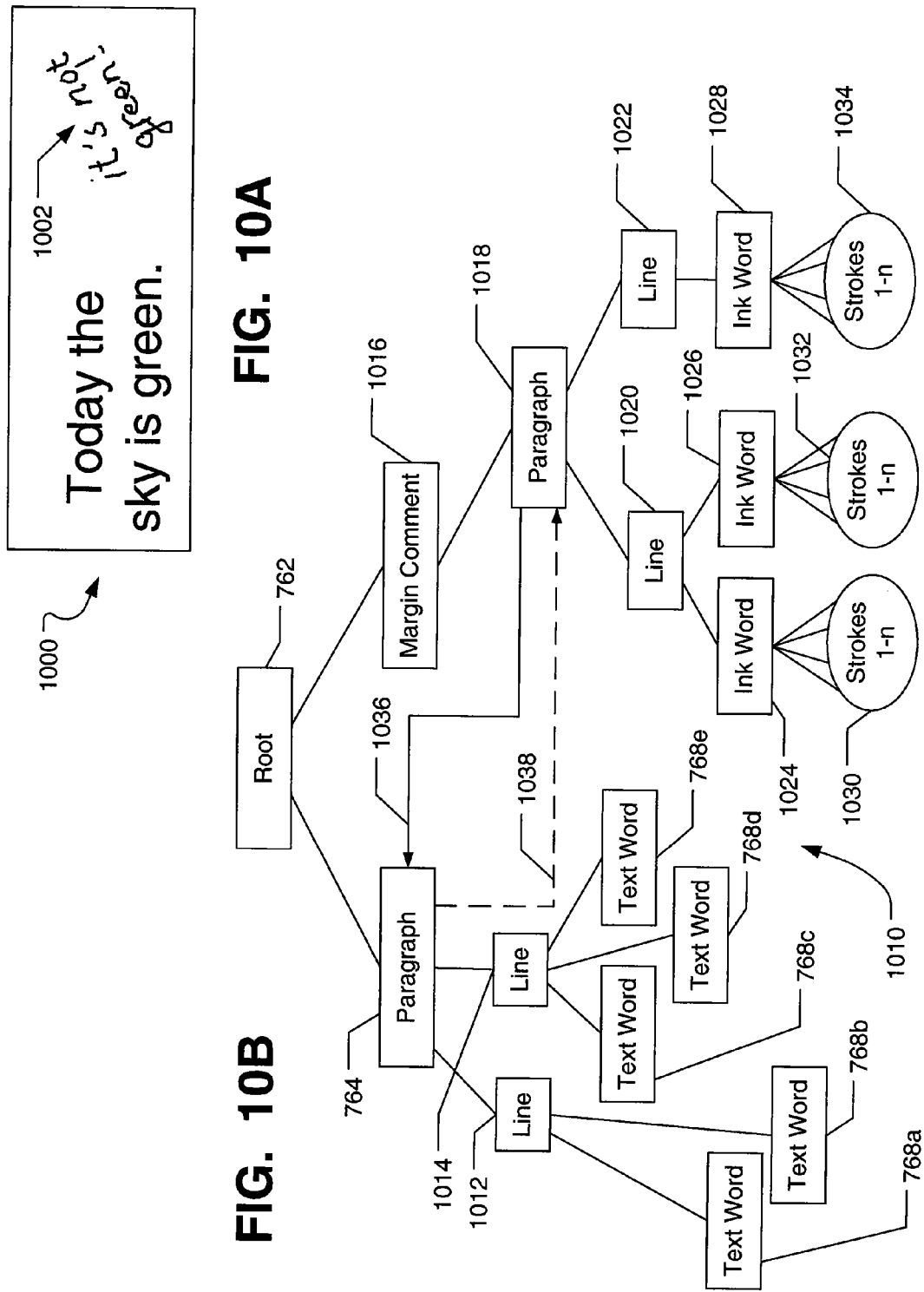

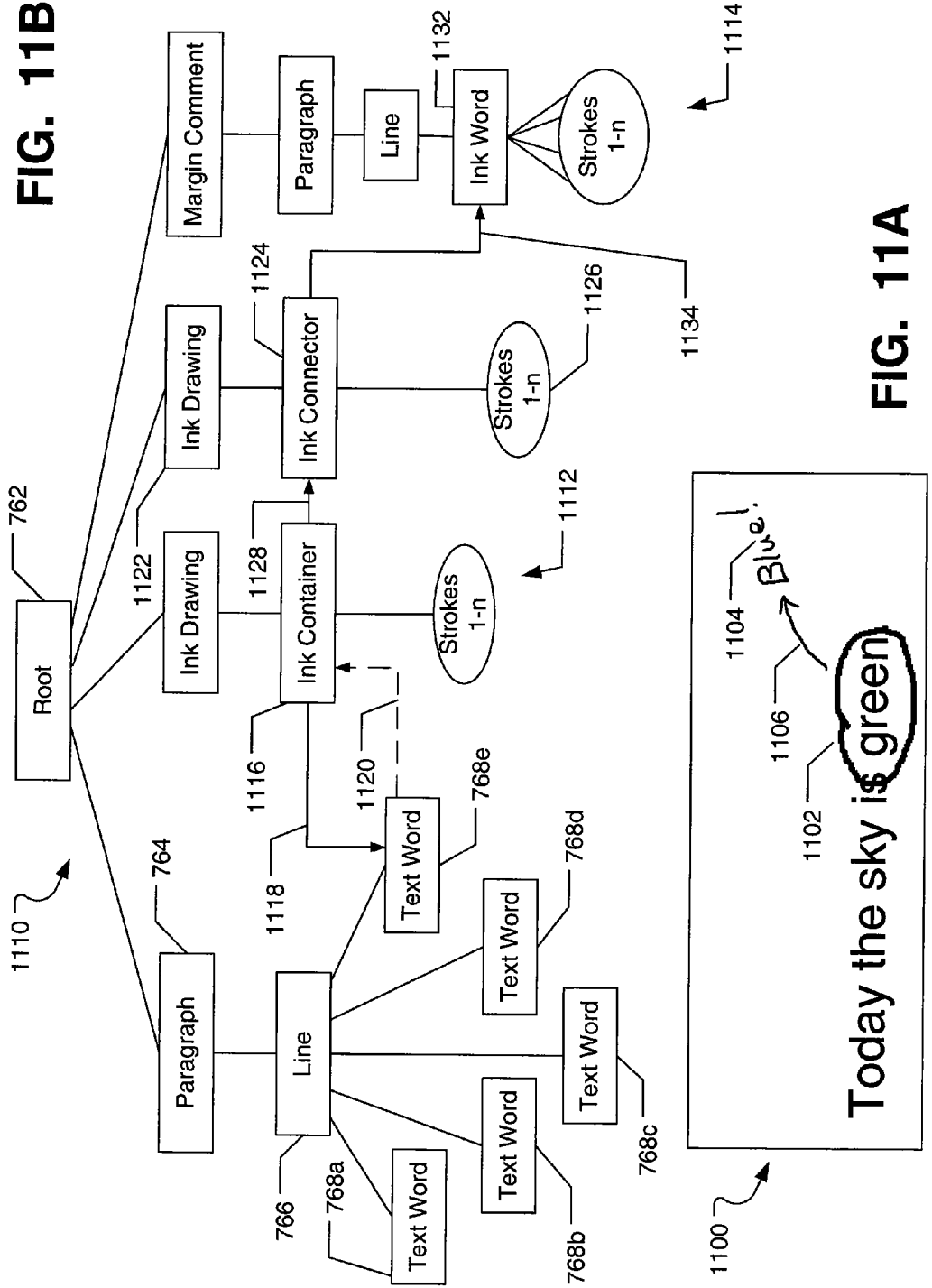

ELECTRONIC INK PROCESSING

CROSS-REFERENCE TO RELATED APPLICATIONS

This application is a divisional application of prior U.S. patent application Ser. No. 10/646,472, filed Aug. 21, 2003, the entire contents of which are incorporated herein by reference.

FIELD OF THE INVENTION

The present invention relates to the processing of electronic ink. Various aspects of the present invention are particularly applicable to the analysis of electronic ink, including layout analysis, classification, and recognition of electronic ink. Additional aspects of the invention relate to use of the layout-analyzed, classified, and recognized electronic ink, for example, in providing rich and flexible annotations in an electronic ink document.

BACKGROUND OF THE INVENTION

As the role of computers has expanded in society, various different techniques have been developed for entering data into computers. One particularly useful technique for submitting data is through handwriting. By writing with a stylus or another object onto a digitizer to produce "electronic ink," a computer user can forego the bulk and inconvenience associated with a keyboard. Handwriting input conveniently may be used, for example, by doctors making rounds, architects on a building site, couriers delivering packages, warehouse workers walking around a warehouse, and in any situation when the use of a keyboard would be awkward or inconvenient. While handwriting input is more convenient than keyboard input in many situations, text written in electronic ink typically cannot be directly manipulated by most software applications. Instead, text written in electronic ink must be analyzed to convert it into another form, such as ASCII characters. This analysis includes a handwriting recognition process, which recognizes characters based upon various relationships between individual electronic ink strokes making up a word of electronic ink.

Handwriting recognition algorithms have improved dramatically in recent years, but their accuracy can be reduced when electronic ink is written at an angle. Likewise, when separate groups of ink strokes cannot be easily distinguished, such as when two words are written closely together, many recognition algorithms cannot accurately recognize electronic ink. Some recognition algorithms also may incorrectly recognize electronic ink as text when, in fact, the electronic ink is intended to be a drawing. For example, a user may annotate typewritten text by writing an electronic ink stroke that underlines, highlights, circles or crosses through some portion of the typewritten text. A handwriting recognition algorithm might then incorrectly recognize these annotation strokes as a dash, the number zero or the letter "O."

The accuracy of many recognition algorithms can be greatly improved by "parsing" (e.g., by analyzing the layout of and/or "classifying") the electronic ink before using the handwriting recognition algorithm. A classification process typically determines whether an electronic ink stroke is part of a drawing (that is, a drawing ink stroke) or part of handwritten text (that is, a text ink stroke). Classification algorithms for identifying other stroke types also are possible. The layout analysis process typically groups electronic ink strokes into meaningful associations, such as words, lines and paragraphs. Layout analysis and classification processes can thus be used to identify which strokes in a collection of electronic ink belong to a single word, which words of the electronic ink are associated with a single line of text written in electronic ink, and which lines of text written in the electronic ink are associated with a paragraph.

While layout analyzing and classifying ink can dramatically improve the recognition of electronic ink, many software application developers are unaware of the importance of these activities before recognizing the electronic ink. Until recently, layout and classification algorithms were not readily available for use with existing software applications. For example, the Microsoft® Windows XP Tablet PC Edition Version 2002 operating system was typically sold with the Microsoft® Windows Journal software application for storing, displaying and manipulating electronic ink. While the Microsoft® Windows Journal software application employs an internal parser, until recently this parser was not accessible to other software applications run by the operating system.

While the parsing process from the Windows Journal software application is now separately accessible by other software applications, the use of this parser is not well known, and this parser cannot easily be employed with many software applications, into which a user may desire to enter handwriting input. Moreover, even if a software application developer were to create a parser specifically for use with a desired software application (which itself may be a difficult and time-consuming process), execution of a parsing process may be quite time-consuming. For example, parsing just a few strokes of electronic ink using a relatively fast microprocessor may take a parser several seconds or even several minutes. If a software application must halt operation until the parsing process is complete, the software application will become too slow for practical use by most users.

Accordingly, there is a need for electronic ink processing techniques that can be employed by a variety of software applications to, for example, analyze the layout of, classify, and/or recognize electronic ink. Further, there is a need for electronic ink processing techniques that can process electronic ink while still allowing the software application employing the techniques to accept new electronic ink input without invalidating the results of the ink processing.

BRIEF SUMMARY OF THE INVENTION

Advantageously, various examples of the invention provide electronic ink processing techniques that can be used by a variety of software applications to process electronic ink. Further, these electronic ink processing techniques allow the electronic ink to be processed asynchronously with regard to the operation of the software application implementing the techniques, so that the electronic ink can be processed without stopping or significantly delaying the operation of the software application. The software application can even continue to accept new electronic ink input while previous electronic ink input is being processed.

With various examples of the invention, elements in a file or document may be described based upon their spatial position relative to each other. For example, both an electronic ink stroke and typewritten text may be described in terms of the same spatial coordinate system. Using spatial information to describe the elements of a document, the software application managing the document can maintain a data structure describing the relationship between its document elements. In particular, the software application can maintain a data structure both describing the class of the various document elements and defining associations between the various document elements. These associations can be defined, for example, as information used to link electronic ink stroke data or collections thereof to other elements in the electronic document (such as words, lines, paragraphs, drawings, table cells, etc.).

By describing document elements in a file or document data structure based upon their spatial position, document elements for a variety of file types can employ common techniques for identifying and manipulating their document elements. More particularly, a variety of software applications can describe document elements within a document based upon their spatial position and employ this spatial position referencing to use common electronic ink analysis methods. Still further, by specifying a particular region of a document for analysis, each software application can limit the analysis process to only desired elements within a document.

To analyze new electronic ink input into a document according to various examples of the invention, the software application managing the document modifies a data structure associated with the document to include the new ink to be analyzed. The software application then provides this data structure (or relevant portions thereof) to an ink analysis tool, which copies some or all of the data structure for analysis (and operates on this copy of the data that is independent of the application program's document data structure). The ink analysis tool passes the copy to an analysis process, such as a parsing process (e.g., a layout analysis process and/or a classification process). The software application may resume its normal operation, including receiving new electronic ink input and/or other data, while the ink analysis process(es) is (are) being performed. In addition to receiving new electronic ink, any "other data" may be received by the application program, for example, data modifying a size, location, or content of existing ink, text, images, graphics, tables, flowcharts, diagrams, and the like; data adding additional text, images, graphics, tables, flowcharts, diagrams, and the like; data deleting existing text, images, graphics, tables, flowcharts, diagrams, and the like. After all desired analysis processes are completed, the analysis results are returned to the ink analysis tool.

Thus, various examples of systems and methods according to the invention allow ink analysis processes to be executed asynchronously from the operation of the software application employing the ink analysis process. This asynchronous operation allows a user to continue to employ a software application without being delayed by the analysis process. Further, it allows multiple analysis processes to execute simultaneously.

In response to receiving the analysis results, the ink analysis tool obtains the current version of the electronic document's data structure (which may contain new and/or modified data entered while the analysis processes were performed) from the software application, and reconciles the analysis results with the current version of the data structure. By reconciling the analysis results with the current version of the data structure, various examples of the invention can avoid more complicated techniques, such as "locking," to asynchronously access the data being used by the software application. Instead, the reconciliation can be called upon by any software application, without the need for complex internal locking provisions.

After reconciling the analysis results with the current version of the data structure, the ink analysis tool may then provide a copy of the reconciled analysis results to another analysis process, such as a handwriting recognition process. Again, the software application may resume its normal operation, including receiving new electronic ink input and/or other data, while the second ink analysis process(es) is (are) being performed. After all of the desired second analysis processes are completed, the results of the second analysis process are returned to the ink analysis tool. The ink analysis tool then obtains the current version of the data structure from the software application (which again may include new and/or modified data), and reconciles the second analysis results with the current version of the data structure. The ink analysis tool then updates the data structure using the reconciled results of the second analysis process. Of course, any number of ink analysis procedures and/or stages can be used without departing from the invention.

Use of the various ink analysis processes described above and the spatial information relating or linking the electronic ink data to other features of the electronic document also may be used to provide rich, flexible, and natural ink annotations in an electronic document. For example, aspects of the invention may be used to provide electronic ink annotations that dynamically move and/or otherwise change based on changes made to the underlying document elements being annotated. Users typically annotate documents in many different ways, e.g., they may circle, underline, highlight or strikeout words; write notes in the margin; draw arrows or other pointers to annotations located in the margin; etc. Moreover, users make annotations on a wide variety of different document types, including, for example, text, spreadsheets, drawings, slide shows, tables, charts, graphs, flowcharts, etc.

Smoothly integrating electronic ink annotations into an electronic document requires that the annotations behave appropriately when the underlying electronic document changes for any reason. For example, if a user circles a word in an electronic document (as an annotation) and then adds text somewhere in the document before that word, this may cause the circled word to move. In this instance, the circle annotation should move and stay with the word. As another example, if the user adds or removes characters from the circled word or otherwise changes its size in any may, the circle annotation should stretch or contract to accommodate the word's new size. Preferably, when the underlying electronic document reflows and/or updates the positions of its constituent elements (paragraphs, pictures, columns, etc.) relative to each other and/or the page for any reason, the electronic ink annotations will also reposition and stay properly located with respect to the underlying text or other information. Unless the annotations behave in this manner with respect to the underlying electronic document text, it becomes impractical to edit or share live electronic documents after annotation, and a paper printout will still be the easiest and most useful way to annotate.

Determining how to change the annotation appropriately will depend on various factors relating to the annotation and the electronic document. For example, appropriately changing the annotation in a reflow situation may depend, for example, on the ability of the computing system (e.g., the parser): (a) to identify the electronic ink as an annotation; (b) to identify the type of electronic ink annotation; and (c) to identify the relationship of the electronic ink to a particular element in the underlying electronic document. While it may be possible to query the user for some or all of this type of information, such systems would produce a much more cumbersome user experience than annotating on paper. Accordingly, in accordance with various aspects of the invention, the above information may be deduced from: (1) the electronic ink itself and (2) the content of the underlying document, including the spatial position of various elements in the document relative to the electronic ink.

Because the determination of the meaning of the ink annotations can be complex and difficult, it is highly impractical to expect that each application program whose document a user might wish to annotate will individually implement annotation identifying logic. Rather, it would be preferably to provide a reusable component for assisting in this annotation function that each application program can easily integrate. For example, just as a pen-based computing system's operating system provides components for the collection and rendering of electronic ink, it would be preferable for the operating system to provide a component that determines the meaning of ink annotations (also called the "annotation parser") that can fairly easily be fluent in working with the ink involved.

Identifying the underlying electronic document's content, however, poses substantial difficulties in providing "smart" annotation ability. For example, various different application programs have extremely disparate ways of storing, managing, and reflowing documents. The present invention provides a reusable annotation parser capable of determining the relation of possible ink annotations to various different types of electronic documents. Specifically, in accordance with some aspects of this invention, a mechanism is provided with the annotation parser that calls back to the application program to provide relevant information relating to the ink being parsed (e.g., information relating to the electronic document in the spatial area corresponding to the ink annotation, to provide "context" to the ink annotation). The mechanism is easy enough to be practical to integrate into any document-based application, and it is efficient enough to work for very large documents (which can be processed in sections, such as pages or the like).

The ink processing techniques according to various examples of the invention thus allow a variety of software applications to perform multiple processes on electronic ink through the ink analysis tool. Moreover, a software application using these techniques can continue its normal operation during the analysis process, including receiving new electronic ink input without necessarily invalidating the results of the analysis processes.

BRIEF DESCRIPTION OF THE DRAWINGS

The above and other objects, features, and advantages of the present invention will be readily apparent and fully understood from the following detailed description, taken in connection with the appended drawings, in which:

FIGS. 3 and 4 illustrate various features of example implementations of aspects of the invention relating to electronic document annotation;

FIG. 5 illustrates general features of ink parsing of an electronic document;

FIGS. 6A through 6I illustrate example data structures useful in practicing at least some aspects of this invention;

FIGS. 7A through 12B illustrate example electronic documents and associated example data structures useful in processing electronic ink annotations of electronic documents;

DETAILED DESCRIPTION OF THE DRAWINGS

Terms

Figure 1:
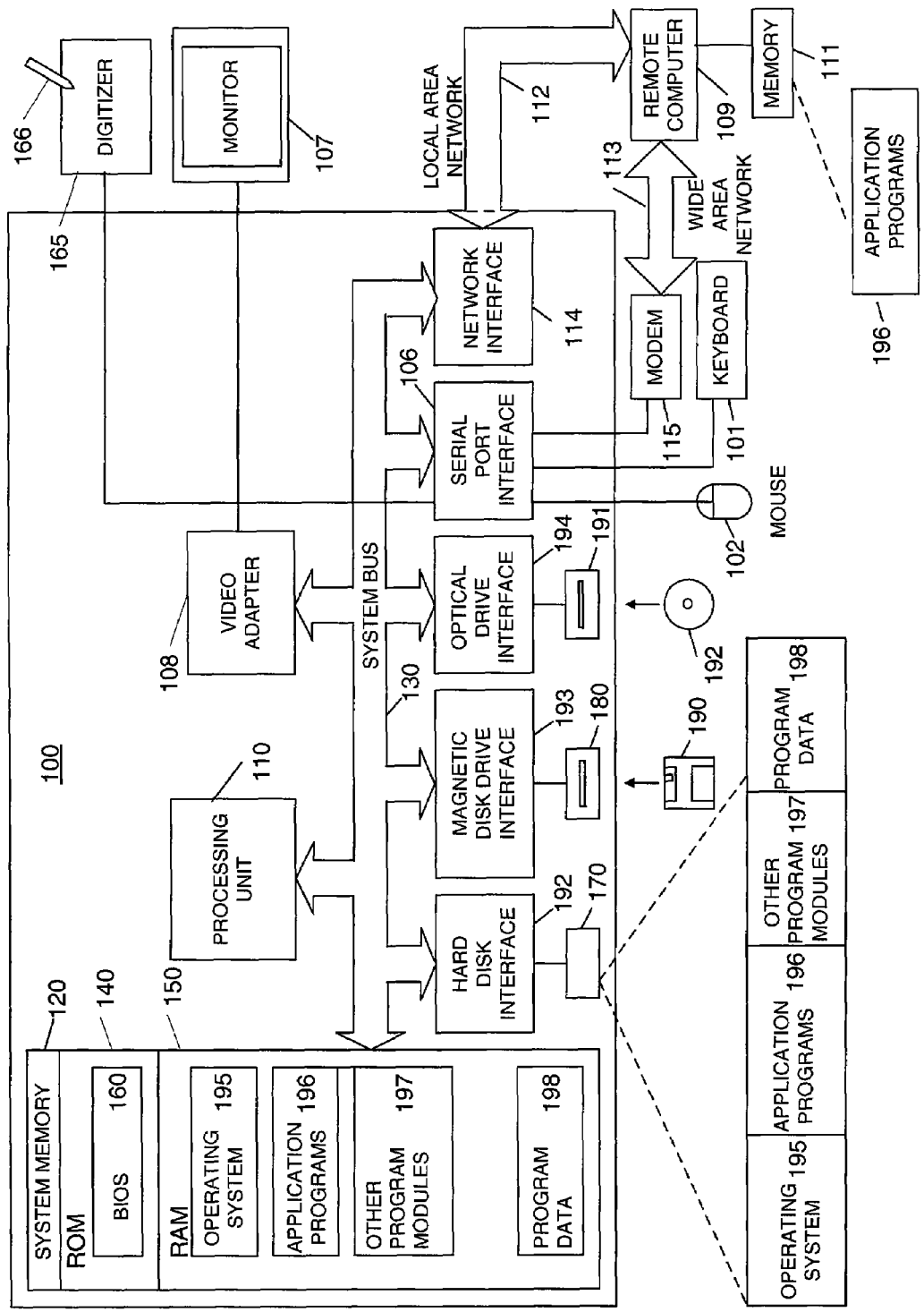
FIG. 1 illustrates a schematic diagram of a general-purpose digital computing environment in which certain aspects of the present invention may be implemented.

The following terms are used in this specification and, unless otherwise specified or clear from the context, the terms have the meanings provided below:

"Render" or "Rendered" or "Rendering"—The process of determining how information (including text, graphics, and/or electronic ink) is to be displayed, whether on a screen, printed, or output in some other manner.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

Overview

According to various examples of the invention, the properties of an element in a document (or other type of file) may include information relating to the spatial position of that element within the document. Thus, both an electronic ink stroke and typewritten text may be described in terms of the same spatial coordinate system for a document and/or in terms of a spatial relationship or other relationship to other elements in the document. Moreover, related elements in a document can be identified simply by identifying the spatial region of the document containing those elements and/or by linking those elements.

Using this spatial relationship between various documents elements, a software application may create and maintain a data structure that describes other relationships between the document elements. For example, a software application may maintain a data structure, such as a data tree, that defines a class for various elements in a document. Thus, a node in the data structure might correspond to a handwritten word or drawing containing one or more ink strokes, and data stored in the node may further indicate a position of that word on a page. Any other suitable or conventional data typically stored relating to an ink stroke and/or an electronic ink word also may be stored in the word node.

This type of data structure also may associate document elements (such as individual ink strokes or typewritten text characters) into meaningful groups, such as words, lines of words, sentences, paragraphs, and the like. Thus, if a software application maintains a document tree structure that describes a paragraph of handwritten electronic ink, the leaf nodes of the data structure may include data relating to the individual strokes of electronic ink, and one or more strokes may be associated together in the data structure as word nodes corresponding to the words in the paragraph (e.g., words as determined by the parser and/or the recognizer). The tree structure may then associate the word nodes with line nodes corresponding to lines in the paragraph. Each line node further may be associated with a node corresponding to the paragraph. Further, a software application may maintain a tree or other data structure that associates a node corresponding to an electronic ink stroke and/or some other grouping of electronic ink with another node corresponding to a non-ink document element, such as an image; an ink drawing; a typewritten character, word, line, paragraph; or the like. These data structures thus can be used to define relationships between associated electronic ink strokes, to differentiate electronic ink strokes forming handwritten text from electronic ink strokes annotating non-ink document elements, and/or to link electronic ink strokes to other document elements.

As will be discussed in detail below, these data structures can be used with an ink analysis tool according to various examples of the invention to analyze electronic ink in a document. According to various examples of the invention, a software application may obtain an analysis of electronic ink within a document by first creating a data structure for the document. The data structure describes the relationship between document elements that have already been analyzed (if any), and thus provides the context in which any new electronic ink will be analyzed. This data structure or "analysis context object" also includes any new electronic ink that has not been analyzed. That is, the analysis context object also includes electronic ink for which a relationship with other documents elements has not yet been established. For some examples of the invention, the software application creates the analysis context object on its own. With other examples of the invention, however, the software application employs the ink analysis tool or another tool to create the analysis context object.

After the software application has provided the analysis context object to the ink analysis tool (or the ink analysis tool creates the analysis context object), the ink analysis tool makes a copy of or retrieves information relating to at least a portion of the analysis context object containing the unanalyzed electronic ink. By making a copy of or receiving information relating to a desired portion of the analysis context object, the ink analysis tool creates a data structure that can subsequently be analyzed without changing the analysis context object maintained by the software application. That is, the copy is independent of the actual electronic document used in the software application, and thus may be referred to below as the "document independent" analysis context object.

Once the ink analysis tool has created the document independent analysis context object, the ink analysis tool provides this document independent analysis context object to one or more analysis processes. For example, if handwriting recognition is to be performed on the unanalyzed electronic ink in the document, then the ink analysis tool may provide the document independent analysis context object to classifying and/or layout analysis processes for classifying the ink into text and drawing strokes (if necessary or desired) and then grouping the unanalyzed electronic ink text strokes into associated groupings based on the ink layout. While the classifying and/or layout analysis processes are analyzing the document independent analysis context object, the software application may continue with its regular operation. In particular, the software application may continue to receive new electronic ink input and/or any other data in the electronic document kept by the application program.

When the analysis process, such as a parsing process, has completed its analysis of the document independent analysis context object, it returns the analysis results to the ink analysis tool. More particularly, the parsing process (which may include, inter alia, classification and layout analysis processes as described above) will return a modified version of the document independent analysis context object showing new relationships for the previously unanalyzed electronic ink. Because the software application is free to accept new electronic ink input and/or any other data for the document during the above-described parsing operation, however, the current version of the analysis context object for the document (i.e., the version maintained by the application) may be different than both the document independent analysis context object originally provided to the ink analysis tool and the parsing results provided by the parsing process.

Accordingly, with some examples of the invention, the ink analysis tool may obtain a current version of the analysis context object from the software application, and reconcile the parsing results with the current version of the analysis context object. During this reconciliation process, the ink analysis tool will update the current version of the analysis context object to reflect the results of the parsing process. The ink analysis tool will then pass the reconciled data from the current analysis context object on to a handwriting recognition process for recognition. With other examples of the invention, however, the ink analysis tool may omit the reconciliation process, and instead pass the parsing results directly on to a handwriting recognition process.

Once the parsing results have been reconciled with the current version of the analysis context object, the software application may again return to its regular operation, and thus it may continue to receive new electronic ink input and/or any other data relating to the document. In the meantime, the recognition process analyzes the reconciled data from the current analysis context object (or, alternately, the parsing results). After the recognition process has completed its analysis of the reconciled data (or parsing results), it returns its recognition results to the ink analysis tool. Again, because the software application may have received new electronic ink input and/or any other data for the document during the operation of the recognition process, the ink analysis tool obtains a current version of the analysis context object from the software application. The ink analysis tool then reconciles the results from the recognition process with the current version of the analysis context object to update the current version of the analysis context object with the recognition results.

Example Operating Environment

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows an exemplary environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
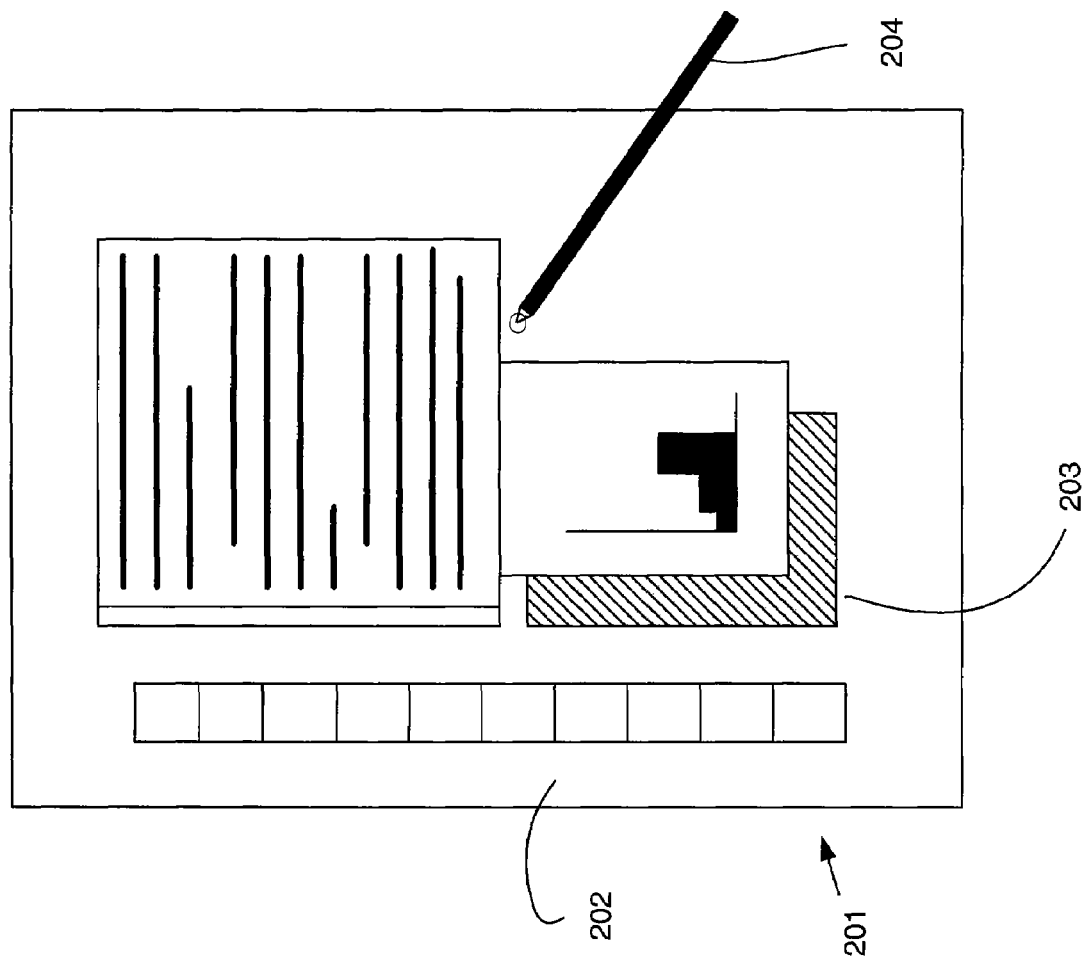
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as pen digitizers available from Mutoh Co. (now known as Fine-Point Innovations Co.) or Wacom Technology Co. Other types of pen digitizers, e.g., optical digitizers, and touch-sensitive digitizers may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

Spatial Document View Abstraction

As described above, certain aspects of the present invention relate generally to systems and methods for providing richer and more versatile annotations using electronic ink in electronic documents. The following describes various aspects and examples of this invention in more detail.

A. General Overview of the Invention

FIG. 3 generally illustrates operation of systems and methods according to at least some examples of this invention. Specifically, as illustrated in FIG. 3, a user may be interacting in some manner with an electronic document 300 (Document "A" in FIG. 3), for example, by adding electronic ink to the document 300. In the illustrated example, the electronic document 300 includes electronic or typewritten text 302 ("Sample Text" in the illustrated example) and an ink drawing 304 (a house in the illustrated example). Of course, the electronic document 300 could include any data or information without departing from the invention, such as electronic text, electronic ink (drawing or text), images, graphs, tables, charts, other graphic or electronic information, and/or combinations thereof. For the purposes of this example, assume that the original electronic document 300 (also called the "base document" or "base portion" in this application) includes the electronic typewritten text 302 and the electronic ink drawing 304. As the user reviews Document A 300 in this example, she decides to include an electronic ink annotation into the document 300. Specifically, in the illustrated example, the annotation includes a circle 306 around some portion 308 of the electronic text 302.

In this example, after the user enters the annotation, the application program will call the parser 310 and request parsing of the newly input electronic ink data (as noted above, "parsing" may include, for example, classification of the electronic ink into various ink types (e.g., drawings, text, flowcharts, music, etc.) and/or ink layout analysis (e.g., ascertaining spatial and positional relationships among the ink strokes and grouping them into appropriate groupings), as well as other analysis processes). Specifically, the application program will send the input electronic ink data (representing the annotation 306, in this example) to the parser 310 as unclassified ink data. This is illustrated in FIG. 3 by input arrow 312.

Optionally, at or about this same time, the application program may send some or all of the data relating to the underlying electronic document 300 to the parser 310. This data may include, for example, data relating to the spatial layout of information in the document 300, such as the positions of the electronic text 302, the drawing 304, etc. Additionally, the application program may send data indicating a hierarchical structure of the data in the document, which is described in more detail below. As another alternative, as also described in more detail below, the parser 310 may call back to the application program requesting certain data relating to the electronic document 300, such as information relating to the electronic document 300 in the spatial area associated with the new, unclassified ink (in this instance, data representing the typewritten text and information located spatially near annotation 306). This data input to the parser 310 is illustrated in FIG. 3 by input arrow 314. Of course, both unclassified ink and previously analyzed data can be simultaneously sent to and/or made available to the parser without departing from the invention.

The parser 310 takes the input electronic document data 314 and the input unclassified ink data 312 and uses that information to classify the new electronic ink data into an ink type. The ink may be classified into various different ink types without departing from the invention, and various examples of possible ink types are described in more detail below. For the present example, based on the input ink 306 and the information 302 contained in the underlying document 300, the parser 310 according to this example of the invention may determine and classify the input ink 306 as an annotation or even more specifically, as an ink drawing corresponding to a container annotation (e.g., a circle) that contains specific typewritten text. Of course, other annotations types also are possible, such as highlight annotations, "points to" annotations, "points from" annotations, anchor annotations (e.g., without pointing to or pointing from), horizontal spans, vertical spans, and the like, and various examples are explained in more detail below.

Once parsed, data associated with the annotation 306 may be incorporated into a "document tree" hierarchical data structure associated with the electronic document 300 (or any other suitable or desired data structure), and that data structure (or instructions for modifying an existing data structure maintained by the application program) may be sent back to the application program, as indicated in FIG. 3 by arrow 316. If desired, other data also can be returned from the parser 310 to the application program without departing from the invention. For example, as indicated in FIG. 3, data associated with the results of a recognition analysis process (such as a handwriting recognizer or other recognizer) may be returned to the application program, if the parser 310 action included calls to one or more recognizer modules, components, and/or programs.

FIG. 4 illustrates an example of an implementation 400 of various features used in some examples of this invention. As illustrated, an electronic document (such as Document A 300 from FIG. 3) is generated, stored, and/or maintained by an application program 400a as a data structure or document model 402. This data structure 402 may be a hierarchical data structure or any other desired or suitable data structure without departing from the invention. The application program 400a includes an "Analysis Context" object 404, which contains a mirror copy, a selective copy, or other relevant information relating to the data structure 402 (e.g., the Analysis Context object 404 may be a "translation" layer in which queries on the Analysis Context object 404 get translated into queries on the native document mode structure—in this manner, the parsing technology in accordance with aspects of this invention may be translated for use with various different native application programs). The "platform" 400b or operating system side of this example implementation 400 includes an "Ink Analyzer" method 406, which is called by the application program 400a. The application program 400a calls the Ink Analyzer method 406 and passes to it reference to the Analysis Context object 404. The Ink Analyzer method 406 will call the parser 408 (also part of the platform 400b in this example), which classifies and analyzes the layout of the input data, as generally described above. Operation of an example implementation according to the invention is described in more detail in the Analysis Of Ink section below. Once the parser 408 completes its analysis and processing, the platform 400b may send data back to the application program 400a to enable the document model 402 and/or Analysis Context object 404 to rebuild its data structure based on the parser processing and results, as generally illustrated at arrow 410 in FIG. 4.

FIG. 5 generally illustrates an example of a data structure that may be used for storing electronic document data in at least some examples of this invention, for example, as part of the "Analysis Context" object 404, as the document model 402, or as data structures generated and/or output by the parser 408. Specifically, in FIG. 5, an example electronic document 500 is illustrated. When stored as an Analysis Context object 502 or subjected to parsing, the data structure may include the various document elements classified or arranged into different groupings or "nodes." For example, as illustrated in FIG. 5, the electronic document 500 includes three electronic text paragraphs 504, 506, and 508; one electronic ink drawing 510; and one electronic ink annotation 512. An example Analysis Context data structure 502 for the electronic document 500 is shown in FIG. 5 as a list of top-level elements. Specifically, node element 504(a) corresponds to paragraph 504 in electronic document 500, node element 506(a) corresponds to paragraph 506 in electronic document 500, node element 508(a) corresponds to paragraph 508 in electronic document 500, node element 510(a) corresponds to ink drawing 510 in electronic document 500, and node element 512(a) corresponds to the ink annotation 512 in electronic document 500. Additional nodes may be stored in the data structure (e.g., in a hierarchical arrangement) as parent nodes and/or child nodes to the top level nodes 504a, 506a, 508a, 510a, and 512a illustrated in FIG. 5, as will be described in more detail below.

B. Context Nodes and Hierarchical Data Structures

Figures 6A, 6B, 6C, 6D:
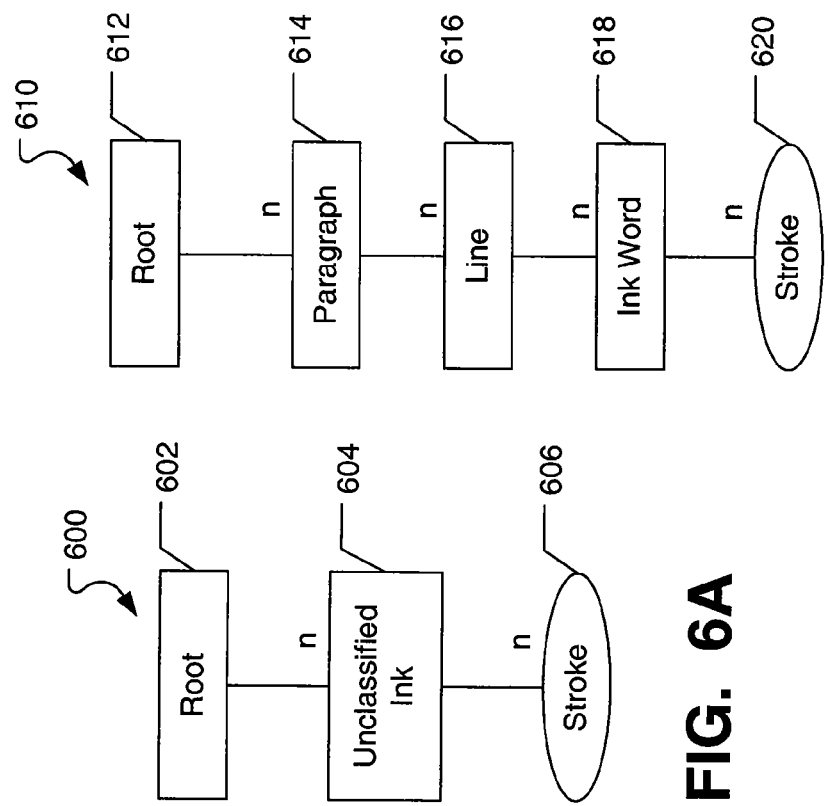

FIGS. 6A through 6I illustrate various examples of context nodes and data structures that may be used in building, analyzing, and parsing electronic document data, such as an Analysis Context object, in accordance with some examples of this invention. FIG. 6A illustrates an example data structure 600 that may be used for storing unclassified electronic ink data (e.g., ink newly input by a user that has not been previously subjected to parsing). This example data structure 600 includes a root node 602 (which may correspond to the entire electronic document in the application program, a specific page of the document, or any suitable or desired grouping of data, such as a grouping used by the application program). Any suitable or desired data may be included in the root node 602, such as page number, pointers to the previous page and the next page, margin locations or dimensions, etc. Each root node 602 may include any number of unclassified ink nodes 604 as child nodes, and each unclassified ink node 604 further may include any number of individual stroke nodes 606 (the last node in a hierarchical structure (the stroke nodes 606 in this example) also may be called a "leaf node" in this specification). (The letter "n" in the various figures can represent any number, including zero.) The various nodes of the data structure 600 may include any desired or suitable data corresponding to the node. For example, stroke nodes 606 may include data representing: digitizer points or other data identifying the electronic ink stroke; stroke position or orientation data; stroke color data; stroke pressure data; stroke input timing data; stroke ID data; and/or any other conventional or useful data used in storing stroke information in systems and methods capable of receiving electronic ink. Likewise, the unclassified ink node(s) 604 may include any desired or suitable data associated with the ink or the node, such as data representing: the bounding box size of all strokes contained within the node; the bounding box location; input timing information; geometric information for the ink (such as, for example, convex hull information); and/or any other conventional or useful data relating to the unclassified ink strokes included in the node. Alternatively, if desired, stroke data generally may be saved as a property of another node (e.g., of a word node, table node, or the like) rather than as a separate node in a document tree.

Once unclassified ink is sent to a classifier, layout analyzer, a recognizer, and/or another parsing system, at least some portions of the ink may be associated together and/or classified into various different types, and a data structure associated with the ink may be changed to correspond to the various associations and types into which it was classified. FIG. 6B illustrates an example data structure 610 for electronic ink that has been classified as ink text. Using parsing technology, including conventional parsers known and used in the art, input electronic ink strokes (e.g., electronic ink data collected between a pen-down event and a temporally following pen-up event or in some other manner) may be parsed and stored in a hierarchical manner wherein related individual ink strokes may be grouped together and stored as ink words, linearly arranged ink words may be grouped together and stored as ink lines, related ink lines may be grouped together and stored as ink paragraphs, and related paragraphs may be stored as electronic documents (e.g., in individual page portions, as entire documents, or in any suitable root grouping). An example hierarchical data structure 610 corresponding to electronic ink data parsed and stored in this manner, as illustrated in FIG. 6B, may include a root node 612, which may correspond to an entire electronic document, a page, or another grouping as used by the application program. Each root node 612 may contain any number of nodes 614 corresponding to paragraphs or similar groupings of electronic ink strokes. Paragraph nodes 614 may contain any number of individual line nodes 616, which in turn may include any number of individual ink word nodes 618, which further may contain any number of individual stroke nodes 620 corresponding to the individual strokes of the input electronic ink data. Optionally, as noted above, the stroke data may be stored as a "property" of an associated word node, if desired. The various nodes 612, 614, 616, 618, and 620 may store any suitable data relating to the various individual strokes or collections of strokes contained within the node, like spatial orientation or positioning data and/or other data like that described above.

Other data types and data structure arrangements corresponding to input electronic ink strokes are possible without departing from the invention. For example, classifying, layout analysis, or recognizer technology may determine that input electronic ink forms an ink drawing. FIG. 3 illustrates an example ink drawing 304 that contains several individual ink strokes. FIGS. 6C and 6D illustrate example hierarchical data structures that may be used for grouping and storing electronic ink data determined to relate to ink drawings. As shown in FIG. 6C, data structure 630 includes a root node 632 (which may correspond to the entire electronic document, an electronic page, or some other grouping of data, as described above). Each root node 632 may include any number of individual ink drawing nodes 636 (e.g., such that each individual drawing has an individual node storing data relating to, for example, drawing width, drawing height, drawing position, bounding box size, and the like), and each ink drawing node 636 may include any number of individual ink stroke nodes 638 (corresponding to the individual ink strokes making up the drawing). Optionally, the ink stroke data may be stored as a "property" of its corresponding ink drawing node (or other node).

FIG. 6D illustrates an alternative data structure 630a for electronic documents containing one or more ink drawings. In this example, an electronic document or page or the other grouping of data (as represented by root node 632a) may include one or more groups (represented by node 634a) of electronic ink drawings with their data associated together and stored in the hierarchical manner described in conjunction with FIG. 6C (e.g., an entire electronic document (represented by root node 632a) may include several individual pages (each represented by a group node 634a), and each individual page may have one or more individual ink drawings (each represented by an ink drawing node 636a), and each individual ink drawing may contain one or more individual ink strokes (each represented by a stroke node 638a or in a property of the ink drawing node)). It should be noted that both groups and ink drawings may be children of the same root node or any group node. In addition, if desired, a group node may contain additional group nodes. Of course, still other suitable data structures for storing electronic ink drawings may be used without departing from this invention.

Hierarchical data structures, however, are not limited to use with input electronic ink data. Input typewritten text (e.g., from a keyboard) also can be associated into various groups and stored in a hierarchical data structure. FIG. 6E illustrates an example of such a data structure 640. This data structure 640 may include a root node 642 (e.g., like the root nodes discussed above). Each root note 642 may include any number of text paragraph nodes 644 (corresponding to paragraphs of text), each paragraph node 644 may include any number of text line nodes 646 (or alternatively, text sentence nodes), and each line node 646 may further include any number of individual text word nodes 648. If desired, text words could be further broken into individual text character nodes, and still further broken into individual character feature nodes (relating to, for example, baseline, serif, ascender, and descender features of each character) without departing from the invention. The various nodes can store any suitable data relating to the text, such as paragraph, line, or word spatial position, content, size, and the like; page margins; margin dimensions or locations; number of pages; etc.

The various data structures described above in conjunction with FIGS. 6A through 6E illustrate data structures that exclusively contain only electronic ink data or only electronic typewritten text data. Parsing technology may be used to analyze, combine, associate, and group these different data types in a single data structure without departing from the invention. FIG. 6F illustrates an example data structure 650 in which an electronic document or a portion thereof (represented by root node 652) contains one or more individual paragraphs (represented by paragraph node 654) and one or more individual lines (represented by line node 656). The lines potentially may contain both typewritten text (represented by text word node 658) and electronic ink text (represented by ink word node 660 and ink stroke node 662). Each individual paragraph, line, and word node (both typewritten text and ink words) will contain appropriate independent data, depending on the content of the paragraph, line, and word. Additionally or alternatively, individual words could further include both ink characters and typewritten characters without departing from the invention.

Other electronic data also may be included in an electronic document's data structure (including hierarchical data structures) without departing from the invention. For example, image data (such as a digital photo, graphical information, and the like) may be included in a data structure for an electronic document, for example, as shown in the data structure 664 of FIG. 6G. As illustrated in this example, the data structure 664 includes an electronic document or a portion thereof (represented by root node 666) that contains one or more individual groupings of data (represented by group node 668). Each grouping of data in this example further may include an electronic image (represented by image node 670), as well as typewritten text (represented by paragraph node 672, line node 674, and text word node 676), as generally described above in conjunction with FIGS. 6E and 6F. Of course, a data structure like that illustrated in FIG. 6G also could contain electronic ink data (e.g., like the data structures illustrated in FIGS. 6A through 6D) or other desired data types without departing from the invention.

Figure 6H:
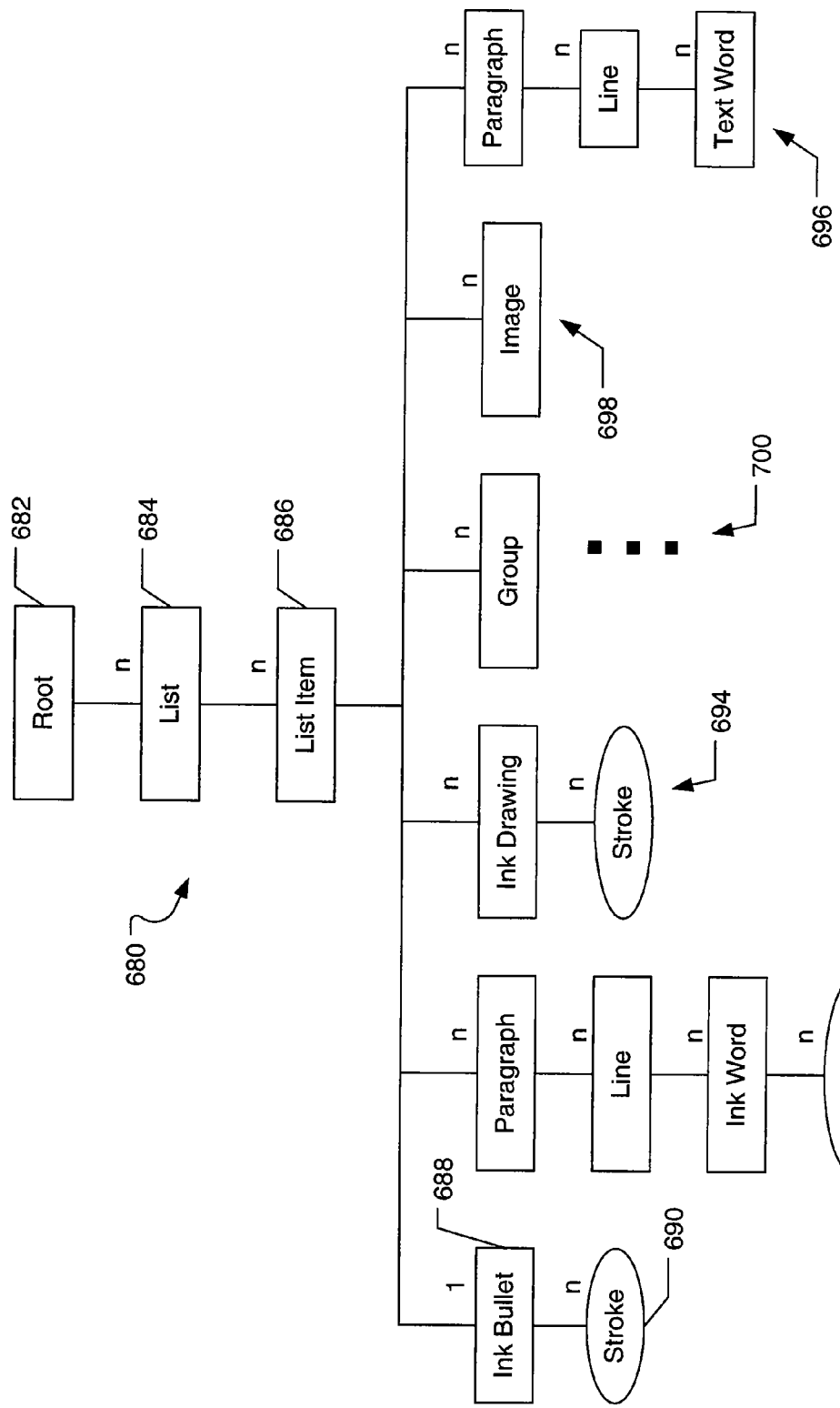

FIG. 6H illustrates an example of another potential data structure 680 that may be used in accordance with at least some examples of this invention. More specifically, the data structure 680 of FIG. 6H corresponds to an electronic document or portion thereof (represented by root node 682) containing one or more lists (represented by list node 684). A list in an electronic document may contain any number of individual list items (represented by list item node 686), and each list item may contain a wide variety of different types of electronic information. For example, some list items optionally may include a list bullet, which may be comprised of a typewritten bullet or an electronic ink bullet (an ink bullet node 688 including one or more corresponding ink stroke nodes 690 are illustrated in the example of FIG. 6H). In addition, each list item optionally may include one or more electronic ink paragraphs (represented by node chain 692), one or more ink drawings (represented by node chain 694), and/or one or more typewritten paragraphs (represented by node chain 696). Additionally (or alternatively), each list item optionally may include one or more images (represented by image node 698) and/or one or more groupings of data, such as the groupings described above in conjunction with FIGS. 6D and 6G (represented by group node chain 700). Because the various nodes and/or node chains 692, 694, 696, 698, 700 may generally correspond to the example data structures illustrated in FIGS. 6A through 6G, as well as to subsets and/or groupings of these data structures, further explanation is omitted. If desired, in at least some instances, an individual list item node 686 also may itself contain a list having a data structure like that illustrated in FIG. 6H.

Figure 6I:
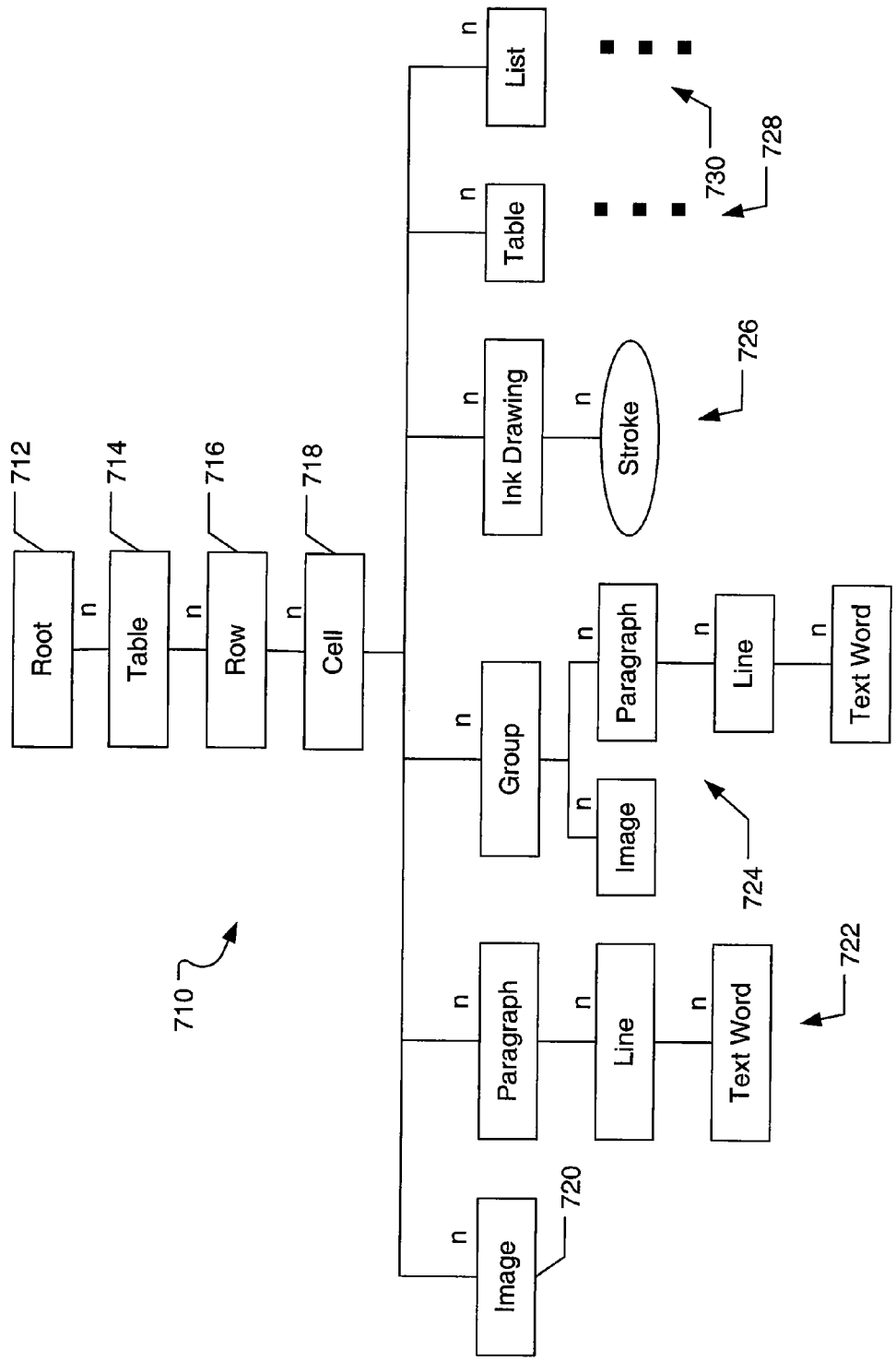

FIG. 6I illustrates another example data structure 710 that may be used in at least some examples of the present invention. This example data structure 710 corresponds to electronic data analyzed, associated together, grouped, and stored as a table. In this illustrated example, each electronic document or portion thereof (represented by root node 712) may include one or more tables (represented by table node 714). A table, in this example, may be comprised of one or more rows of information (represented by row node 716), and every row may be comprised of one or more individual cells (represented by cell node 718). The individual cells may contain one or more data structures, including, for example, any of the various different data structures described above. In the illustrated example, the individual table cells are shown as potentially containing any number of images (represented by image node 720), any number of typewritten text paragraphs (represented by node chain 722), any number of groupings (represented by node chain 724), any number of ink drawings (represented by node chain 726), any number of additional tables (represented by node chain 728), and any number of lists (represented by node chain 730). Of course, any other suitable or desired data structures may be included in a table without departing from this invention, including the various specific data structures described above and/or combinations and subsets of data structures, e.g., like those described above.

Any suitable or desired data can be stored in the various different nodes, including the various types of data described above. For use with processing data relating to annotations, it may be useful in at least some examples of the invention for the various nodes to store data relating to the spatial position, orientation, or location of the node in the electronic document, optionally as this spatial information relates to or links with other nodes in the electronic document data structure.

Also, other types of parsers, classifiers, and/or recognizers and data types may be used without departing from the invention. For example, recognizers may be used to analyze, recognize, group, and/or associate electrical or electronic symbols (e.g., resistors, voltage sources, capacitors, etc.); musical symbols; mathematical symbols; flowchart elements; pie chart elements; and the like, without departing from the invention.

The data structures illustrated in FIGS. 6A through 6I are merely examples of various data structures that may be used in accordance with aspects of this invention. Those skilled in the art will recognize that the specific data structures used may vary widely without departing from the invention. For example, different nodes representing different layout groupings may be used, additional node types may be added, or some of the described node types may be omitted without departing from the invention (e.g., column nodes may be used instead of row nodes in the table data structure). Additionally, the above description is optimized for use with languages and text representations in which characters are read from left-to-right and then top-to-bottom on a page. Data structures designed for use with and corresponding to other languages and character arrangements, for example, data structures to accommodate languages read and/or written from right-to-left, top-to-bottom, bottom-to-top, and combinations thereof, may be used without departing from the invention. Additionally, if desired (particularly for some languages, such as Asian languages), strokes may be appropriately grouped as characters, which may then be grouped into lines without using an intermediate "word" node, as described above. As another alternative, the use of line nodes may be omitted and word nodes may be grouped together as paragraphs and/or in other desired groupings. These and other variations in the data structure, for example, to accommodate characteristics of a particular language, may be used without departing from the invention.

C. Application of Aspects of the Invention to Annotations

Aspects of the present invention, including the use of context nodes and hierarchical data structures as described above, may be used to provide "smart" electronic ink annotations in electronic documents. As described above, one desirable and advantageous use of pen-based computing systems is in the annotation of electronic documents. However, to be particularly useful and effective, annotations made in electronic ink in documents on a pen-based computing system should be flexible enough so that if and when characteristics associated with various elements in the underlying document change for any reason (e.g., margin changes, display size changes, font changes, addition of information, deletion of information, etc.), the annotation is capable of accurately changing position and/or other characteristics based on changes to the annotated elements in the underlying document. This may be accomplished, for example, by linking at least one context node associated with the annotation to one or more context nodes associated with the underlying document. In at least some instances, data and/or characteristics associated with and stored relating to the underlying document, such as data relating to the spatial attributes, position, and/or location of one or more document elements, can be used to control the location, appearance, and/or other characteristics of the annotation.

Figure 7A:
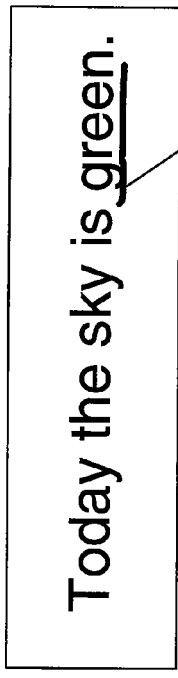
Figure 7B:
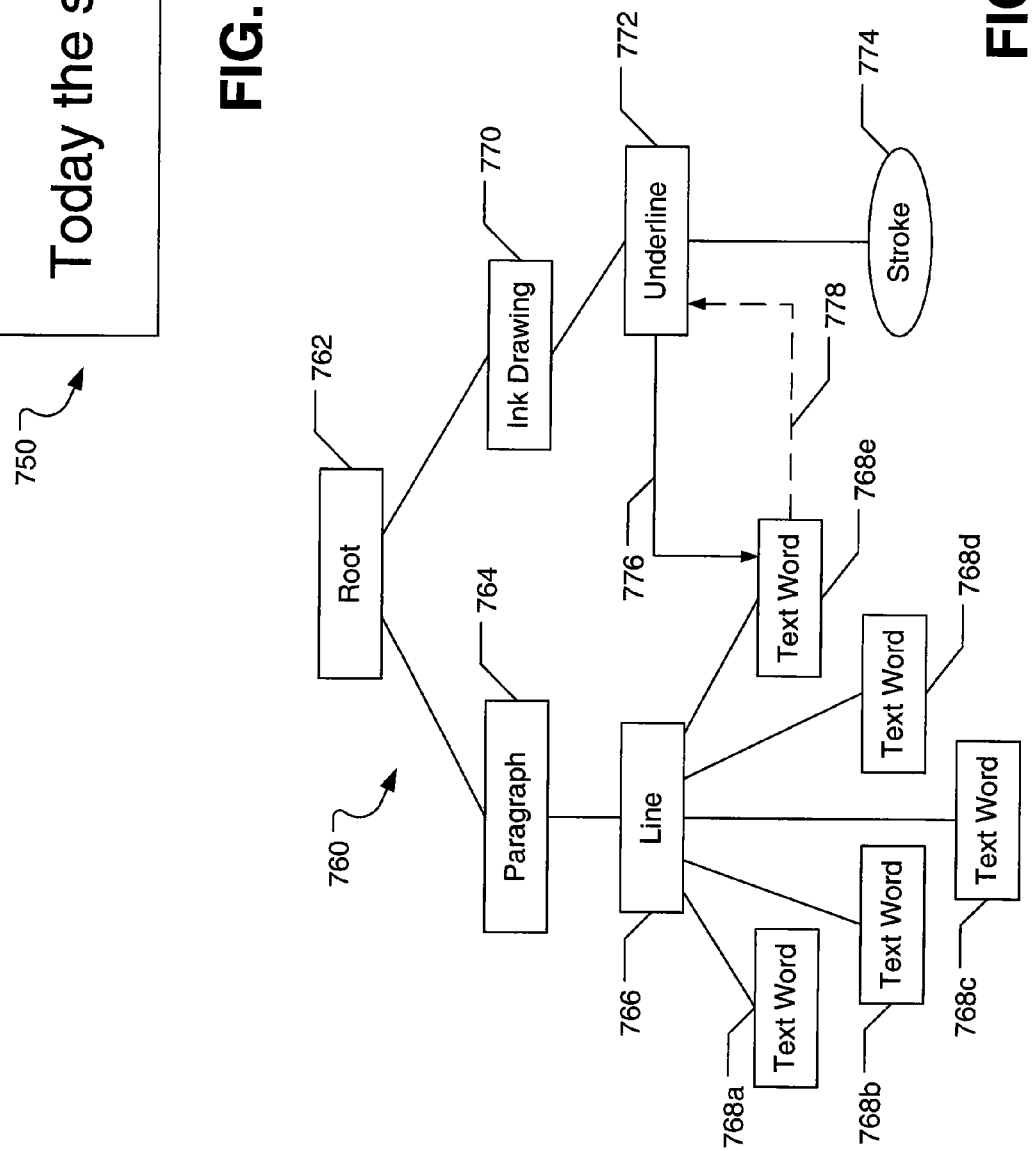

FIGS. 7A and 7B illustrate one example of an annotation that may be applied to an electronic document via electronic ink. As illustrated in FIG. 7A, an electronic document 750 includes the sentence "Today the sky is green." A user of a pen-based computing system has annotated this document 750 using electronic ink to underline the word "green" (the underline annotation is shown at reference number 752). FIG. 7B illustrates an example hierarchical data structure 760 corresponding to this composite electronic document 750 (the entire electronic document 750 is represented in the data structure 760 by root node 762). Once fully parsed, the data structure 760 will include context nodes showing the overall document structure. More specifically, information relating to the typewritten text in the electronic document 750 will be analyzed and associated together to indicate that the electronic document 750 contains one paragraph (paragraph node 764), the paragraph contains a line (line node 766), and the line contains five words (one text word node 768a-768e for each of the words "Today," "the," "sky," "is," and "green," respectively). Additionally, the parser will note the presence of data in the electronic document 750 relating to the annotation 752, and it will classify this data as an electronic ink drawing (ink drawing node 770). Additionally, based on the location and position of the ink drawing stroke(s) with respect to the typewritten text in the underlying document 750, the parser will recognize and classify the annotation as an "underline" annotation and generate an underline node 772. Additionally, the parser will store all stroke data corresponding to the actual ink stroke(s) of the underline annotation in one or more stroke leaf nodes 774 (optionally, the stroke data may be stored as a property of the underline node 772 or another appropriate node).

Additionally, in order to maintain the electronic ink underline stroke 752 with this individual word "green" wherever it appears in the electronic document 750 (e.g., should the word move for any reason), data is saved in the data structure 760 of this example to indicate that the underline context node 772 (e.g., a "source" context node in this linking example) is linked to the text word node 768e for the word "green" (a "destination context" node in this example) as illustrated in FIG. 7B by arrow 776, and data is saved to indicate that the text word node 768e is linked by the underline node 772, as indicated by arrow 778. This linking "anchors" the underline node 772 to the text word node 768e (e.g., an "anchor" type link). Accordingly, if for any reason data stored in the text word context node 768e indicates that a position of the word "green" has changed in the electronic document, the links 776 and 778 will allow the application program to detect that, if possible, it should move the rendering of the underline annotation to the location and/or spatial position of text word context node 768e in the changed electronic document. As another example, should the "bounding box" data, word width data, or other data stored in context node 768e indicate a word size or position change for any reason (e.g., due to font size change, addition of characters, deletion of characters, change in characters, etc.), the application program then may alter the size of the rendered underline (e.g., stretched or truncated), if possible, to correspond to the new size associated with the text word represented by context node 768e. If applicable, systems and methods according to at least some examples of the invention may break up the annotation's stroke(s) to appear on more than one line, should changes to the underlying document cause the annotated document element to appear on multiple lines (e.g., because of words added, hyphenation, or the like). Also, any suitable linking arrangement between nodes or any suitable data representing a link may be used without departing from the invention.

Figure 8A:
Figure 8B:
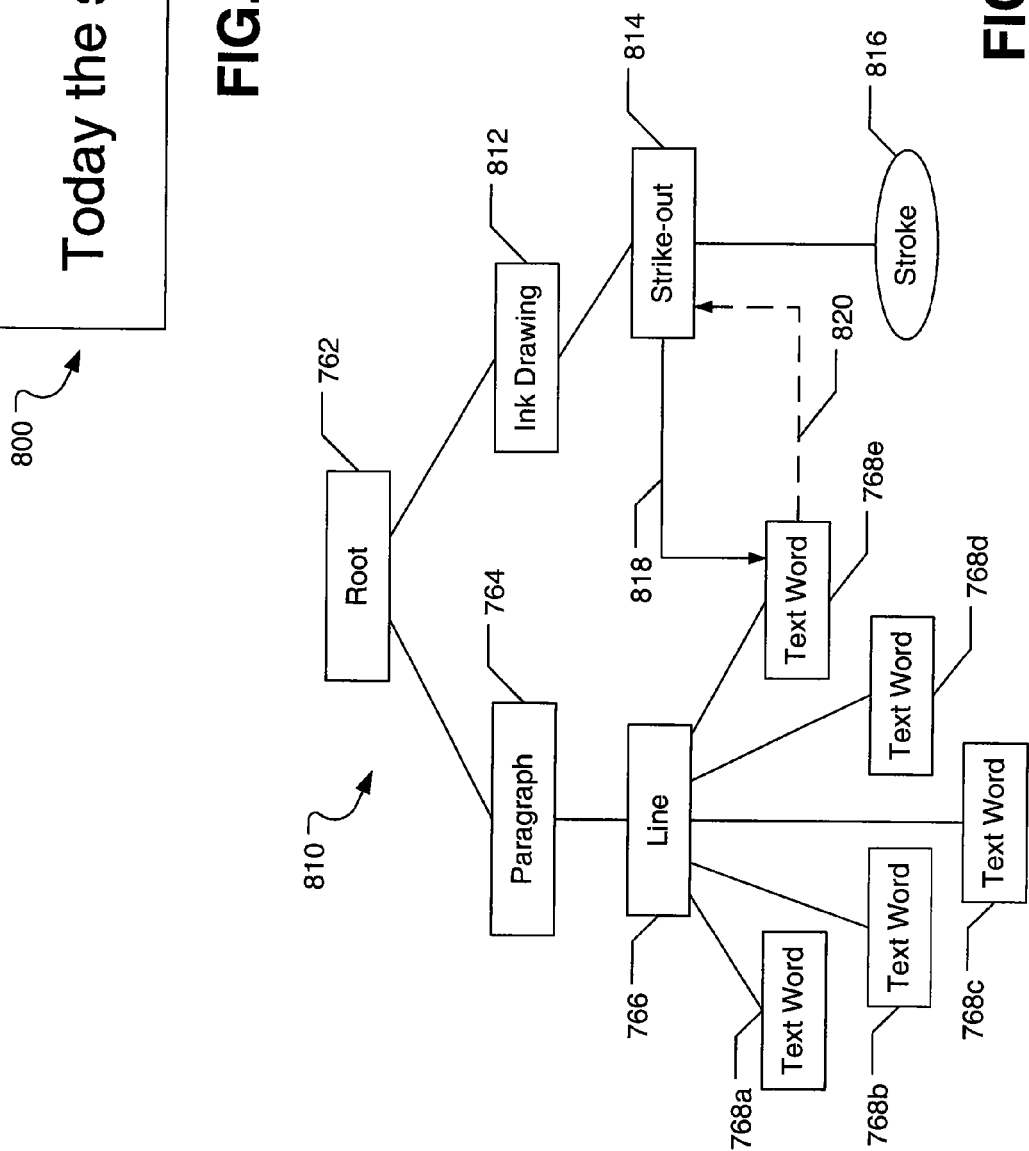

FIGS. 8A and 8B illustrate another annotation example. In this example, as illustrated in FIG. 8A, the electronic document 800 again includes the sentence "Today the sky is green," but in this instance, a user of a pen-based computing system has annotated the document 800 using electronic ink to strike out the word "green" (the strike-out is shown at reference number 802). FIG. 8B illustrates an example hierarchical data structure 810 corresponding to this composite electronic document 800 once it is fully parsed (because the specific context nodes for much of FIG. 8B correspond to the context nodes present in FIG. 7B, the same reference numbers as those present in FIG. 7B are used in FIG. 8B, and the duplicative explanation is omitted). In this instance, the parser will note the presence of data in the electronic document 800 relating to the annotation 802, and it will classify this data as an electronic ink drawing (ink drawing node 812). Additionally, based on the location and position of the ink drawing stroke(s) with respect to the content of the underlying typewritten text in the document 800 (e.g., the strike-out horizontally spans the text word), the parser will recognize and classify the annotation as a "strike-out" annotation and generate a strike-out node 814. Additionally, the parser will store all stroke data corresponding to the actual ink stroke(s) of the strikeout annotation in one or more stroke leaf nodes 816 (or alternatively, as a property in the strike-out node 814 or another appropriate node).

As was the case with respect to the underline annotation described with respect to FIGS. 7A and 7B, the strike-out annotation may be maintained with this individual word "green," should the word move for any reason. Again, this may be accomplished, for example, by saving data in the data structure 810 to indicate that the strike-out context node 814 (the "source" context node in this example) is linked to the text word node 768e for the word "green" (the "destination" context node in this example), as illustrated in FIG. 8B by arrow 818, and by saving data in the data structure to indicate that the text word node 768e is linked by the strike-out node 814, as indicated by arrow 820. The link type in this example is a "horizontally spanning" link type that anchors the strike-out node 814 to the text word node 768e. Accordingly, if for any reason data stored in the text word context node 768e indicates that a position and/or size of the word "green" (or other word(s) associated with node 768e) has changed in the electronic document 800, the links 818 and 820 will allow the application program to detect that, if possible, it should adjust the rendering of the strikeout and/or adjust its size (if possible) to a location, spatial position, and/or size of the word stored in context node 768e in the changed electronic document. Again, any suitable linking arrangement between nodes or any suitable data representing a link may be used without departing from the invention.

Figure 9A:
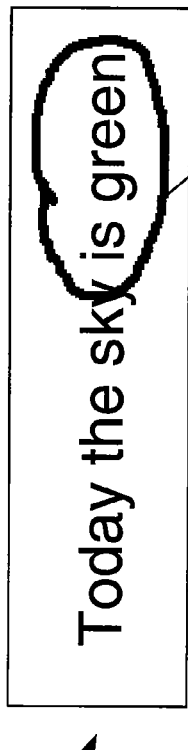
Figure 9B:
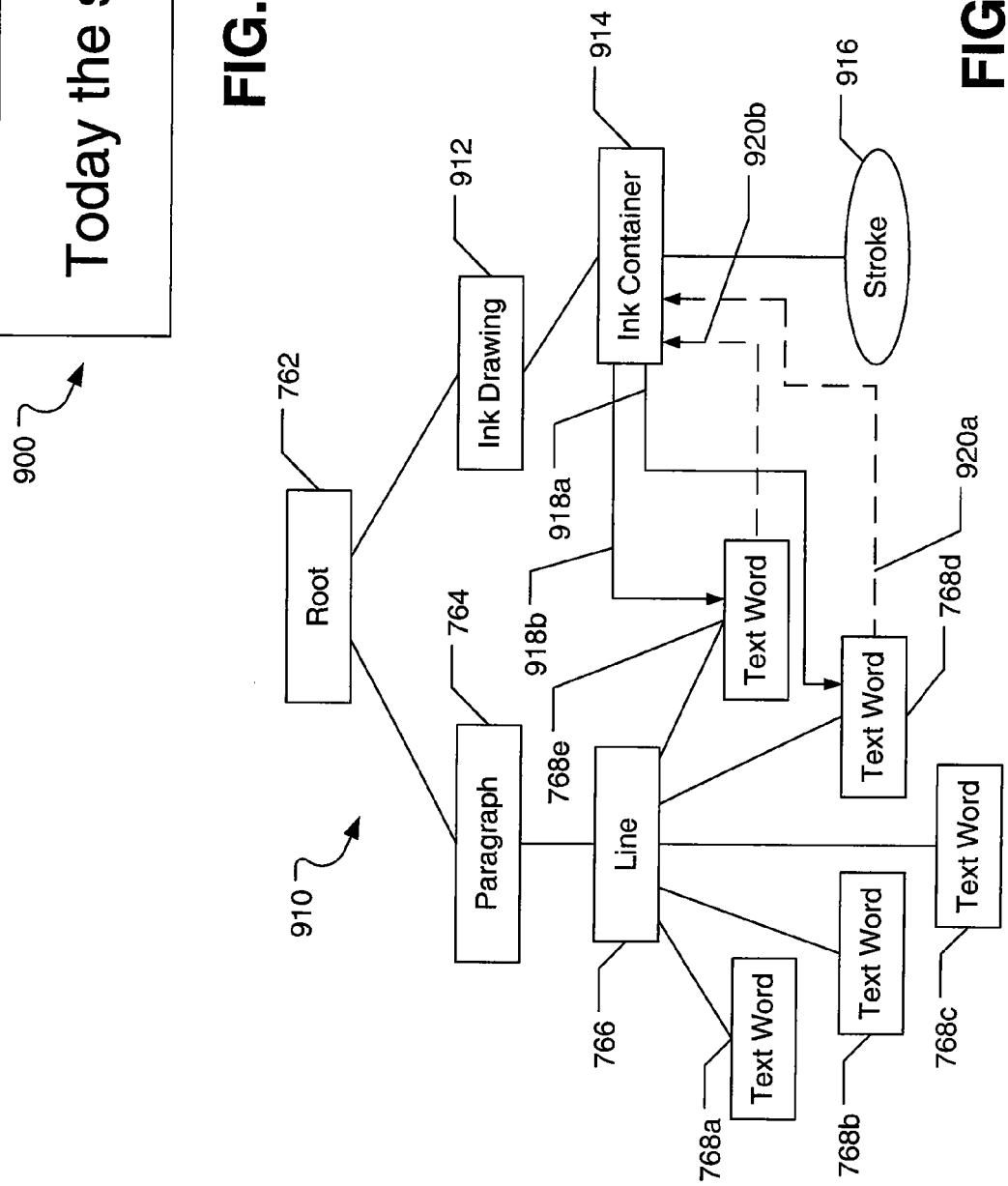

FIGS. 9A and 9B illustrate another example of a type of annotation and further demonstrate association or linking annotations with more than a single text word. In the example illustrated in FIGS. 9A and 9B, the electronic document 900 again includes the sentence "Today the sky is green," but in this instance, a user of a pen-based computing system has annotated the document 900 using electronic ink to circle the words "is green" (the circle or "container" type annotation is shown at reference number 902 in FIG. 9A). FIG. 9B illustrates an example hierarchical data structure 910 corresponding to this composite electronic document 900 once it is fully parsed (because the specific context nodes for much of FIG. 9B correspond to the context nodes present in FIG. 7B, the same reference numbers as those present in FIG. 7B are used in FIG. 9B, and the duplicative explanation is omitted). In this instance, the parser again will note the presence of data in the electronic document 900 relating to the annotation 902, and it will classify this data as an electronic ink drawing (ink drawing node 912). Additionally, based on the location and position of the ink drawing stroke(s) with respect to the content of the underlying typewritten text in the document 900, the parser will recognize and classify the annotation as a "container" annotation and generate an ink container node 914 in the data structure 910. Additionally, the parser will store all stroke data corresponding to the actual ink stroke(s) of the container annotation in one or more stroke leaf nodes 916 (or alternatively, as a property of the ink container node or another appropriate node).

As was the case with respect to the underline and strikeout annotations described with respect to FIGS. 7A through 8B, the container annotation may be maintained with the words "is green," should these words move for any reason. Again, this may be accomplished, for example, by saving data in the data structure 910 to indicate that the ink container context node 914 (the "source" context node in this example) is linked to each of the text word nodes 768d and 768e for the words "is green" ("destination" context nodes in this example), as illustrated in FIG. 9B by arrows 918a and 918b. Additionally, data may be saved in the data structure 910 to indicate that the text word nodes 768d and 768e are linked by the container node 914, as indicated by arrows 920a and 920b in FIG. 9B. This link is a "containment" type link. Accordingly, if for any reason data stored in the text word context nodes 768d and 768e indicate that a position and/or size of the words "is green" (or other word(s) associated with these context nodes) have changed in the electronic document 900, the links 918a, 918b, 920a, and 920b will allow the application program to detect that, if possible, it should adjust the rendering of the container annotation and/or its size to a location, spatial position, and/or size of the words stored in context nodes 768d and 768e in the changed electronic document. Additionally, if a user adds words between the words "is" and "green," or if the words or characters are removed or changed in any manner, the application program may alter the size and/or location of the container annotation to accommodate these changes. Again, other linking arrangements or data indicating a link may be stored without departing from the invention.

FIGS. 10A and 10B illustrate another type of annotation commonly used, specifically a "margin comment" type annotation. In this example, as illustrated in FIG. 10A, a user has annotated an electronic document 1000 containing the sentence "Today the sky is green" with an electronic ink margin comment 1002 stating: "it's not green!" Notably, in this instance, as shown in FIG. 10B, the data structure 1010 associated with the typewritten text has changed because this text is present in two lines in electronic document 1000 (rather than the single line shown in FIGS. 7A, 8A, and 9A). Accordingly, the data structure 1010 has two line nodes 1012 and 1014, and the first line node 1012 includes text word nodes 768a and 768b (associated with the words "Today" and "the") and second line node 1014 includes text word nodes 768c, 768d, and 768e (associated with the words "sky," "is," and "green.").

Once the composite electronic document 1000 is fully parsed, the parser will recognize the annotation 1002 as containing electronic ink text, and it will classify this annotation (e.g., due to its location in the margin of the document 1000) as a "margin comment" type annotation. Accordingly, the parser will generate an appropriate context node 1016 for a margin comment. Because this margin comment 1002 contains only electronic ink text, the parser further generates a paragraph node 1018, two line nodes 1020 and 1022, and the appropriate ink word nodes 1024, 1026, 1028 and stroke nodes 1030, 1032, and 1034 associated with the electronic ink's hierarchical structure (as previously noted, optionally and alternatively, the ink stroke data may be stored as properties of the ink word node(s) and/or the line nodes may be omitted from the data structure 1010).

A different linking relationship is illustrated in the example of FIGS. 10A and 10B. Specifically, in this example, based on the location and orientation of the margin comment 1002 with respect to the page margins and the underlying document content, the parser will save data in the data structure 1010 indicating that the paragraph node 1018 associated with the margin comment 1002 (the "source" context node in this example) is linked to the paragraph node 764 associated with the typewritten text (the "destination" context node in this example), as illustrated in FIG. 10B by arrow 1036. Additionally, the parser will save data in the data structure 1010 to indicate that the paragraph node 764 associated with the typewritten text is linked by the paragraph node 1018 of the margin comment 1002, as illustrated by arrow 1038. This is an "anchored" type linking arrangement in which the ink paragraph is anchored to the text paragraph. In this manner, wherever the typewritten paragraph moves within electronic document 1000, the links 1036 and 1038 will allow the application program to detect that, if possible, it should move the margin comment 1002 to remain in the margin adjacent to the linked typewritten paragraph, even, optionally, if additional lines and/or words are added to the paragraph, and/or if lines and/or words are removed from the paragraph, and/or if other changes are made within the paragraph or electronic document 1000. Of course, other linking arrangements or data associated with the links may be stored without departing from the invention. For example, the margin comment node 1016 may be linked to one or more individual text word nodes of the typewritten paragraph, such as the first text word node 768a.

FIGS. 11A and 11B illustrate a somewhat more complex example of an annotation recognizable by systems and methods according to at least some examples of this invention. In the illustrated example, the electronic document 1100 again includes the phrase "Today the sky is green," but in this instance, the user has annotated the electronic document 1100 using a combination of different annotation types. Specifically, the user has drawn a container type annotation 1102 encircling the word "green," a margin comment type annotation 1104 containing the electronic ink word "Blue!," and a connector type annotation 1106 (e.g., an arrow in this example) pointing from the container type annotation 1102 to the margin comment annotation 1104.

Because of the relative position and spatial orientation of the various annotation types with respect to the underlying document, the typewritten document text, and the document's margins, the parser system according to at least some examples of this invention will recognize the various annotation types, their content, and their relationship to one another and to the electronic document typewritten text as generally described above. An example hierarchical data structure 1110 for electronic document 1100 generated by the parser is shown in FIG. 11B. Because the hierarchical structure for the typewritten text is the same as that described above in FIG. 7B, the same reference numbers are used for this structure in FIG. 11B, and the detailed explanation is omitted. Also, as illustrated in FIG. 11B, the node chain 1112 for the ink container type annotation 1102 is similar to that illustrated in FIG. 9B, and the node chain 1114 for the margin comment type annotation 1104 is similar to that illustrated in FIG. 10B. Accordingly, detailed description of these node chains is not included.

To maintain the spatial position of the annotations with the appropriate portion and spatial location of the underlying text, various links between the annotation nodes and with the appropriate text node are provided by the parser and stored in the data structure 1110. In the illustrated example, the ink container node 1116 (the "source" context node here) is linked to the text word node 768e of the word that it contains (i.e., the "destination" node corresponding to the word "green" in this example), as illustrated in FIG. 11B by arrow 1118. Similarly, data is stored in the data structure 1110 indicating that text word node 768e is linked by ink container node 1116, as indicated in FIG. 11B by arrow 1120. This is a "container" type linking arrangement.

As noted above, the parser according to this example of the invention further recognizes that the electronic document 1100 includes an ink drawing 1106 corresponding to an ink connector (i.e., the arrow between the container annotation 1102 and the margin comment annotation 1104 in this example). This connector annotation 1106 is stored in the data structure 1110 as an ink drawing (represented by ink drawing node 1122), which contains a node indicating the annotation type (an ink connector node 1124, in this example), which further includes data indicating the stroke or strokes making up the connector (e.g., in stroke node(s) 1126 or in a property associated with ink connector node 1124 (or another suitable node)). Furthermore, information is stored in the data structure 1110 to indicate that the ink connector node 1124 (the "destination" node in this example) is pointed from the ink container node 1116 (the "source" node in this example). This link (a "points from" type link) is represented in FIG. 11B by arrow 1128. Additionally, the data structure 1110 further includes data to indicate that the ink connector node 1124 (the "source" context node in this example) is linked to the ink word node 1132 (the "destination" context node in this example). This link (a "points to" type link) is represented in FIG. 11B by arrow 1134. Alternatively, the ink connector node 1124 could be linked with any one of the ink line node, the ink paragraph node, or the margin comment node of node chain 1114 without departing from the invention. With the specific links described above, the data structure 1110 indicates that the ink connector 1106 points from the circle drawing 1102 and points to the ink word, as illustrated in FIG. 11A. These various links allow the application program to detect the association between the underlying document and the various annotation components. Then, if possible, the application program can move the annotation elements to appropriately correspond to movements in the underlying document. Any suitable linking arrangement or data associated with a link may be used without departing from the invention.

Figure 12B:
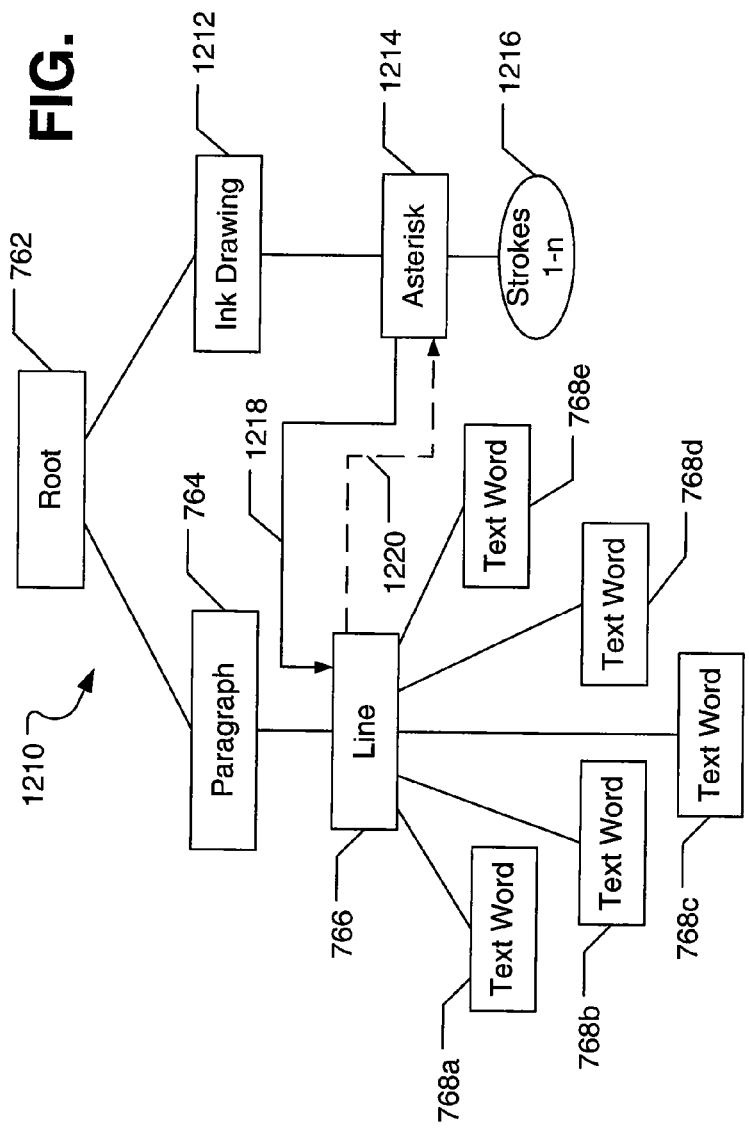
Figure 12A:
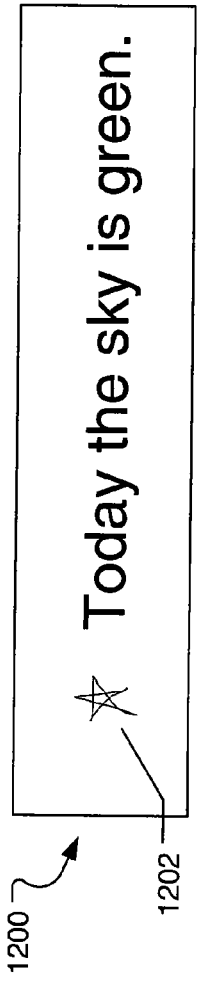

FIGS. 12A and 12B illustrate another example of a commonly used annotation feature. In this example, as illustrated in FIG. 12A, the electronic document 1200 again includes the sentence "Today the sky is green," but in this instance, a user of a pen-based computing system has annotated the document 1200 using electronic ink to place a star or an asterisk near the first word of the sentence (the annotation is shown at reference number 1202). FIG. 12B illustrates an example hierarchical data structure 1210 corresponding to this composite electronic document 1200 once it is fully parsed (because the context nodes for much of FIG. 12B correspond to the context nodes present in FIG. 7B, the same reference numbers as those present in FIG. 7B are used in FIG. 12B, and the duplicative explanation is omitted). In this instance, the parser will note the presence of electronic ink data relating to the annotation, and it will classify this data as an ink drawing (ink drawing node 1212). Additionally, based on the ink stroke shape as well as the location and position of the ink stroke(s) of the annotation 1202 with respect to the content of the underlying document 1200 (e.g., along side the line of typewritten text), the parser will recognize the annotation as an "asterisk," "bullet," or anchor type annotation and generate an asterisk node 1214. Additionally, the parser will store all stroke data corresponding to the actual ink stroke(s) of the asterisk in one or more stroke leaf nodes 1216 or in a property of the asterisk node (or some other node).

In this example, the asterisk type annotation 1202 may be maintained with the entire line of typewritten text wherever that line appears in the electronic document 1200, should the typewritten text move for any reason. This may be accomplished, for example, by storing data in the data structure 1210 to indicate that the asterisk context node 1214 (the "source" context node in this example) is linked to the text line node 766 (the "destination" context node in this example), as illustrated in FIG. 12B by arrow 1218, and by storing data to indicate that the text line node 766 is linked by the asterisk node 1214, as indicated by arrow 1220. Accordingly, if for any reason data stored in the text line context node 766 indicates that a position or location of the line has changed in the electronic document 1200, the links 1218 and 1220 will allow the application program to detect that, if possible, it should adjust the rendering of the asterisk to a location and/or spatial position corresponding to the rendering of data associated with the context node 766 in the changed electronic document. Alternatively, if desired, the parser could tie the asterisk node 1214 (or other suitable node associated with the asterisk annotation) to the paragraph node 764 or one of the individual word nodes (e.g., word node 768a) without departing from the invention. Also, if desired, the ink drawing node 1212 may be the source node anchored to the line node 766 (or other suitable node corresponding to the typewritten text in this example). Any suitable linking arrangement or data representing a link may be used without departing from the invention.

Figure 13A:
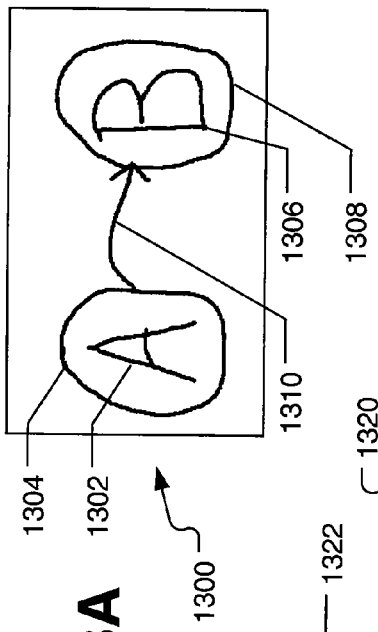
FIGS. 13A through 14B illustrate example electronic documents and associated example data structures useful in processing electronic flow chart features in electronic documents.
Figure 13B:
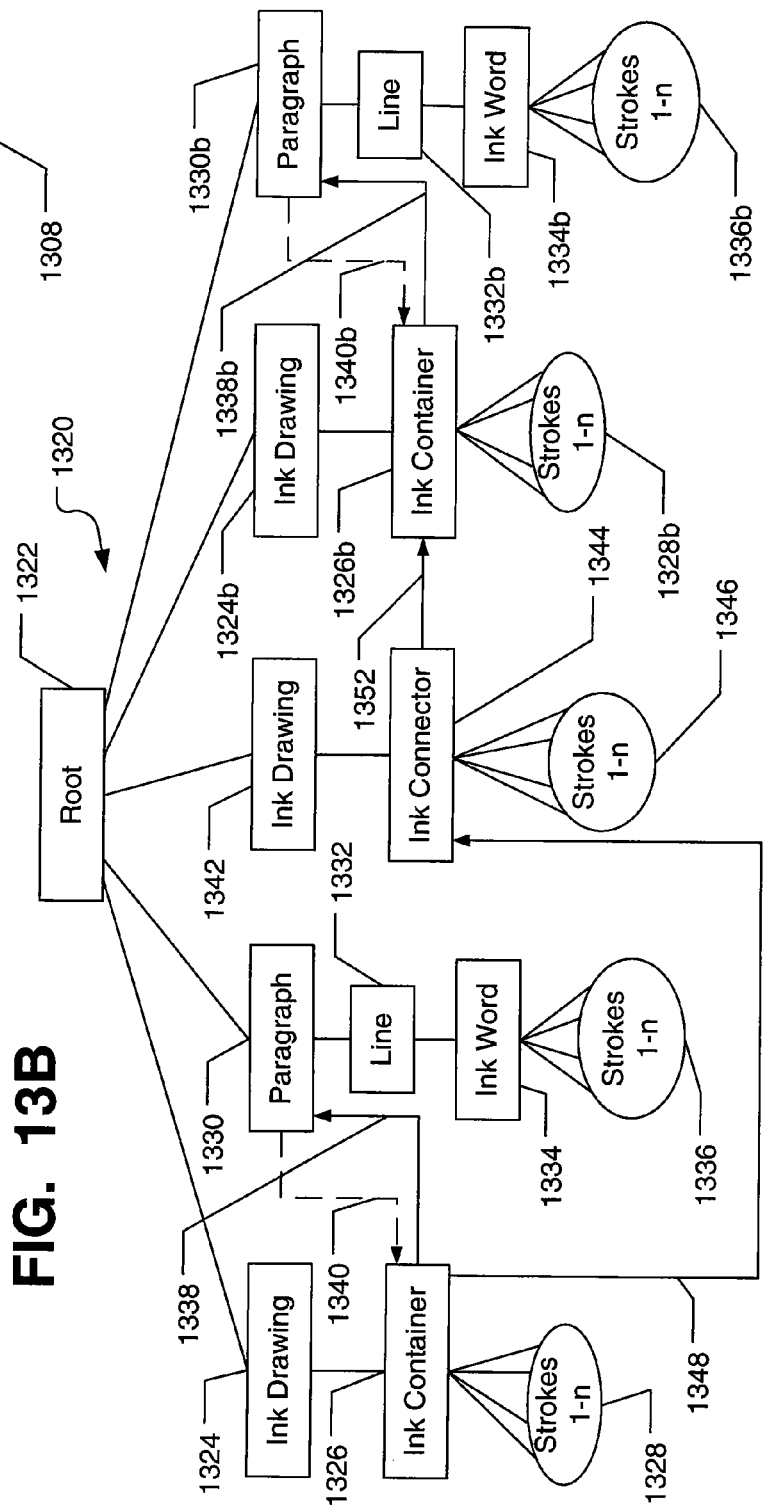

A "flow chart" type of linked annotation is illustrated with the aid of FIGS. 13A and 13B. In this example, the electronic document 1300 includes a flowchart, which optionally may be included as part of an annotation in an overall larger electronic document. As illustrated in FIG. 13A, the annotation or flow chart includes a first ink entry 1302 (the letter "A" in this example) encircled or enclosed by a first container annotation 1304 and a second ink entry 1306 encircled or enclosed by a second container annotation 1308. Additionally, a connector annotation 1310 (an arrow in this example) extends from the first container annotation 1304 to the second container annotation 1308. It should be appreciated, however, that relationships between document elements can be represented in alternate ways other than links. For example, these relationships can be represented in the structure of the data tree itself through, e.g., the use of container nodes that contain associated document elements.

FIG. 13B illustrates an example data structure 1320 that may be associated with the flow chart annotation of the electronic document 1300 in FIG. 13A once fully parsed. In this example data structure 1320, a root node 1322, which may correspond to all or some portion of the electronic document 1300, is provided as the parent node to nodes within the flow chart type annotation. A first context node relating to the specific annotation structures is the ink drawing node 1324 corresponding to the ink container 1304. An ink container node 1326 is provided as a child node to ink drawing node 1324, and the specific stroke(s) associated with the ink container annotation 1304 are stored in leaf node(s) 1328 or as properties to the ink container node 1326 (or other node).

As noted above with respect to FIG. 13A, the annotation further includes electronic ink text corresponding to the letter "A" 1302. As common with other electronic ink text described above, the electronic ink associated with this ink text is stored in the hierarchical data structure 1320 as a paragraph node 1330, which contains a line node 1332, which contains an ink word node 1334, which optionally contains one or more leaf nodes 1336 corresponding to the individual strokes in the ink text annotation or a property including the stroke data. Information stored in the data structure 1320 indicates that the ink container node 1326 of the container annotation 1304 (the "source" node) is linked to the paragraph node 1330 of the letter "A" (the "destination" context node), as illustrated in FIG. 13B by arrow 1338. Alternatively, if desired, the ink word node 1334 or line node 1332 could serve as the destination node. Additionally, information stored in the data structure 1320 also indicates that the paragraph node 1330 is linked by the ink container node 1326, as indicated in FIG. 13B by arrow 1340. Because the data structure for the ink container 1308 and the letter "B" 1306 of the annotation in this example share the same general structure as that for the ink container 1304 and the letter "A" 1302, including the same general linking structure, the various nodes in the data structure 1320 for the letter "B" 1306 and its associated container 1308 share the same reference numbers as those associated with the letter "A" and its container, but the letter "b" follows the reference numbers for ink container 1308 and ink word 1306 in FIG. 13B. Of course, the various hierarchical arrangement and linking structure or linking data could differ from that specifically described above without departing from the invention.

The annotation further includes a connector annotation 1310, represented in the data structure 1320 by an ink drawing node 1342. As described above in connection with FIG. 11B, the data structure for an ink drawing representing an ink connector annotation further may include an ink connector node 1344, which further may include one or more properties or leaf node(s) 1346, that include data associated with the specific stroke(s) that make up the connector 1310. To complete the annotation data structure of this example, data associated with the ink connector annotation 1310 (the source node) is linked to data associated with the two container annotations 1304 and 1308 (destination nodes). Specifically, as shown in the example of FIG. 13B, information is stored in the data structure 1320 to indicate that the ink connector node 1326 is linked to the ink connector node 1344 (represented by arrow 1348) as a "points from" annotation type. Additionally, information is stored in the data structure 1320 to indicate that the ink connector node 1344 is linked to the ink container node 1326*b* (represented by arrow 1352) as a "points to" annotation type. In this manner, data stored relating to the links indicates that the connector 1310 points from the circle container 1304 to the circle container 1308, as illustrated in FIG. 13A. Thus, the existence of the various links will allow movement of one part of the annotation in the electronic document 1300 to be followed by the other parts of the annotation, to thereby keep the annotation intact even if the electronic document 1300 changes in some manner. Of course, this overall structure also could be linked to some underlying document element as described above, without departing from the invention.

Similarly, an annotation may involve two enclosers connected by a connector with a written comment, such as, e.g., "switch these!" If one part of the annotation is moved, it might need to move independently of the other part of the annotation, such as when words are inserted between the two enclosers. The links between the context nodes representing the electronic ink annotations and the nodes representing the non-ink content can be used by a software application to relocate the pieces of the annotation and then tie them back together when the positioning operation is complete.

Figure 14A:
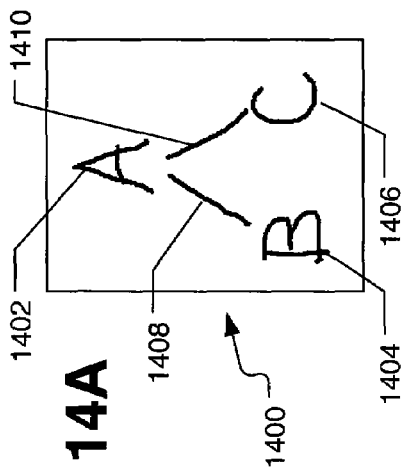
Figure 14B:
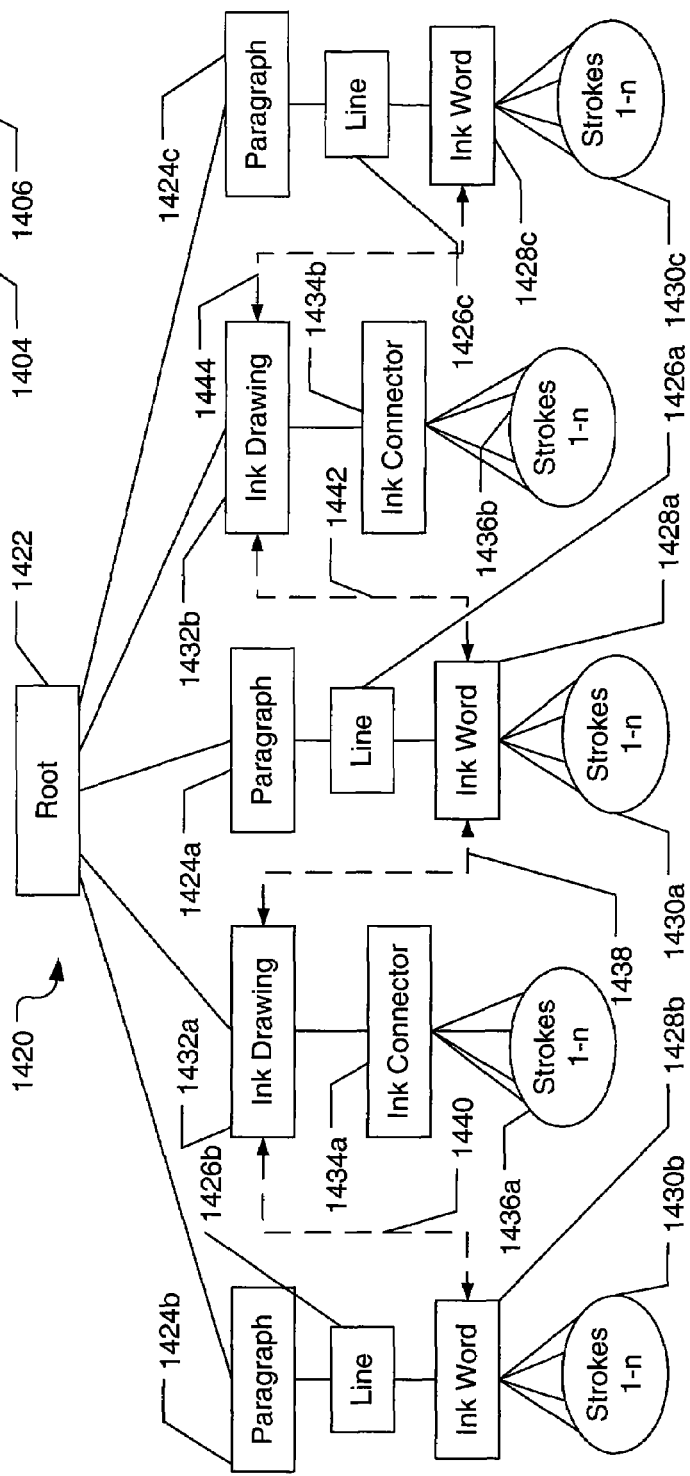

FIGS. 14A and 14B illustrate another example of an electronic document 1400 having a flow chart type annotation or ink structure. In this example, the electronic ink annotation for the letter "A" 1402 is connected to electronic ink annotations for the letters "B" 1404 and "C" 1406, with electronic ink connectors 1408 and 1410 between the letters "A" and "B" and "A" and "C," respectively.

An example data structure 1420 for electronic document 1400 after parsing is illustrated in FIG. 14B. Data relating to the entire electronic document or some portion thereof may be stored in the parent root node 1422. Data corresponding to the electronic ink words "A," "B," and "C" have the same paragraph node (1424*a*, 1424*b*, 1424*c*), line node (1426*a*, 1426*b*, 1426*c*), ink word node (1428*a*, 1428*b*, 1428*c*), and stroke node(s) (1430*a*, 1430*b*, 1430*c*) structure as used in several figures above. Repetitive description of these nodes will be omitted. Likewise, the ink connectors have the ink drawing node (1432*a*, 1432*b*), ink container node (1434*a*, 1434*b*), and stroke node(s) (1436*a*, 1436*b*) structure used in FIGS. 1B and 13B above, so the repetitive description is omitted. Of course, variations in these specific data structures, including the possible variations described above, may be used without departing from the invention.

To complete the annotation data structure of this example, data associated with the ink connector annotation 1408 is linked to data associated with the two ink word annotations 1402 and 1404 that it connects, and data associated with ink connector annotation 1410 is linked to data associated with the two ink word annotations 1402 and 1406 that it connects. Specifically, as shown in the example of FIG. 14B, information is stored in the data structure 1420 to indicate that the ink drawing node 1432*a* (the "source" node) "points to" the ink word nodes 1428*a* and 1428*b* (as represented by arrows 1438 and 1440, respectively). Similarly, information is stored in the data structure 1420 to indicate that the ink drawing node 1432*b* (the "source" node) "points to" the ink word nodes 1428*a* and 1428*c* (as represented by arrows 1442 and 1444, respectively). The ink word nodes 1428*a*, 1428*b*, and 1428*c* serve as "destination" nodes. Because of the various links, movement of one part of the annotation in the electronic document 1400 can be followed by other parts of the annotation, to thereby keep the annotation intact or linked, even if the electronic document 1400 changes in some manner. Also, this annotation can be linked with one or more other elements in the electronic document, such as typewritten text, drawings, images, etc., without departing from the invention.

Figure 15A:
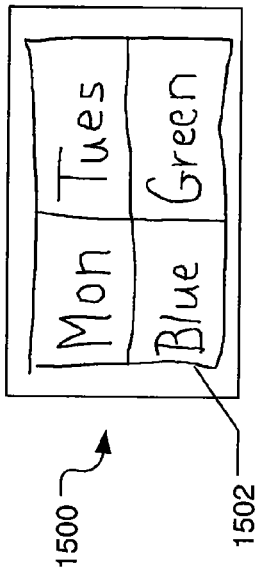
FIGS. 15A through 15C illustrate example electronic documents and associated example data structures useful in processing electronic table features in electronic documents.
Figure 15B:
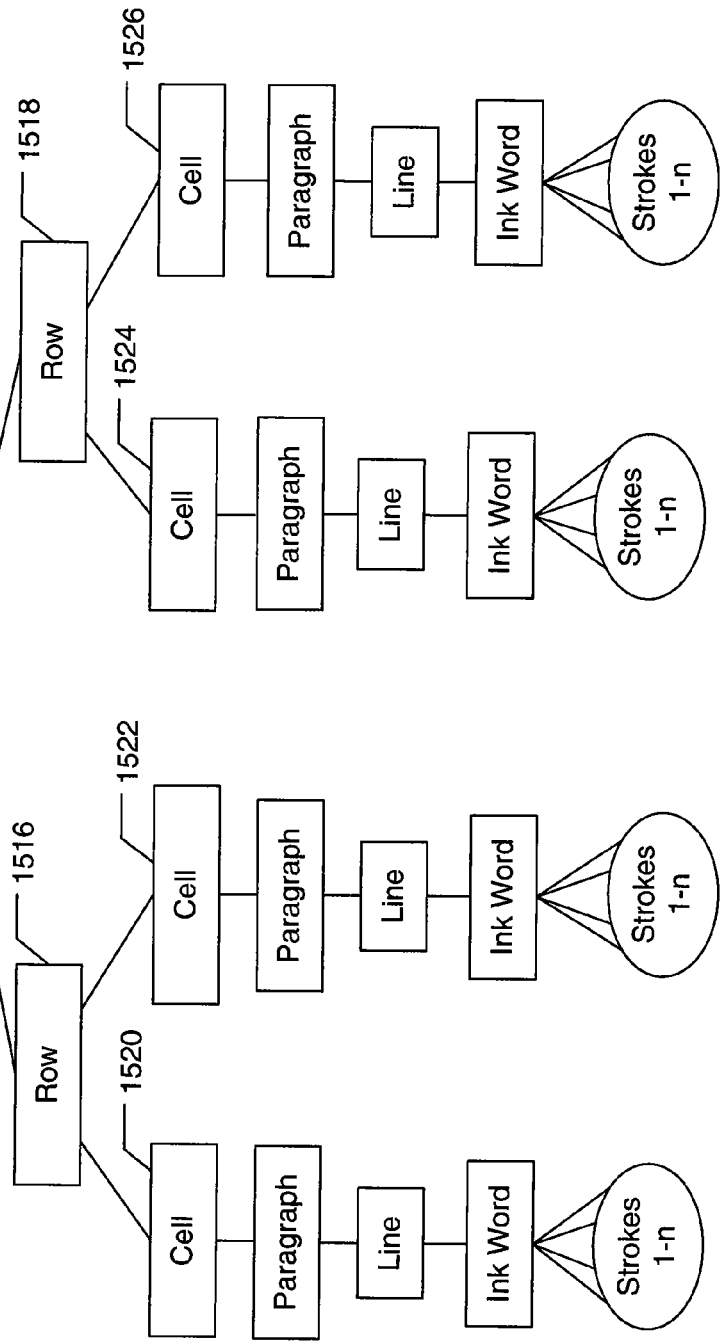
Figure 15C:
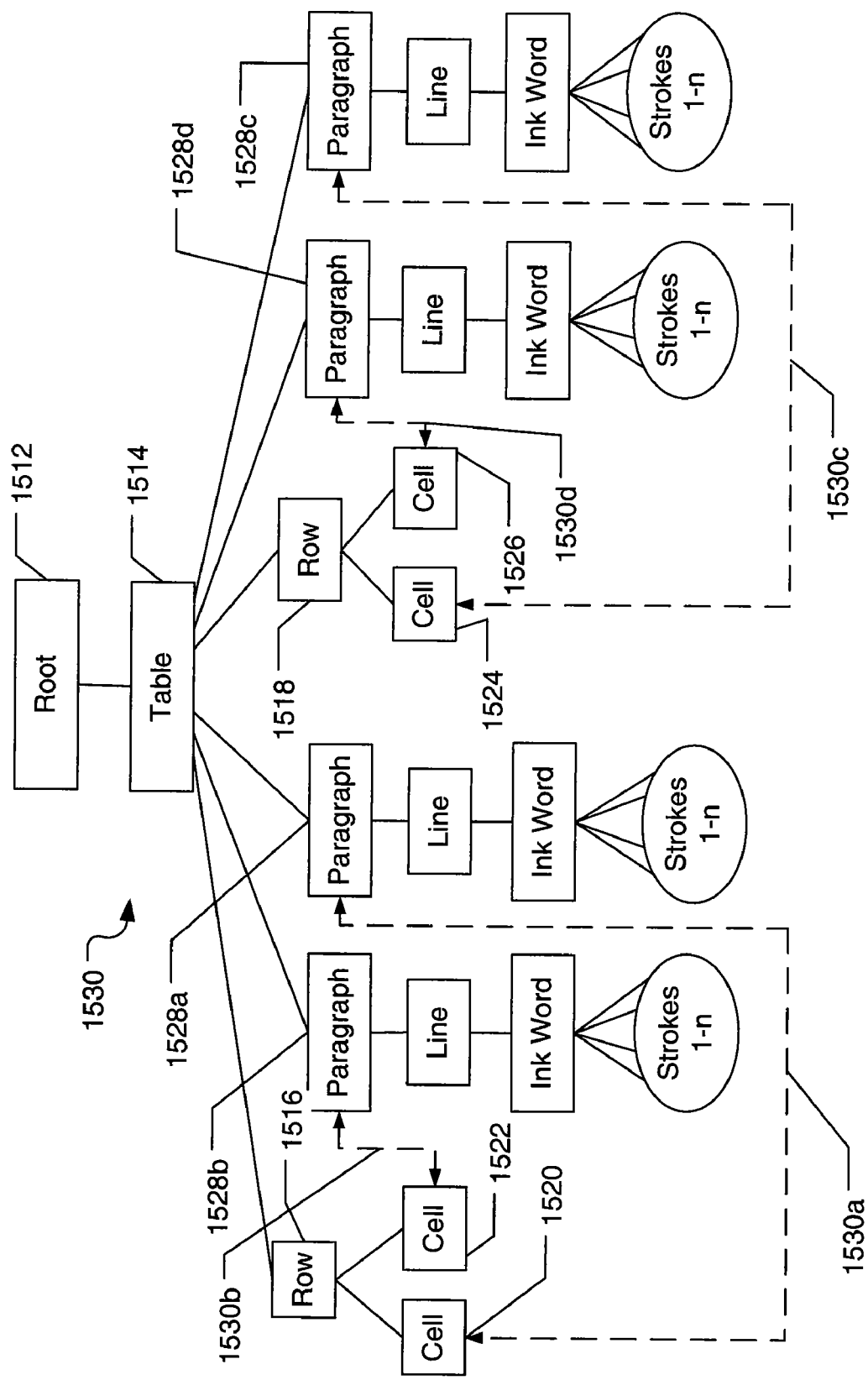
Figure 16A:
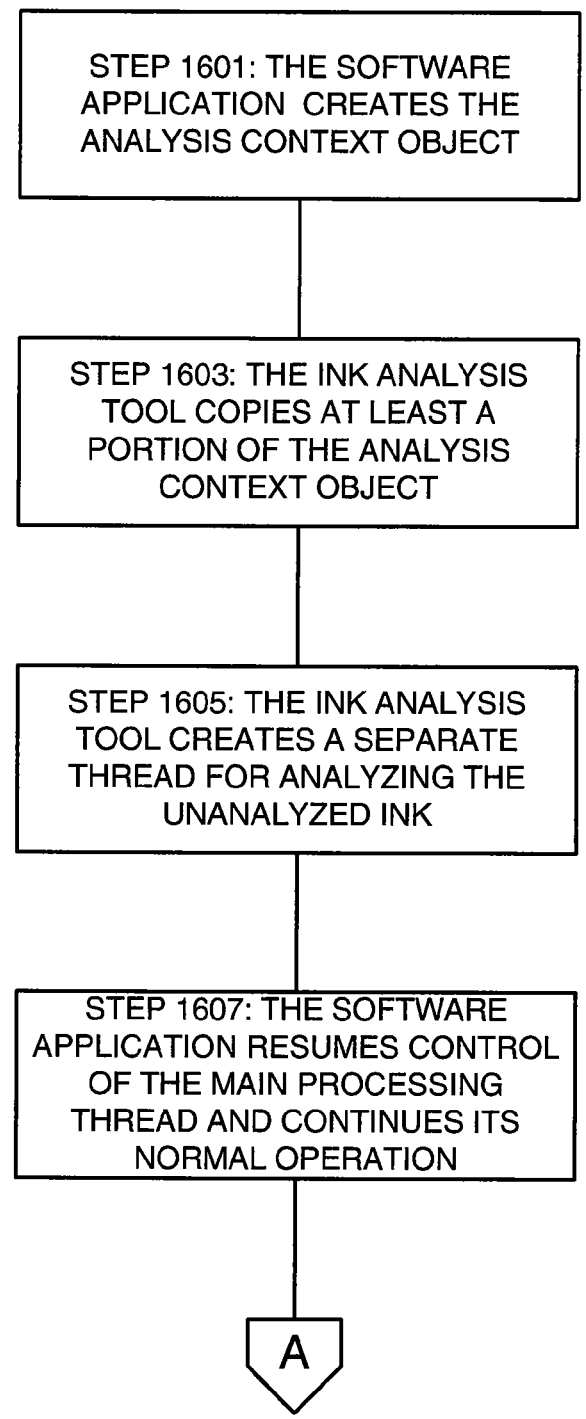
FIGS. 16A-16D illustrate a method of processing electronic ink according to various examples of the invention.
Figure 16B:
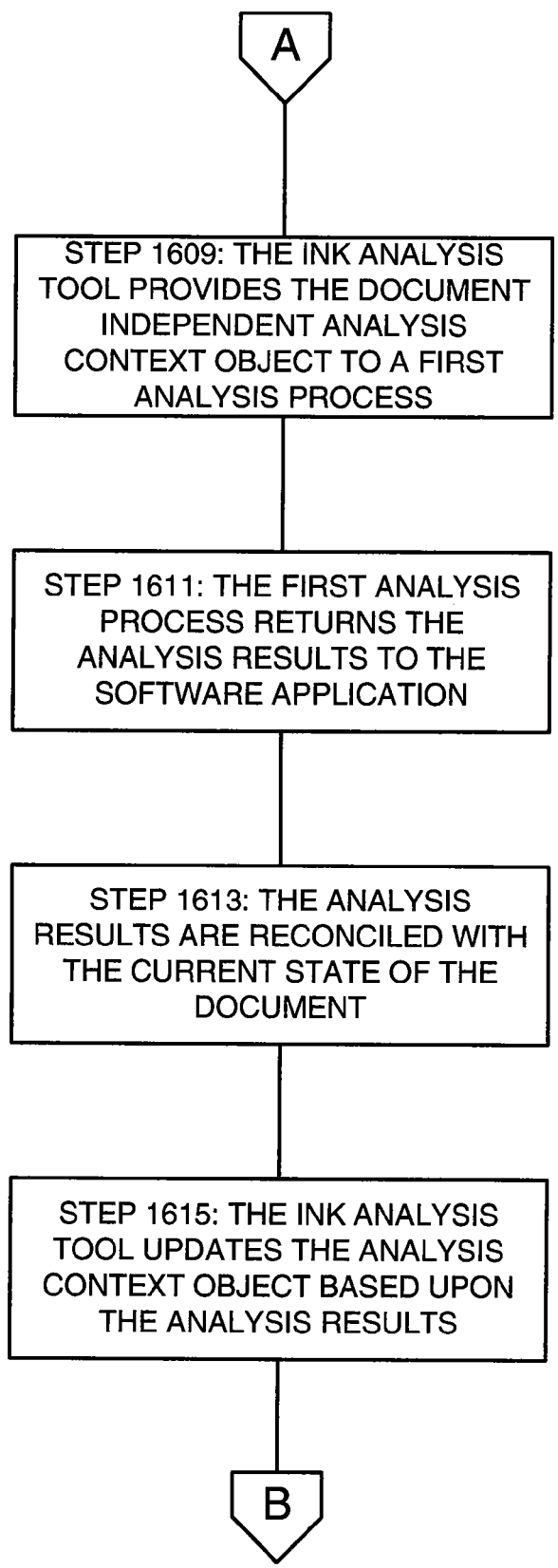
Figure 16C:
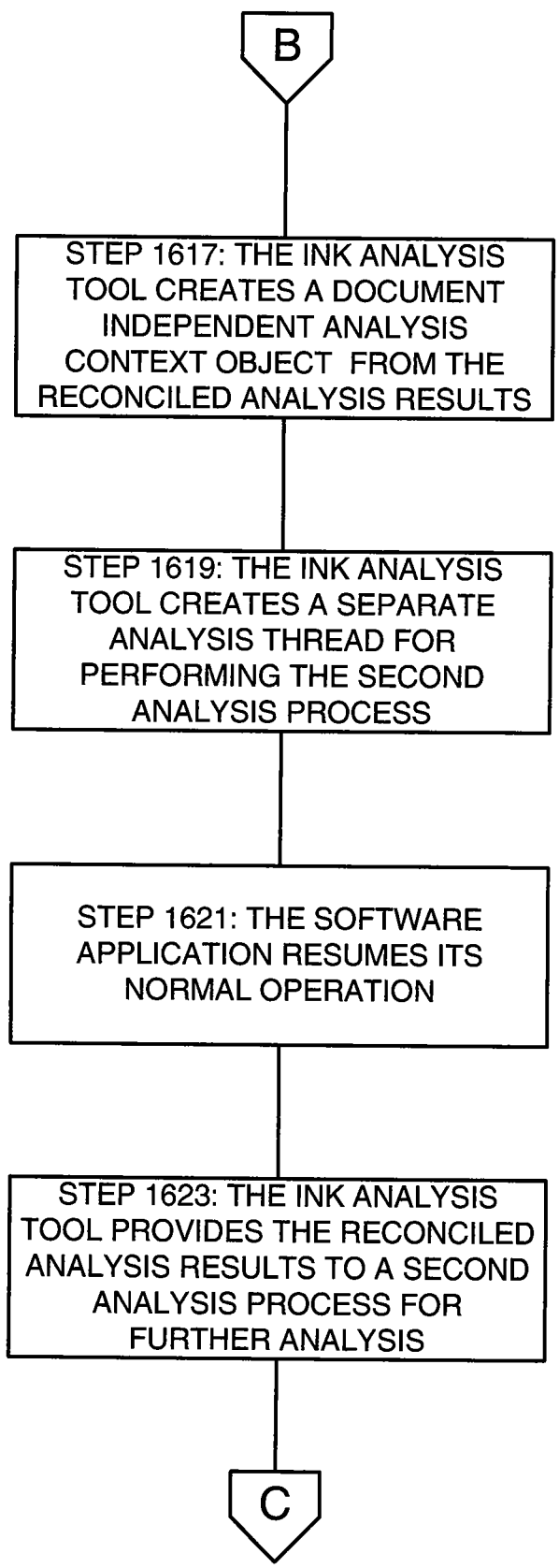
Figure 16D:
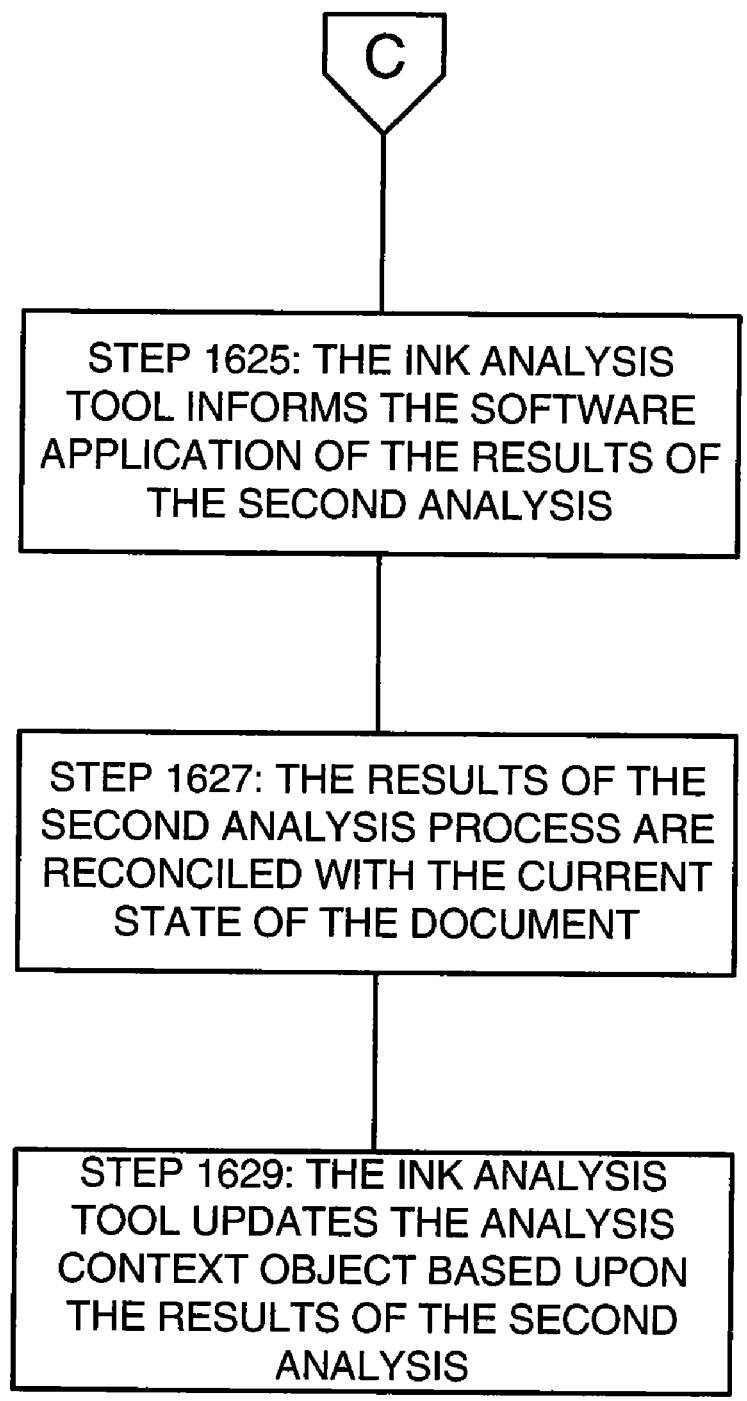

FIGS. 15A through 15C illustrate examples of an electronic document 1500 and example data structures that include an electronic ink annotation in the form of a table having plural rows and columns. Specifically, as illustrated in the example of FIG. 15A, the electronic document 1500 includes a table 1502 with two rows and two columns (making up four total cells), and each cell of the table is made up of electronic ink borders and contains electronic ink text input.

An example data structure 1510 for the electronic ink table 1502 illustrated in FIG. 15A, after complete parsing, is shown in FIG. 15B. In this example, data structure 1510 includes a root node 1512, which may correspond to all or some portion of the electronic document 1500. Under the root node 1512, relevant data relating to the table is stored in the table node 1514. This may include, for example, data indicating the table size, table position, number of rows, number of columns, bounding box size, and the like. Under the table node 1514, separate row nodes are provided for each row of the table (in this example, as illustrated in FIG. 15B, two row nodes 1516 and 1518 are provided). Each row node of this example data structure further includes one or more cell nodes (in the illustrated example, row node 1516 includes two cell nodes 1520 and 1522, while row node 1518 includes two cell nodes 1524 and 1526). Because each cell of this example contains electronic ink text data, the remainder of this example hierarchical data structure 1510 has the familiar paragraph node, line node, ink word node, and stroke node(s) described in detail above. Of course, the table cells could contain one or more other types of data in addition to and/or in place of the electronic ink data, including, for example, typewritten text data and/or any of the various data types described in detail above with respect to FIG. 6I, without departing from this invention. As another alternative, instead of row nodes 1516 and 1518, the data structure may include column nodes, which may then include cell nodes, paragraph nodes, etc., as shown in FIG. 15B. The ink strokes that make up the actual table may be stored, for example, as a part of table node 1514 (e.g., as properties associated with that node), as an ink drawing node that depends from the table node 1514 (with the associated strokes stored thereunder), and/or at any other suitable location in the data structure 1510.

An alternative example data structure 1530 for the electronic document 1500 including table 1502 is shown in FIG. 15C. In this example, the root node 1512; table node 1514; row nodes 1516 and 1518; and cell nodes 1520, 1522, 1524, and 1526 are the same as those illustrated in FIG. 15B. However, rather than include the electronic ink text data as child nodes under the various cell nodes 1520, 1522, 1524, and 1526, the paragraph nodes 1528*a*, 1528*b*, 1528*c*, 1528*d* of the electronic ink text data (or any other suitable or desired data structure) is linked to its respective cell nodes 1520, 1522, 1524, and 1526, as shown in FIG. 15C by arrows 1530*a*, 1530*b*, 1530*c*, and 1530*d*, respectively. The cell nodes in this example may serve as container type "source" nodes for the ink words contained therein, and the ink paragraph, line, or word nodes serve as "destination" context nodes. Because of the various links, movement of one part of the table annotation in the electronic document 1500 can be followed by other parts of the annotation, to thereby keep the table annotation intact or linked, even if the electronic document 1500 changes in some manner. The table also can be linked to some other nodes present based on the underlying electronic document. Again, as an alternative, row nodes 1516 and 1518 may be replaced with column nodes that contain the various cell nodes, without departing from the invention. Also, the ink strokes that make up the actual table may be stored at any location without departing from the invention, for example, as a part of table node 1514 (e.g., as properties associated with that node), as an ink drawing node that depends from the table node 1514 (with the associated strokes stored thereunder), and/or at any other suitable location in the data structure 1510.

Of course, the various figures relating to the various example annotation types described above merely describe examples of possible annotation types, use of annotations, and information that can be included within the annotations. Those skilled in the art will recognize that many modifications and changes can be made without departing from the invention. For example, annotations may contain many different types of data (such as electronic ink text, drawings, images, typewritten text and images, etc.), in many different combinations and permutations without departing from the invention.

Additionally, various linking schemes are described in conjunction with the various data structures described above. Such linking schemes or techniques are merely examples of the manner in which the various data nodes may be linked together. Any suitable linking arrangement or data associated with a link may be stored without departing from the invention. For example, it may be possible to represent each node with an individual identifier (such as a "globally unique identifier," or GUID) and represent the links using GUID pairs (or more). As another alternative, a single link may be used to link nodes rather than the double linking arrangement described with respect to some examples above. As another possible alternative, if necessary or desired, a node may be linked with itself (self-linking, e.g., where the source node and the destination node are the same node). Those skilled in the art will recognize that any suitable manner of linking or associating various data sets with one another may be used without departing from the invention.

Analysis Of Ink

Various example techniques for analyzing electronic ink in an electronic document in accordance with examples of the invention will now be described. In particular, FIGS. 16A through 16E illustrate a flowchart showing steps of analyzing a document according to various examples of the invention. FIGS. 17-26 then illustrate the relationships between different components employed during the analysis process.

Figure 17:
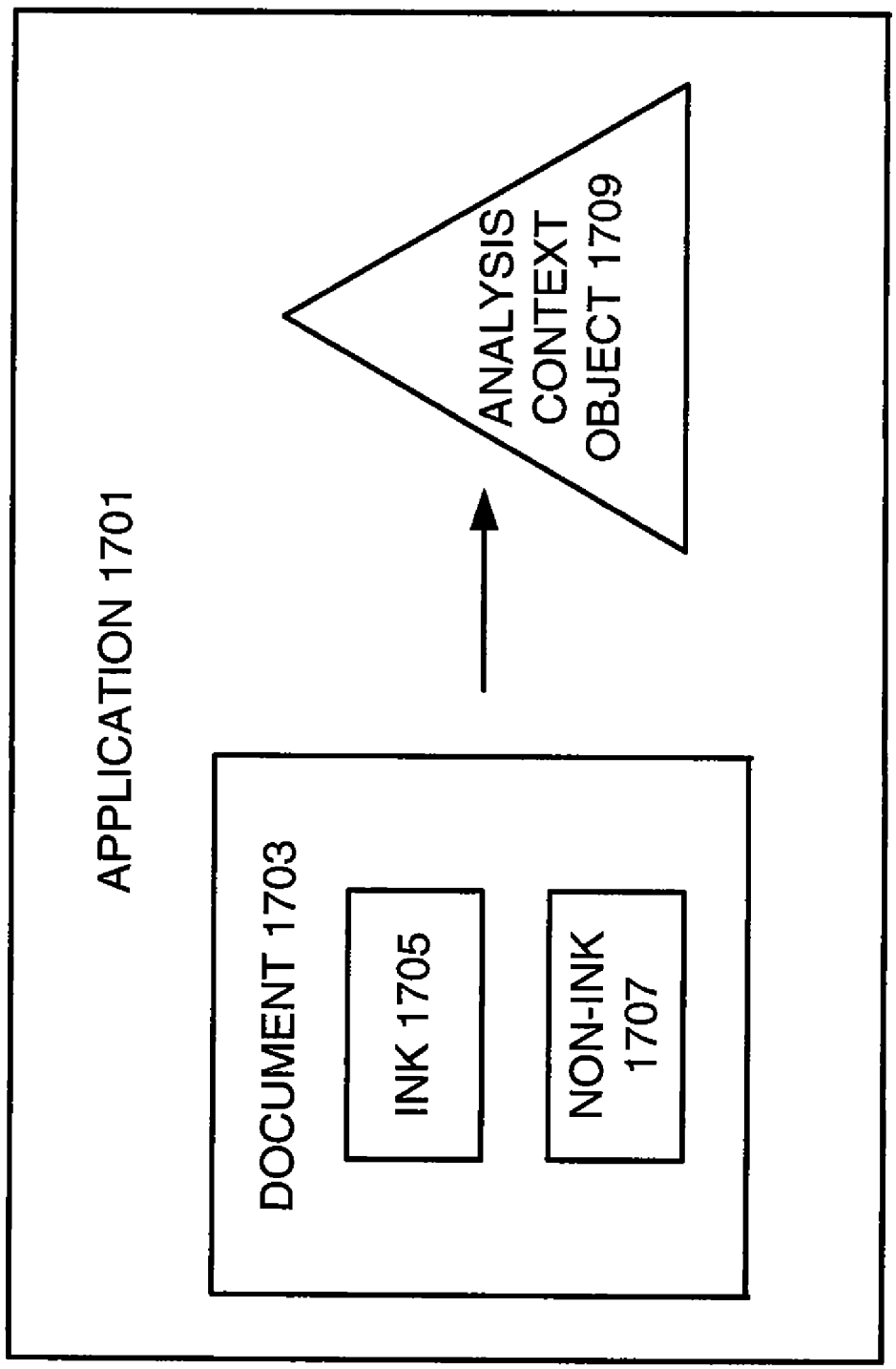
FIGS. 17, 19-21, and 23-26 illustrate the transfer of data objects during example ink analysis processes according to various examples of the invention.

Turning now to FIG. 17, this figure illustrates a software application 1701. The software application 1701 maintains a document 1703, which may include both electronic ink data 1705 and non-ink data 1707, such as typewritten characters or images. As discussed in detail above, properties of both the electronic ink data 1705 and the non-ink data 1707 may be described by a hierarchical data structure, such as a tree. To begin the analysis of the electronic ink, in step 1601 the software application 1701 creates such a data structure, identified as the analysis context object 1709 in FIG. 17.

Figure 18:
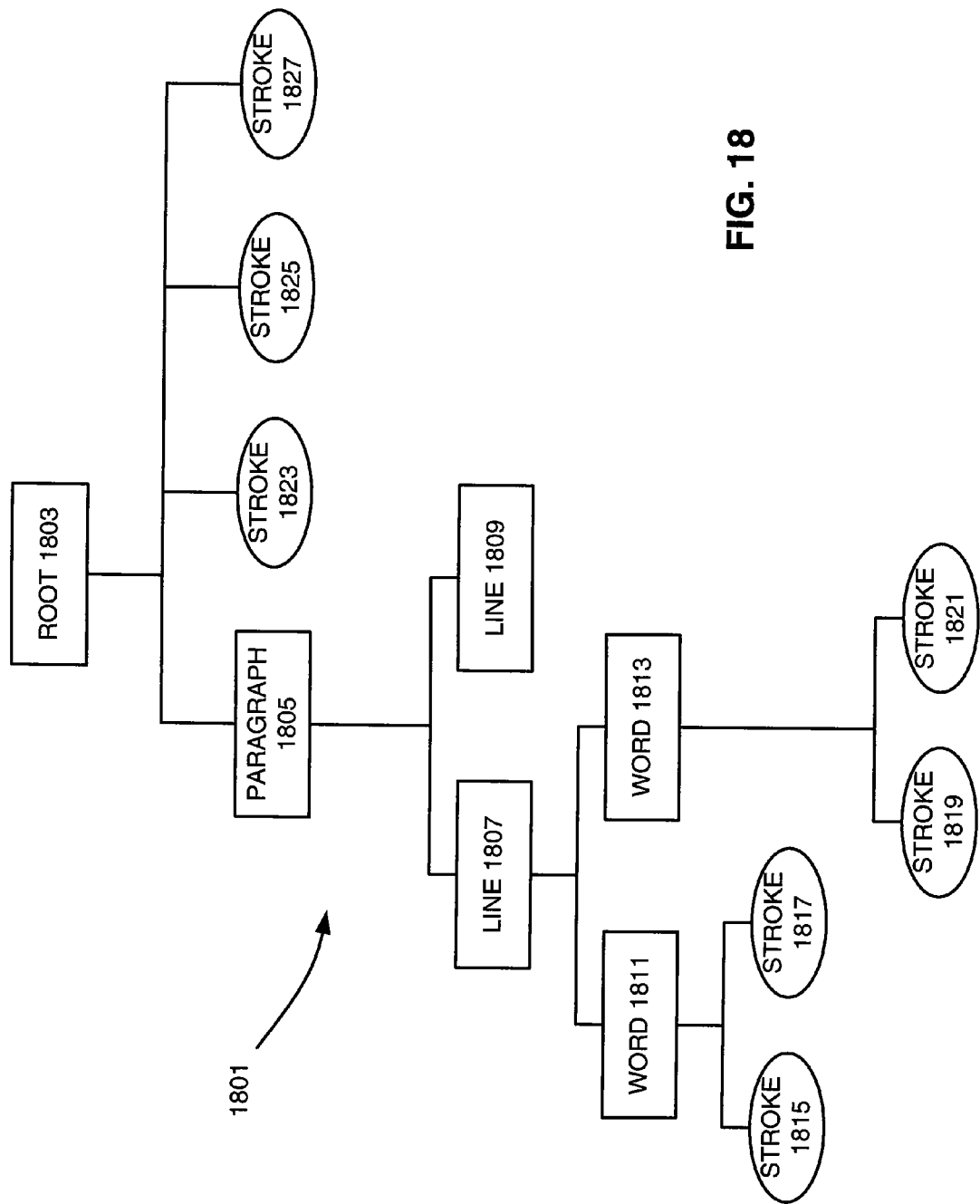
FIGS. 18 and 22 illustrate simple data trees that may be manipulated according to various examples of the invention.

FIG. 18 illustrates an example tree 1801 of the type that might be included in the analysis context object 1709. The tree 1801 includes a root node 1803, and a paragraph node 1805. The paragraph node 1805 corresponds to a paragraph of electronic ink text that, for example, may have been previously identified from an earlier analysis process. The paragraph node 1805 is connected to two line nodes 1807 and 1809, which represent two lines in the paragraph of electronic ink text. Line node 1807 is, in turn, associated with two word nodes 1811 and 1813. Each word node 1811 and 1813 corresponds to a word in the line of electronic ink text represented by the line node 1807. Word node 1811 contains ink stroke data 1815 and ink stroke data 1817. Thus, stroke data 1815 and 1817 correspond to text electronic ink strokes making up the word represented by the word node 1811. Similarly, word node 1813 contains ink stroke data 1819 and ink stroke data 1821, which correspond to text electronic ink strokes making up the word represented by the word node 1813. The tree 1801 also includes stroke data 1823-1827 that is associated only with the root node 1803. This ink data 1823-1827 represent new ink strokes that have not been classified or associated with another ink stroke or other document element.

Thus, rather than storing the strokes in individual stroke nodes, various nodes may have an associated "strokes" property that stores data corresponding to the strokes associated with the node. For example: (a) unclassified context nodes may contain one or more "strokes" properties having one or more strokes that need to be analyzed; (b) ink word nodes may contain one or more "strokes" properties containing one or more strokes that make up an ink word; (c) drawing nodes may contain one or more "strokes" properties containing one or more strokes that make up a drawing; and (d) bullet nodes may contain one or more "strokes" properties containing one or more strokes that make up the bullet in a list item. Of course, with alternate implementations of the invention, individual stroke nodes can be used in the data tree to represent individual strokes of electronic, rather than associating ink strokes with, e.g., a word node or drawing node.

While the tree 1801 shown in FIG. 18 includes ink strokes that have already been organized into words, lines and paragraphs, it should be appreciated that the tree 1801 may contain only new ink strokes that have not been classified or associated with another ink stroke or document element. For example, when a user initially enters electronic ink into the document 1705, these initial ink strokes will not have been analyzed. It also should be appreciated that the tree 1801 is representative only, and it is oversimplified for ease in understanding various aspects of the invention. For example, a line node typically will be associated with a plurality of word nodes, and each word node may contain stroke data for several ink strokes. It also should be noted that, while the tree 1801 only includes ink-related nodes, the analysis context object 1709 may include nodes representing non-ink document elements, such as images and typewritten text, as described in detail above.

Returning now to FIG. 17, with some examples of the invention the software application 1701 will create and maintain its own analysis context object 1709. For these software applications 1701, the software application 1701 can simply provide a reference to the analysis object 1709. For these software applications 1701, however, the application 1701 must include the mechanisms necessary to create, populate, and maintain the analysis object. Some software developers, however, will not want to go to the trouble of providing these mechanisms with the application 1701.

Accordingly, with other examples of the invention, however, the software application 1701 may instantiate another object to create the analysis context object 1709. For example, the software application 1701 may employ the ink analysis tool or other object to create and/or maintain the analysis context object 1709. For example, a software application 1701 may identify or provide unanalyzed ink data to the ink analysis tool. Depending upon the instructions from the software application 1701, the ink analysis tool may then create an analysis context object 1709 representing the entire document 1703, or, alternately, just a particular region (or regions) of the document that contain unanalyzed ink identified by the software application 1701. With some software applications 1701, the software application 1701 may thereafter maintain and update the analysis context object 1709, either by itself or using services provided by the ink analysis tool or another object. With still other software applications 1701, the software application 1701 may not maintain the analysis document object 1709, and instead have the ink analysis tool or other object create a new analysis document object 1709 when necessary.

Typically, the analysis context object 1709 will contain information on document elements for the entire document 1703. It also should be noted, however, that with some examples of the invention, the analysis context object 1709 may contain information for document elements in only a portion of the document 1703. That is, the analysis context object 1709 may represent only document elements in a spatial area of the document containing new or "dirty" ink or other data. If all of the document elements in an area of a document, including electronic ink, have already been analyzed, then these previously analyzed documents elements may not be included in the analysis context object 1709. As another alternative, the application program may maintain a separate analysis context object 1709 for each page or other subset of data relating to the entire electronic document 1703.

Figure 19:
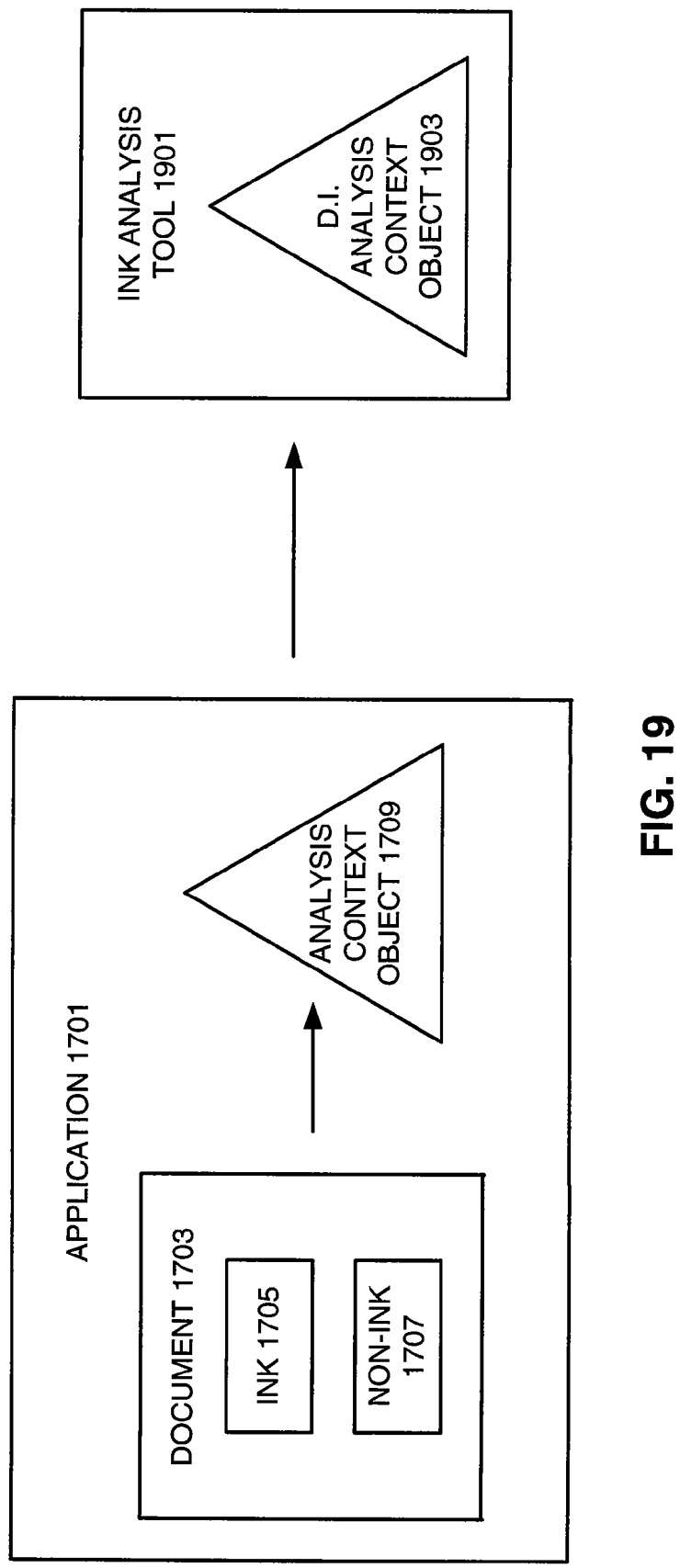

Once the software application 1701 has created the analysis context object 1709, in step 1603 the ink analysis tool 1901 copies at least a portion of the analysis context object 1709, as shown in FIG. 19. More particularly, if the analysis context object 1709 is not limited to regions containing new ink and/or other data, as described above, then the software application 1701 will designate the regions of the document 1703 that contain new ink and/or other data that should be analyzed. The software application 1701 then invokes the ink analysis tool 1901 to copy the portion of the analysis context object 1709 corresponding to the designated region of the document 1703. (Of course, if the analysis context object 1709 is already limited to describing regions that contain new ink, then the ink analysis tool 1901 may copy the entire analysis context object 1709.)

While an application program 1701 will know which ink has not previously been analyzed, it might not know which portion(s) of its electronic document 1703 (e.g., previously analyzed ink, underlying data in the document structure, etc.) affects the new ink (and hence, which portion(s) to present to the ink analysis tool 1901). Therefore, in at least some examples of the invention, the application program 1701 will make large sections of the electronic document 1703 available to the ink analysis tool 1901 through the analysis context object 1709. The application program 1701 leaves it up to the ink analysis tool 1901 to determine the information actually needed from the application program 1701 via the analysis context object 1709.

In response to the call to analyze the new data, the ink analysis tool 1901 makes various calls back to the analysis context object 1709, if necessary, in order to obtain the information from the analysis context object 1709 needed to analyze the new ink and/or other data in the region designated by the software application 1701. For example, in addition to the new ink and/or other data, the ink analysis tool 1901 may query the analysis context object 1709 for information regarding ink and/or other data in the designated region that has already been analyzed, or for information regarding non-ink document elements in the designated region. The "designated region" may, in at least some examples of the invention, correspond to data in the spatial area at and/or near the area containing the new ink or other data to be analyzed.

Both previously analyzed ink and non-ink document elements, particularly those elements located near the newly entered data to be analyzed, may provide a context that will improve the analysis of the unanalyzed ink or other data. As the ink analysis tool 1901 obtains the desired information from the analysis context object 1709, the ink analysis tool 1901 creates the document independent analysis context object 1903 with the obtained information. Thus, the document independent analysis context object 1903 contains at least a subset of information contained in the analysis context object 1709, but it is independent from the document 1703. The use of this "call back" technique in the query based spatial abstraction method described above makes it possible for the ink analysis tool 1901 to efficiently obtain and analyze the necessary data, even for large documents. It should be noted, however, that the application 1701 can still restrict the content in the document independent analysis context object 1903 simply by not exposing content to the analysis tool when requested.

It also should be noted that, while the ink analysis tool 1901 is creating the document independent analysis context object 1903, the software application 1701 should not change the analysis context object 1709 (and it cannot allow other threads in the application program and/or other programs to change the analysis context object 1709 during this time period). That is, the software application 1701 should not enter new data into the document 1703 during this time period, and should not allow other threads and/or application programs to do so. The process of creating the document independent analysis context object 1903 is relatively fast, however, and typically it will not significantly impact the operation of the software application 1701. If desired, however, efforts to input data to the document 1703 may be cached and entered into the system after the document independent analysis context object 1903 is created.

Once the document independent analysis context object 1903 is created, all subsequent analysis of the unanalyzed ink and/or other data can be performed on the document independent analysis context object 1903 rather than the analysis context object 1709, allowing the software application 1701 to continue its normal operation without being delayed or stopped by the analysis of the unanalyzed ink and/or other data. The software application 1701 may even enter new electronic ink data 1705 into the document 1703 (and into the analysis context object 1709) without interfering with the analysis of the unanalyzed ink in the document independent analysis context object 1903.

Figure 20:
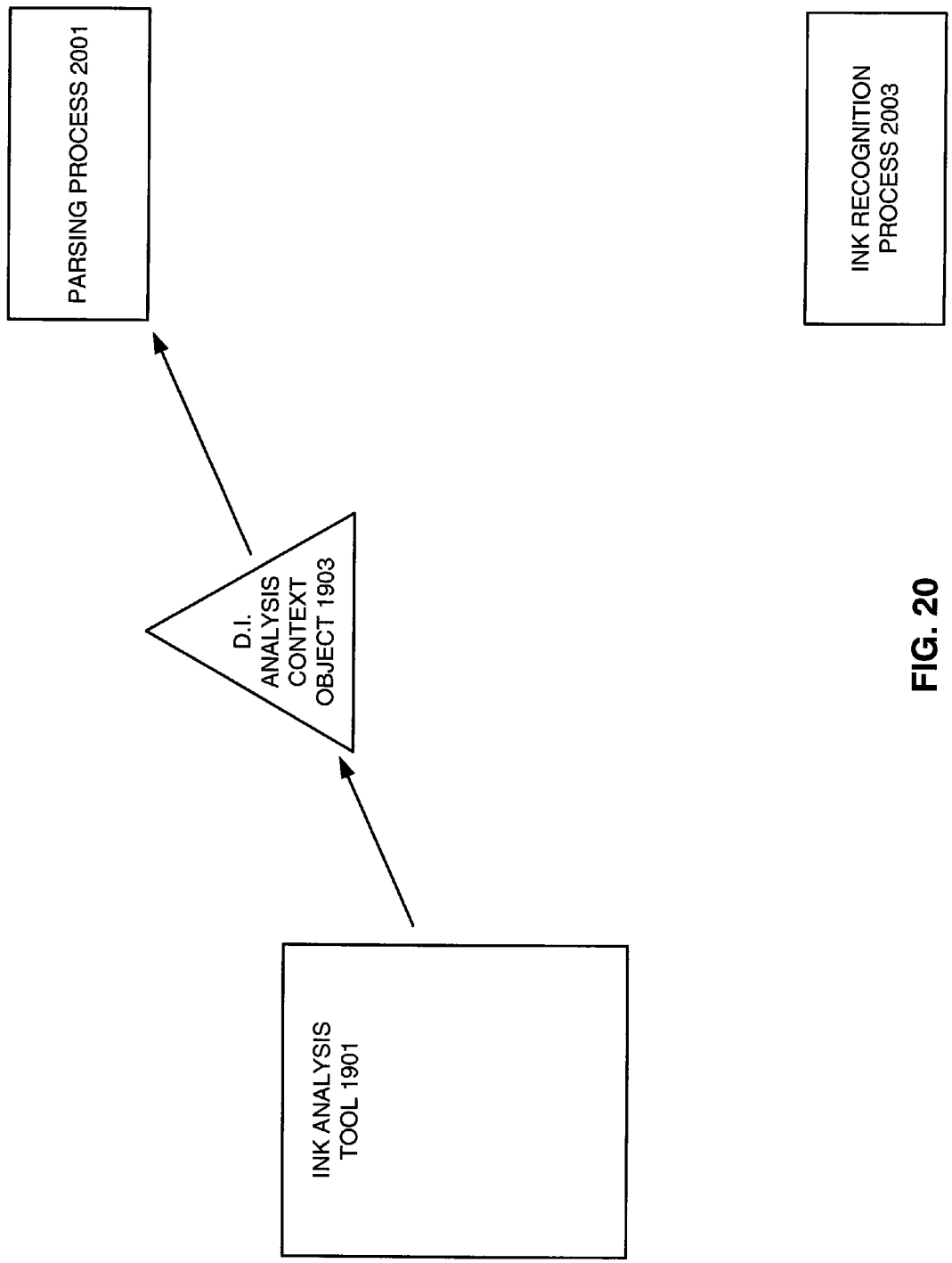

Accordingly, after the document independent analysis context object 1903 has been created, in step 1605 the ink analysis tool 1901 creates a separate analysis thread for analyzing the ink in the document independent analysis context object 1903. Accordingly, in step 1607, the software application 1701 may resume control of the main processing thread, and can continue its normal operation. Then, in step 1609, the ink analysis tool 1901 provides the document independent analysis context object 1903 to a first analysis process for analysis. For example, as shown in FIG. 20, the ink analysis tool 1901 may pass the document independent analysis context object 1903 to a parsing process 2001 for parsing using the analysis thread. The parsing process additionally may include one or more classification processes without departing from the invention (e.g., for classifying ink and/or other data into various different types, such as ink text, ink drawings, tables, charts, graphics, images, music, mathematics, drawings containing specialized symbols (such as electrical diagrams with resistors, capacitors, and the like), etc.). It should be noted that, with some examples of the invention, the ink analysis tool 1901 may make a copy of the document independent analysis context object 1903. As will be explained in more detail below, a copy of the original form of the document independent analysis context object 1903 may be used to reconcile the analysis results of the analysis process with a current state of the document 1703.

Figure 21:
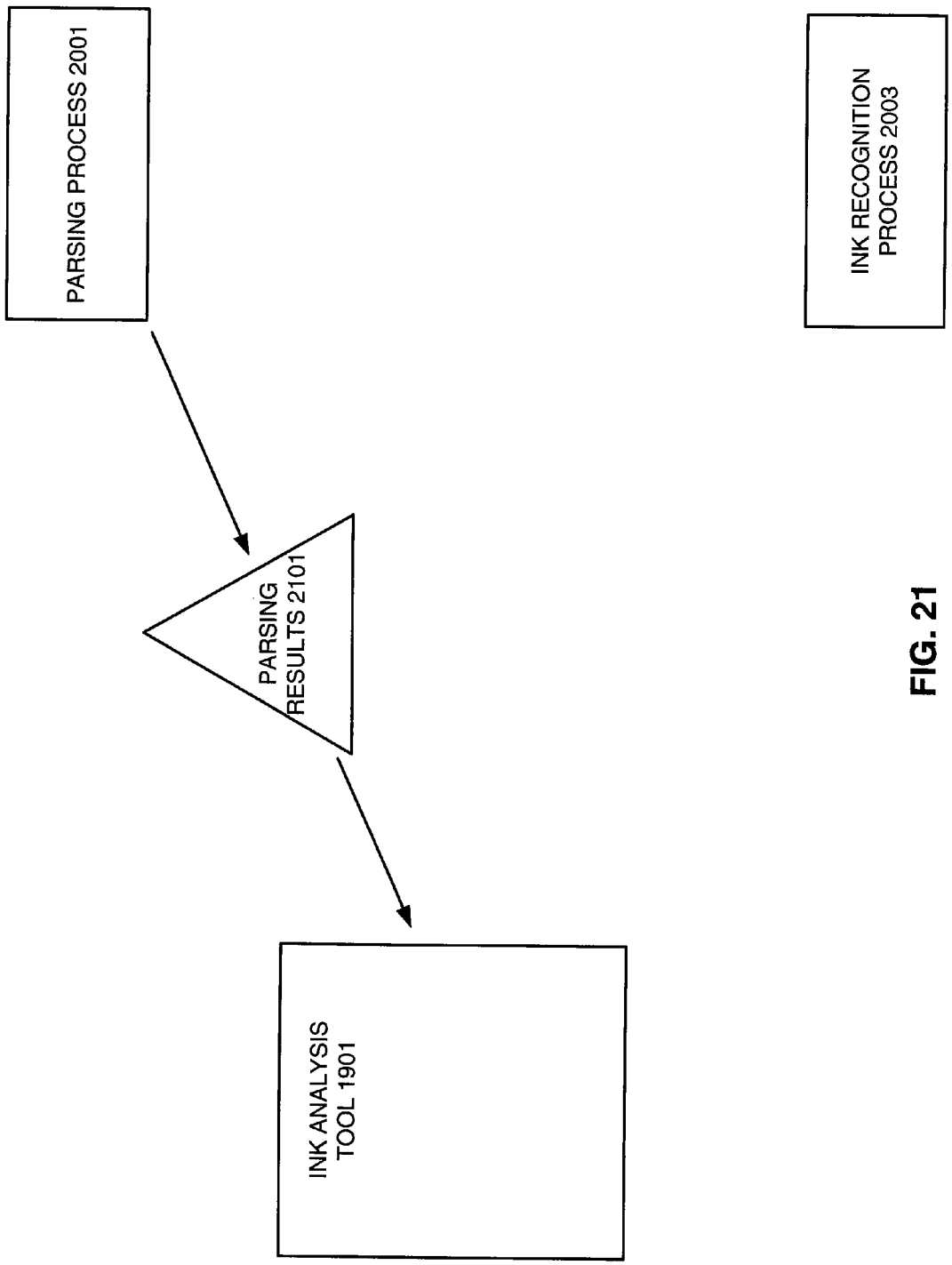

After the first analysis process has analyzed the ink and/or other data in the document independent analysis context object 1903, the first analysis process returns the analysis results to the ink analysis tool 1901, which in turn informs the software application 1701 in step 1611 of the analysis results. For example, as shown in FIG. 21, if the first analysis process is a parsing process 2001, the parsing process returns the parsing results 2101 to the ink analysis tool 1901, which may then pass a reference to the analysis results 2101 to the software application 1701 (e.g., by firing an event).

As will be explained in more detail below, with some examples of the invention, the analysis results 2101 may be the document independent analysis context object 1903 originally presented to the analysis process, but modified to include the new information produced by the first analysis process (e.g., the parsing results in this example). With still other examples of the invention, however, the analysis results 2101 may be a modified copy of the document independent analysis context object 1903. By including the new information produced by the first analysis process in a copy of the document independent analysis context object 1903, the original document independent analysis context object 1903 can be preserved for use, for example, by the reconciler and/or in other analysis processes as previously noted.

Figure 22:
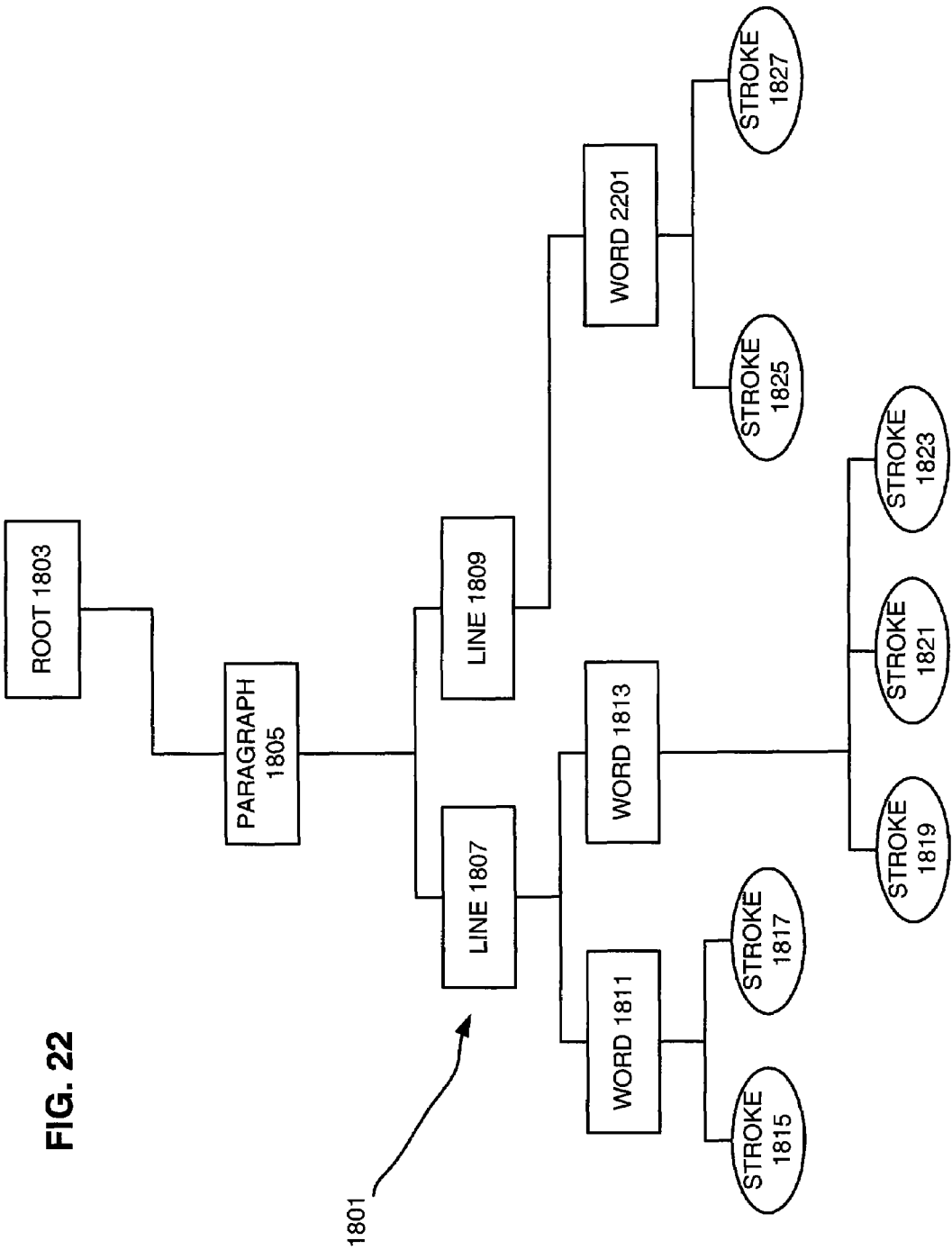
Figure 23:
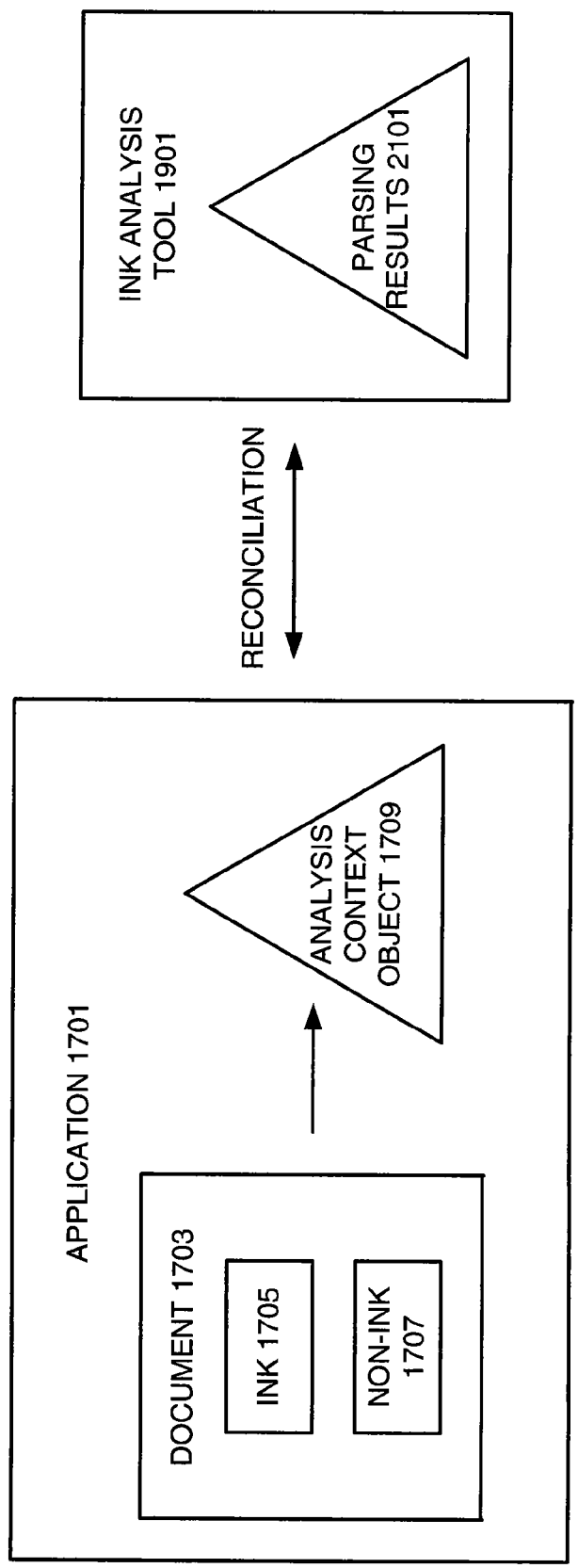

FIG. 22 illustrates an example of how a parsing process, such as the parsing process 2001, might modify the data tree 1801 to show the layout changes produced by the parsing operation. As seen in this figure, the parsing process 2001 has determined that the unanalyzed ink stroke represented by the stroke data 1823 is part of the word represented by the word node 1813. Accordingly, the parsing process has disassociated the stroke data 1823 from the root node 1803, and instead associated it with the word node 1813.

The parsing process also has determined that the ink strokes represented by the unclassified stroke data 1825 and 1827 are part of a new word in the line represented by the line node 1809 that had not been previously identified. Accordingly, the parsing process 2001 has created a new word node 2201, and associated that word node 2201 with the line node 1809. The parsing process 2001 has then associated the stroke data 1825 and 1827 to the new word node 2201. Thus, the parsing results 2101 describe relationships between the previously unanalyzed ink strokes and other ink strokes (or other document elements) identified by the parsing process 2001. Also, in addition to showing the relationship changes determined by the parsing process 2001, the parsing results 2101 also may include classification information determined by the parsing process 2001. For example, each instance of ink stroke data 1823-1827 may be modified to classify its corresponding ink stroke as a text ink stroke rather than a drawing ink stroke. In at least some examples of the invention, if desired, the parsing results 2101 may be represented in the document independent analysis context object 1903.

As previously noted, the software application 1701 is able to enter new data, including both new electronic ink data 1705 and new non-ink data 1707, into the document 1703 while the first analysis process is analyzing the document independent analysis context object 1903. Accordingly, the results of the first analysis process may no longer be applicable to the current state of the document 1703. For example, while a parsing process may be determining that an ink stroke is associated with a word, the user may have deleted the ink stroke from the document 1703 altogether (e.g., along with the entire associated word or more). Accordingly, the analysis results 2101 must be reconciled with the current state of the document 1703 in step 1613. An example reconciliation process is illustrated generally in FIG. 23, and it will be described in more detail below.

With some examples of the invention, the software application 1701 may manually reconcile the analysis results 2101 with the current state of the document 1703. That is, the software application 1701 may sort through the analysis results 2101 to determine which of the results are relevant to the document elements currently in the document 1703. With other examples of the invention, however, the ink analysis tool 1901 may provide a reconciling function to reconcile the analysis results 2101 with the current analysis context object 1709 (that is, the analysis context object 1709 reflecting the current status of the document 1703). As will be discussed in more detail below, the reconciliation function of various examples of the invention will identify conflicts or "collisions" between the analysis results 2101 from the first analysis process and the analysis context object 1709 for the current state of the document 1703. The ink analysis tool 1901 will then update the analysis context object 1709 based upon the analysis results in step 1615, and create a new document independent analysis context object 1903 from the reconciled analysis results in the analysis context object 1709 in step 1617.

It should be noted that, while the ink analysis tool 1901 is reconciling the analysis results 2101 with the current analysis context object 1709, the software application 1701 should not change the analysis context object 1709 (and it should not allow the analysis context object 1709 to be changed by other threads in the application program and/or any other application program). That is, the software application 1701 should not enter new data into the document 1703 and/or it should not allow other threads and/or application program to enter new data into the document 1703 until the reconciliation is completed. Like the process of initially creating the document independent analysis context object 1903, the reconciliation process is relatively fast, and typically will not significantly impact the operation of the software application 1701. If desired, however, attempted user input may be cached and entered after the reconciliation process is completed.

Figure 24:
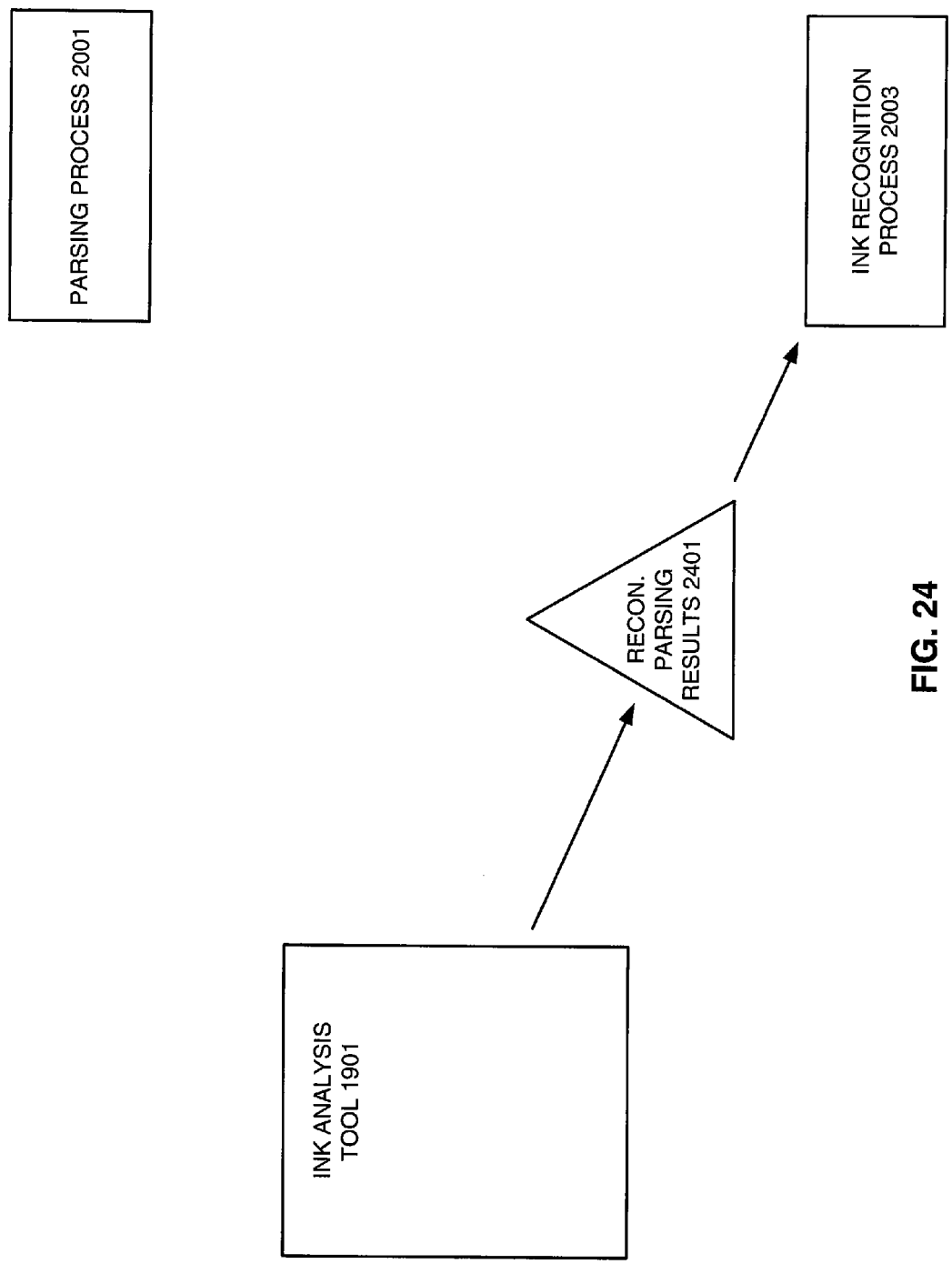

After the ink analysis tool 1901 has reconciled the analysis results 2101 with the analysis context object 1709 for the current state of the document 1703, the ink analysis tool 1901 optionally may provide the reconciled analysis results to a second analysis process for further analysis. For example, as shown in FIG. 24, the ink analysis tool 1901 may provide reconciled parsing results 2401 to an ink recognition process 2003 for recognition (e.g., for handwriting recognition of text, music, mathematical information, or other specialized data types). In particular, the ink analysis tool 1901 will again create a separate analysis thread for performing the second analysis process in step 1619. Because the ink analysis tool 1901 creates this separate thread for executing the second analysis process, the software application 1701 can again resume its normal operation in step 1621, and it may even accept new input data including new electronic ink data 1705.

Next, in step 1623, the ink analysis tool 1901 provides the reconciled results 2401 from the first analysis process to the second analysis process. Once the second analysis process has started, the application 1701 may start another execute of the first analysis process on new unanalyzed ink. Thus, multiple analysis processes may be running concurrently, so that, while the second analysis process is working on the results of the first analysis process, the application 1701 can restart the first analysis process to prepare the next set of analysis results.

Advantageously, executing the analysis processes in parallel may improve the operation of the software application 1701. For example, the parsing analysis process is typically fast relative to a recognition analysis process, and parsing analysis results can be used to implement correct selection behavior and space-insertion behavior without the use of recognition analysis results. Thus, because the different analysis processes can execute in parallel, new ink that added to the document 1703 does not have to wait for the recognition analysis process to finish on the older ink data before it can be selected or have space inserted in it correctly. Further, various examples of the invention accomplish asynchronous ink analysis as to isolate application developers as well as parser and recognizer algorithm developers from multithreading issues, improving maintainability and simplifying the development process for both groups, and allows changes to interaction between analysis processes without changes to the application.

As noted above, the ink analysis tool 1901 may provide the reconciled analysis results by creating a new document independent analysis context object 1903 from the analysis document object 1703 after it has been updated to include the relevant portions of the analysis results 2101. With other examples of the invention, however, the ink analysis tool 1901 may simply update the original document independent analysis context object 1903 with the analysis results 2101 to reflect the current state of the document 1703. Still further, the ink analysis tool 1901 may simply provide the relevant ink data to be analyzed further to the second analysis process.

Thus, various examples of the invention reconcile the results of a prior analysis process with the current state of the document 1703 before executing a subsequent analysis process. It should be appreciated, however, that this intermediate reconciliation step may be omitted with some examples of the invention. More particularly, with some examples of the invention, the results of an earlier analysis process may be directly provided to a subsequent analysis process, without reconciling those results with the current state of the document 1703. For example, if an ink classifier process is provided separate from the ink layout analyzer process, then the ink classified as handwritten text may be provided to the ink layout analyzer process without an intermediate reconciliation step.

Figure 25:
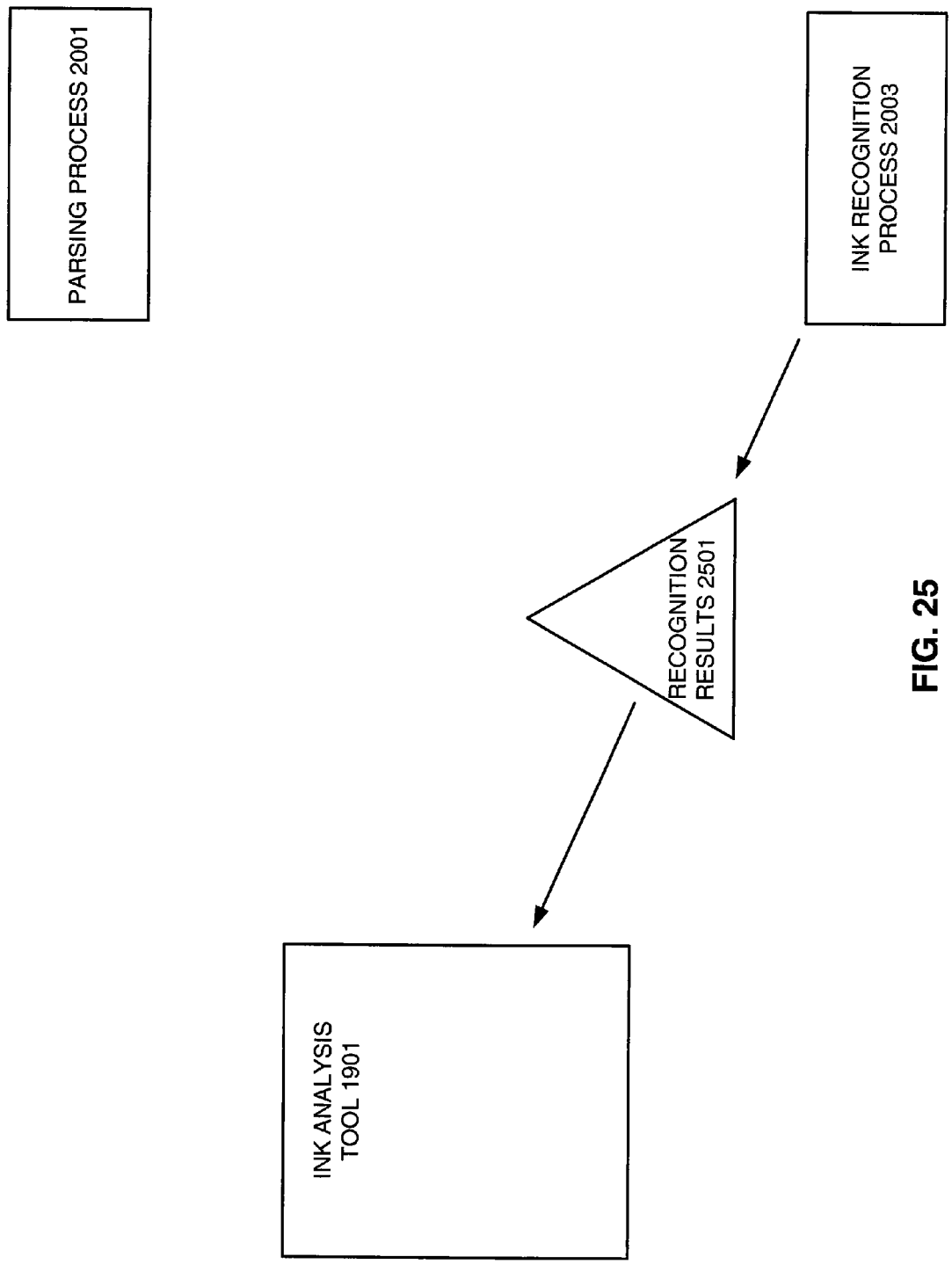
Figure 26:
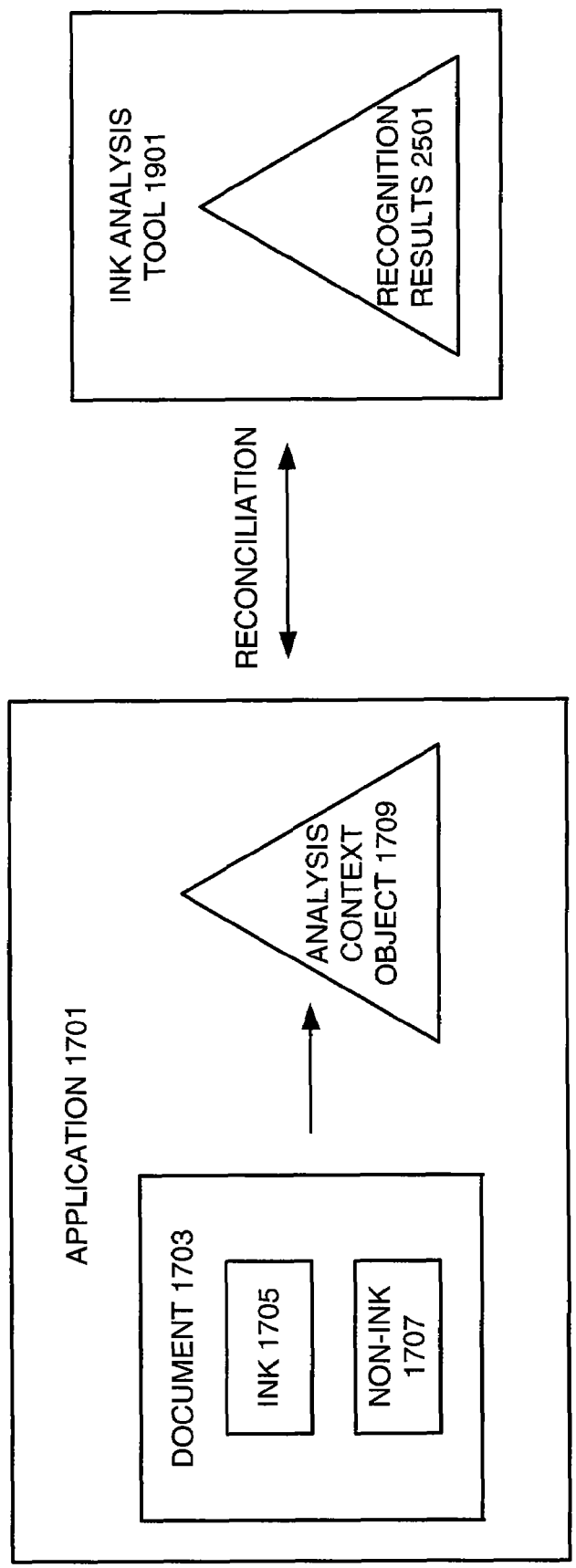

With either arrangement, after the second analysis process 2003 has completed analyzing the reconciled results 2401 from the first analysis process, the second analysis process 2003 returns its results 2501 to the ink analysis tool 1901 as shown in FIG. 25. The ink analysis tool 1901 then informs the software application 1701 of the results 2501 of the second analysis in step 1625.

As previously noted, the software application 1701 is able to enter new data, including new electronic ink data 1705, into the document 1703 while the second analysis process is analyzing the reconciled results 2401 of the first analysis process. The results 2501 of the second analysis process thus may no longer be applicable to the current state of the document 1703. Accordingly, the results 2501 of the second analysis process 2003 also must be reconciled with the current state of the document 1703 in step 1627. An example reconciliation process is illustrated generally in FIG. 26, and it will be described in more detail below.

Again, with some examples of the invention, the software application 1701 may manually reconcile the second analysis results 2501 with the current state of the document 1703. Alternately, with other examples of the invention, the ink analysis tool 1901 may provide a reconciling function to reconcile the analysis results 2101 with the current analysis context object 1709. This reconciliation function will identify conflicts or "collisions" between the analysis results 2501 from the second analysis process and the analysis context object 1709 for the current state of the document 1703, and the ink analysis tool 1901 will then update the analysis context object 1709 based upon the analysis results in step 1629. This process can then be repeated as necessary to analyze new ink input or ink that was changed during the analysis processes.

From the foregoing discussion, it will be apparent that the ink analysis techniques according to various examples of the invention allow electronic ink to be analyzed asynchronously from the software application 1701, allowing the software application 1701 to continue to accept input data, including new electronic ink, during the analysis processes. It should be noted that, while the above discussion describes only two analysis processes, any number of analysis processes can be concurrently performed in parallel. For example, various implementations of the invention may employ a first parsing process, a second parsing process, and a recognition process. In this manner, once each analysis process is completed, its results can be passed on to the next analysis process, and the first analysis process may be run again, concurrently and in parallel, on newly input ink.

Further, with various examples of the invention one or more analysis processes may be executed sequentially. For example, with some software applications, a user may be able to designate a specific language for an ink stroke or collection of strokes, such as English or Japanese. This language designation may then be included in the analysis context object 1709 and the document independent analysis context object 1903. Based upon the language designation, the ink analysis tool 1901 may route electronic ink designated as a first language to a recognition process tailored for that first language, and subsequently route electronic ink designated as a second language to a different recognition process tailored for that second language. In this same manner, input data classified and/or designated as other specific types may be sent to other specialized recognizers, such as recognizers for music, electrical symbols, mathematical symbols, flow chart features, graphical features, etc.

Moreover, because the analysis processes do not need to be part of the software application 1701, any desired analysis process can be used to analyze electronic ink in the software application 1701. For example, a software application developer can develop and employ a parsing process or a recognition process that is particularly suitable for analyzing the electronic ink input expected for the software application 1701.

Still other variations of these techniques may be employed by various implementations of the invention. For example, in some situations, it may not be desirable for the software application 1701 to maintain an internal document tree reflecting the relationship between the various document elements in the document 1703. Instead, the software application 1701 may be intended only to employ simple state information regarding electronic ink input. With these software applications 1701, the software application 1701 may omit creating an analysis context object 1709 that reflect the current state of the entire document 1703. Rather, the software application 1701 may create a purpose-specific analysis context object 1709 that only contains information relevant to specific ink input that the software application 1701 desires to have analyzed. By using a purpose-specific analysis context object 1709, the software application 1701 can avoid the complexity of maintaining an internal data structure corresponding to the state of the document 1703, while still being able to employ the desired analysis processes to analyze ink within the document.

Also, while the foregoing description discusses the asynchronous analysis of electronic ink, it should be noted that various examples of the invention may allow the ink analysis tool 1901 to synchronously analyze ink. For example, some implementations of the invention may allow a software application 1701 to instruct the ink analysis tool 1901 to perform an immediate and synchronous analysis of electronic ink. Further, the synchronous analysis may be only for ink within a specific region of the document 1703, or for the entire document 1703.

the Ink Analysis Tool

As discussed above, the ink analysis tool 1901 performs a variety of functions to facilitate the processing of electronic ink. For example, according to various implementations of the invention, the ink analysis tool 1901 receives information from the software application 1701 designating one or more regions in the document 1703 with ink data to be analyzed, queries the software application 1701 to obtain information regarding those regions, and then constructs a document independent analysis context object 1903 based upon the information. Further, the ink analysis tool 1901 provides the document independent analysis context object 1903 to one or more analysis processes for analysis, and then reconciles the results of the analysis process with the current state of the document 1703. The various processes may be performed using separate threads (as described above), via a thread pool, as separate processes, via separate machines in a cluster, or in any other suitable or desired manner, without departing from the invention.

According to different examples of the invention, a variety of software objects and tools can be employed to implement the ink analysis tool 1901 and perform these functions. With some examples of the invention, however, the ink analysis tool 1901 is implemented as an application programming interface (API). More particularly, according to some examples of the invention, the ink analysis tool 1901 can be implemented as a group of software objects routines and related information that can be called by the software application 1701 as needed to analyze ink in the document 1703.

As will be appreciated by those of ordinary skill in the art, an application programming interface may be organized into categories or "classes" pertaining to software objects. An "object" is a collection of storable state values and executable behaviors. More particularly, an object can maintain different types of state values, referred to as "fields" and "properties," which can be associated with or retrieved by the object. With respect to an outside software application or another software object, these properties may be read only (identified by the use of the term "{get;}"), write-only (identified by the user of the term "{set;}"), or both readable and writable (identified as "{get; set}"). An object may also execute tasks or "methods," often at the request or "call" of a software application or another object. Thus, an application programming interface may include various objects that can be instructed by another software application to perform specific tasks or provide specific information upon request.

It should be noted that various examples of the invention may be implemented to require that the software application 1701 provide only the minimum amount of information necessary to complete the desired analysis process. For this reason, some of the properties described in detail below may be discussed only as read-only (i.e., "{get;}") or write-only (i.e., "{set;}") properties, but may be both readable and writable for various alternate implementations of the invention. For example, a property that defines "hints" which are to be used by an analysis process to analyze electronic ink may be identified as a read-only property for situations where the software application 1701 does not intend to use hints. This allows the object created by the Ink Analyzer to at least read this property, and determine that the value of this property is the default value of null (i.e., that no "hints" are desired by the software application 1701). If, however, the software application 1701 desires to employ hints for ink analysis, then this property would be both readable and writable to allow the software application 1701 to change the value of this property from the null value, in order to specify the desired hints.

According to various examples of the invention, an API embodying an implementation of the ink analysis tool 1901 (referred hereafter to as an Ink Analysis API), may contain two core classes. The first class will be referred to as the "Analysis Context" class, and the second class is the "Ink Analyzer" class. The components of the "Analysis Context" class are used to create the analysis context object 1709. Accordingly, with various implementations of the invention for which the software application 1701 creates and maintains its own analysis context object 1701, one or more of the components in this class may be omitted from the ink analysis tool. Instead, one or more of these components may be implemented by the software application 1701 itself.

The components of the "Ink Analyzer" class are then used to create and employ an object that provides the document independent analysis context object 1903 to an analysis process, determine when the analysis results have been generated, and reconcile the analysis results with the current state of the document 1703. These and other classes that may be included in an Ink Analysis API according to various examples of the invention will be discussed in detail below.

Turning first to the Analysis Context class, this class is implemented by the host application 1701 to create the analysis context object 1703, which serves as a proxy view onto the internal document tree of the software application 1701. Alternatively, as previously noted, if the application implements its own analysis context object, then one or more components in this class may be omitted from the ink analysis tool 1901. As discussed above, the analysis context object 1703 contains all unanalyzed ink data, and the analysis context object 1703 is used to identify which unanalyzed ink data should be analyzed. The analysis context object 1703 also contains information about previously analyzed ink. This previously analyzed ink may be used to decide how the currently unanalyzed ink should be analyzed, and itself may be modified in the course of analyzing the unanalyzed ink. Further, the analysis content object 1703 contains information about non-ink content of the document 1703, which is used to properly classify ink as annotations to the non-ink content.

According to various examples of the invention, the Analysis Context class includes a constructor which, when called by the software application 1701, creates the analysis context object 1709. This class may also include various properties for the analysis context object 1709, including the property entitled "Dirty Region {get;}." The Dirty Region property defines the portion of the document (and thus the portion of the analysis context object 1709) that contains unanalyzed ink data. With various examples of the invention, the Dirty Region may define a disjoint area. The Dirty Region is specified as an AnalysisRegion, which is described more detail below, but which may simply be a collection of rectangular areas in the document. If the Dirty Region is empty, no analysis will occur. This class may further include a property for the analysis context object 1703 entitled "Margins {get;}," which declares the areas of a page in the document 1703 that are considered margins. An analysis process that, for example, analyzes the layout and determines the classification of electronic ink, may use this property to help determine the classification of electronic ink that is annotating non-ink content (e.g., ink in the margins).

Still further, the Analysis Context class may include a property entitled "Rootnode {get;}," which identifies the topmost or root context node in the analysis context object 1709. As discussed in more detail above, this root context node contains, as child context nodes, all other context nodes objects for the given analysis context object 1709. It should be noted that, with various examples of the invention, the root context node must be of the context node type "Root." It should also be noted that, with examples of the invention where the application 1701 implements its own analysis context object 1709, the analysis context object 1709 may have other context nodes as siblings of the root context node, but components of the Ink Analyzer class may be limited to considering context nodes contained by the root context node.

The Analysis Context class may additionally include the property "Analysis Hints {get;}," which returns an array of analysis hint objects set by the software application 1701. As will be discussed in more detail below, the analysis hint objects may contain any type of information that may assist the analysis process. This information may include, for examples, as factoids, guides, or a word list. It may also include information setting a language to be used for analysis, information designating the unanalyzed ink as handwritten text only or drawing only, or providing any kind of guidance to the parsing process, such as identifying the ink as lists, tables, shapes, flow charts, connectors, containers and the like.

In addition to these properties, the Analysis Context class may also include various methods that may be called by, e.g., the software application 1701 to have the analysis context object 1709 execute a task. For example, the Analysis Context class may include a method entitled "FindNode (Guid id)." Each node in the analysis context object 1709 has a globally unique identifier (or GUID), and this method will locate the node specified in the call anywhere in the analysis context object 1709. This lookup method should be implemented as efficiently as possible, since this method may be called from many time critical operations.

Like the Analysis Context class, the Ink Analyzer class also defines a public constructor that allows the software application 1701 to create an instance of the class (i.e., an ink analyzer object), along with various properties. For example, it may contain a property entitled "User Interface Context {get; set;}," which defines the processing thread to which the results of the analysis process are returned. This property allows the results to be synchronized to another object. For example, if this is set to the main form, parser results will be fired on the application main thread. It may also contain the property "AnalysisOptions AnalysisOptions {get; set;}", which specifies various criteria that may be used for the analysis process. These criteria may include, for example, enabling text recognition, enabling the use of tables, enabling the use of lists, enabling the use of annotations, and enabling the use of connectors and containers.

The Ink Analyzer class will include various methods. For example, this class may include a method entitled "AnalysisRegion Analyze ( )." This method starts a synchronous analysis process. Document element data is passed into this method, which describes the current state of the document 1703 and indicates what ink in the document 1703 needs to be analyzed. With some implementations of the invention, the document element data can be provided as the analysis context object 1709 (i.e., AnalysisRegion Analyze (Analysis Context)), as noted above. Alternately, individual ink strokes may be passed to the analysis process, either using a reference to the strokes (i.e., AnalysisRegion Analyze (Strokes)) or referenced as a property of the Ink Analyzer object (e.g., InkAnalyzer.Strokes {get;set}) with no properties passed to the Analyze method.

Once the analysis process is complete, this method will return a reference to the document independent analysis context object that has been modified to contain the results of the analysis process. The method also returns an AnalysisRegion value (discussed in detail below) describing the area in the document where results have been calculated.

The Ink Analyzer class may also include a method entitled "AnalysisRegion Analyze(AnalysisContext, waitRegion)." This method is the same as the synchronous Analysis Region Analyze ( ) method discussed above, but it only has ink analyzed if results are needed in the specified waitRegion area. More particularly, the call to this method will identify the analysis context object 1709 for the document 1703 and the region of the analysis context object 1709 (referred to as the "waitRegion") for which the analysis process should analyze synchronously. With various examples of the invention, all other regions of the analysis context object 1709 will be ignored, unless the analysis process needs to analyze content in those regions in order to complete its analysis of the waitRegion. As discussed above, the analysis context object 1709 passed with this method contains a property called the "DirtyRegion" which describes the areas of the document 1703 that need analysis. By specifying a particular waitRegion, the software application 1701 may obtain the analysis results more quickly for one specific region of interest, rather than having all of the ink data in the document 1703 analyzed.

When either of these Analyze methods is called, every available analysis process will be executed. Also, because these Analyze methods are synchronous calls, there is no need to execute the reconciliation process upon their conclusion, nor will an event fire once it is complete.

The Ink Analyzer class may also include a method entitled "BackgroundAnalyze(AnalysisContext)." This method starts the specified analysis operation, but does so on a separate background analysis thread. Thus, this method will return control to the main processing thread almost immediately while the actual analysis operation completes in the background. In particular, this method will return a value of "true" if the analysis process was successfully started. Again, the AnalysisContext value passed in to the method identifies the analysis context object 1709 for the document 1703 and indicates what ink in the document 1703 needs to be analyzed. Once the analysis operation has completed on the background thread, a Results event is raised to allow the software application 1701 to access to the results. The event contains the results and the reconcile method which is used to incorporate the results back into the analysis context object 1709 for the current state of the document 1703 when the results are returned.

It should be noted that each of these three Analyze methods in turn call the method "Clone" in an "Analysis Region" class, which will be discussed in detail below. Using the "Clone" method, these Analyze methods create the independent document analysis context object that is subsequently modified by the analysis process to show the analysis results.

The Ink Analyzer class may also include a method entitled "Reconcile (AnalysisContext current, AnalysisResultsEventArgs resultArgs)," which the software application 1701 calls after receiving the results event which was caused by calling the BackgroundAnalyze(AnalysisContext) method. The Reconcile method compares the analysis results contained in the document independent analysis context object with the current version of the analysis context object 1709 maintained by the software application 1701. This method identifies the nodes that need to be added and removed from the current version of the analysis context object 1709, and identifies if any of the following properties of an existing node has changed: its recognition results, its location, the ink strokes associated with the node, or any other data associated with the results of the analysis operation. This method also writes these identified changes to the current version of the analysis context object 1709. This method is sensitive to the ordering of context node ordering, such as the order of word context nodes on a line context node.

The analysis results (that is, the value of the property AnalysisResultsEventArgs) are passed back with this method, as they contain a public results structure and a private results structure. The public structure is returned so the software application 1701 can preview the changes that will occur in the reconcile stage. The private structure is included to prevent the software application 1701 from changing any of the analysis results before the reconcile process.

The Ink Analyzer class may also include the methods entitled "Recognizers RecognizersPriority( )" and "SetHighestPriorityRecognizer(recognizer)." When ink needs to be recognized, the appropriate recognizer will be used based on language and capabilities Accordingly, the Recognizers RecognizersPriority( ) method returns the recognition processes in the order in which they will be evaluated by the Ink Analyzer object. The order is determined per system depending upon recognition processes are available, but can be overridden for the software application 1701 by calling the SetHighestPriorityRecognizer(recognizer) on the Ink Analyzer object. The InkAnalyzer will enumerate through this ordered list until an appropriate recognizer can be found. The SetHighestPriorityRecognizer(recognizer) method raises the priority of a recognition process. By raising the priority of a particular recognition process, that recognition process will be used if it matches the needed language and capabilities of the current recognition operation. In essence, the SetHighestPriorityRecognizer(recognizer) pushes the designated recognition process to the top of the list returned by the RecognizersPriority method.

The Ink Analyzer class may also contain a method entitled "AnalysisRegion Abort( )," which may use an analysis context object as a parameter. This method allows for a foreground or background analysis operation to be terminated early. This method returns an analysis region that describes the area that was being analyzed prior to the abort. Thus, if the software application 1701 intends to continue the analysis operation at a later time, this region can be merged into the DirtyRegion of the analysis context object 1709 for the current state of the document 1703. Still further, the Ink Analyzer class may include an event entitled "AnalysisResultsEventHandler," which fires to the InkAnalyzer object as frequently as practical. More particularly, this event may fire between analysis processes and at least once every 5 seconds. This event can be used to provide the application 1701 with an update as to the status of an ongoing asynchronous analysis process (or processes).

The Ink Analysis API may also include classes in addition to the Analysis Context class and the Ink Analyzer class. For example, the Ink Analysis API according to various examples of the invention may include a Context Node class. This class may include various components relating to the context nodes that make up the analysis context object 1709 and the document independent analysis context object, such as the property entitled "ContextNodeType Type {get;}." As will be appreciated by those of ordinary skill in the art, each context node has a type, and there is a specific set of rules that each type must adhere to. This includes rules such as, for example, what types of child context nodes are allowed and whether or not strokes may be directly associated to the context node or only via its child context nodes.

The possible types of context nodes may be defined in a ContextNodeTypes enumeration and may include (but are not limited to), for example, the following types: An InkAnnotation node, which represents ink data annotating non-text data; an InkDrawing node which represents ink data forming a drawing, an InkWord node, which represents ink data forming a word, a Line node, which contains one or more InkWord nodes and/or TextWord nodes for words forming a line of text; ListItem node, which may contain Paragraph, Image, or like nodes expected in a list; and a List node, which contains one or more ListItem nodes each describing an entry in the list. The node types may also include a NonInkDrawing node, representing a non-ink drawing image; an Object node, representing data not covered by other values of the ContextNodeType enumeration; a Paragraph node, which contains a one or more Line nodes corresponding to lines forming a paragraph; a Picture or Image node, representing a picture image; a Root node, which serves as the topmost node in an analysis context object; a Table node, which contains nodes representing items making up a table; a TextBox node, representing a text box; a TextWord node; and an UnclassifiedInk node, corresponding to ink data that has not yet been classified. The node types may also include a Group node, for groups of other nodes, an InkBullet node for bullet items, a Row node for documents elements presented in a row of a table, and a Cell node for document elements presented in a cell of a table.

The Context Node class may also include the property entitled "GUID Id {get;}," which is a globally unique identifier for the current context node. In order to allow access to any desired context node, each context node within a single analysis context object must always have unique identifier.

This class may also include a property entitled "AnalysisRegion Location {get;}," which identifies the location in the document space where the relevant context node is actually positioned. As previously noted, an AnalysisRegion is a two-dimensional structure grouping one or more possibly disjoint rectangle like structures together. This class may also include the property entitled "StrokeCollection Strokes {get;}", which identifies the ink strokes associated with the relevant context node. With various examples of the invention, only leaf context nodes (such as Word, Drawing and Bullet nodes) are allowed by the Ink Analysis API to have strokes. The software application 1701 may use this property to reference the strokes at the leaf node level by all ancestor context nodes (e.g., the root node would contain a strokes reference to all strokes in the relevant analysis context object.)

Further, this class may include the property entitled "ContextNode ParentNode {get;}," which identifies the parent context node containing the relevant context node. With various examples of the invention, context nodes are always created to depend from a parent context node, with the Root context node being a static member of an analysis context object. This class may also include the property "ContextNode[ ] SubNodes {get;}" which identifies all context nodes that are direct children of the relevant context node. That is, this property will only identify those children context nodes down one level in the analysis context object. For example, the value of this property for a Paragraph context node will only identify the line context nodes contained by the Paragraph node, and not the word context nodes that are children of the line context node.

This class may also include the property entitled "RecognitionResult RecognitionResult {get;},"which provides the recognition result as calculated by the relevant recognition analysis process or processes, as the RecognitionResult can represent more than one line of text from in more than one language. The Recognition Result is available for every context node in the document independent analysis context object even though the RecognitionData property (discussed in more detail below) which is set by the recognition analysis process and is used to create the RecognitionResult object might only be set at one level of the context node tree to avoid duplication of data. If the node does not have a RecognitionData associated with it, it will either merge the recognition results of all of its subnodes or extract the recognition result from its parent. This class may also include the property entitled "Stream RecognitionData {get; set;}," which is the persistent form of the RecognitionResult value. Again, the recognition analysis process produces the Stream RecognitionData value that is set on the relevant context node. The RecognitionResult object is then constructed based on this value.

The Context Node class may further include a property entitled "ContextLink[ ] Links {get;}," which provides an array of ContextLink objects. A ContextLink object describes an alternative relationship between two context nodes. While context nodes typically have a parent-child relationship with other context nodes, a ContextLink allows for an alternative relationship between context nodes. For example, a ContextLink may allow for a connection between two context nodes, anchoring of one context node to another context node, containment of one context node by another context node, or a desired type of link defined by the software application 1701. ContextLinks may be added to this array by calling the AddLink method, discussed in more detail below. Similarly, ContextLinks may be removed from this array by calling the DeleteLink method, which also is discussed in more detail below.

Still further, this class may include the properties "IsContainer {get;}" and "IsInkLeaf {get;}." The property IsContainer {get;} has the value of "true" if the relevant context node is not a leaf context node (that is, if the relevant context node contains children context nodes and is thus considered a container context node), and has the value of "false" otherwise. The IsInkLeaf {get;} property has the value of "true" if the current context node is not a container context node, and has a value of "false" otherwise. That is, if the current context node does not contain any children context nodes, it is considered a leaf context node. It should also be noted that, with various examples of the invention, an InkLeaf context node is expected to contain references to stroke data, whereas container context nodes do not have this restriction. Container context nodes may or may not reference stroke data, as designated by the software application 1701.

The Context Node class may also contain the property "Rect RotatedBoundingBox {get; set;}." The value of this property is calculated by a layout and classification analysis process. If the ink data associated with the relevant context node is written at an angle, then the bounds for the context node will still be horizontally aligned. The value of the RotatedBoundingBox property, however, will be aligned to the angle at which the ink data associated with the relevant context node was written. Still further, this class may include the property "ReClassifiable {get;}," which informs the InkAnalyzer if it is allowed to modify the values of the relevant context node.

In addition to these properties, the Context Node class may also include various methods. For example, this class may include a method entitled "ContextNode CreateSubNode (ContextNodeType type)." This method allows the creation of a child context node of a particular type. With various examples of the invention, this method may only allow valid child types of the relevant context node to be created, thereby preventing malformed data structures from being created. For example, this method may only allow a Line context node to create InkWord and TextWord child context nodes). This class may also contain a method entitled "void DeleteSubNode(ContextNode node)," which deletes the referenced child context node from the relevant analysis context object. It should be noted, however, that with various examples of the invention, if the referenced context node still contains strokes or child context nodes, then this method should fail. Also, if the reference context node is not a direct child of the relevant context node, then this method should fail. It should be noted that, if a software application 1701 implements its own analysis context object 1709 and in turn employs this method, it not delete non-empty context nodes or context nodes that are not direct children of the relevant context node to prevent malformed data structures in the analysis context object 1709.

Still further, this class may include the method "ContextNode[ ] HitTestSubNodes(AnalysisRegion region)," which returns an array of context node that are located in the specified region. It should be noted, however, that only the immediate children nodes of this element are returned, not all descendants. The region is defined by the AnalysisRegion object which, as previously noted, may be a collection of one or more rectangles. According to various examples of the invention, if any part of a context node's location intersects the specified region, then that context node will be returned in the array. This method is employed to, for example, create the document independent analysis context object and to reconcile the analysis results with the analysis context object corresponding to the current state of the document 1703. Thus, this method is frequently called, and should be optimized for fast repeated access by the InkAnalyzer object.

The Context Node class may also contain a method entitled "MoveStroke(Stroke stroke, ContextNode destination)." This method moves the association of a stroke from one leaf context node to another. With various examples of the invention, this method is only used between leaf context nodes. It may also include a method entitled "MoveSubNodeToPosition(int OldIndex, int NewIndex)," which reorders the relevant context node with respect to its sibling context nodes. For example, if the document 1703 has three words on a line, e.g., word 1, word 2 and word3, then their order is implied by the array of subnodes returned from the parent context node. This method allows their order to be changed, so that, relative to the relevant parent context node, word 1 is specified to be the last word on the line by moving the context node for word 1 from position one to position three.

Still further, this class may include the method entitled "AddLink(ContextLink link)," which adds a new ContextLink object to the current context node. With various examples of the invention, the ContextLink object must contain a reference to the relevant context node in order for the ContextLink to be successfully added to the array of ContextLinks associated to the relevant context node. It may also contain the method entitled "DeleteLink(ContextLink link)." This method deletes or removes the specified ContextLink object from the array of ContextLinks for the relevant context node. It should be noted that, with various examples of the invention, this method call always completes successfully, even if the ContextLink does not exist in the array of ContextLinks associated with the relevant context node.

The Ink Analysis API may also include an Analysis Hint class. As with many of the previously described classes, the Analysis Hint class may include a constructor, entitled "AnalysisHint( )," which initializes an Analysis Hint object to an empty state. This class may also include a number of properties, including a property entitled "AnalysisRegion Location {get;}." This property specifies the location in the document 1703 (as an AnalysisRegion) to which the AnalysisHint is applicable. For example, if the document 1703 is a free form note with a title section at the top of the page, then the application 1701 could set an AnalysisHint for the title region to specify that a horizontal line of ink is expected in that region. This Analysis Hint will help to increase the accuracy of an analysis process.

This class may also include a property entitled "string Factoid {get; set;}," which specifies a particular "factoid" that is to be used for the location in the document 1703 to which the AnalysisHint is applicable. As known to those of ordinary skill in the art, factoids provide hints to a recognition process as to an expected use of ink data (e.g., as regular text, digits, postal codes, filenames, and web URLs). This class may also include the properties entitled "RecognizerGuide Guide {get; set;}" and "OverrideLanguageId {get; set;}." The RecognizerGuide Guide {get; set;} property specifies the writing guide that is to be applied to the location in the document 1703 to which the AnalysisHint is applicable. Writing guides may, for example, help improve the accuracy of a recognizer analysis process by specifying to the user and informing the recognizer analysis process where the user will write lines or characters. The OverrideLanguageId {get; set;} property specifies a Language Hint for the in the document 1703 to which the AnalysisHint is applicable. Setting a Language Hint causes the InkAnalyzer object to use the designated language instead of the language specified on the context node.

This class may also include a property entitled "PrefixText {get; set;}," which specifies the text that is written or typed prior to a line of ink that is to be recognized. Still further, this class may include a property entitled "RecognitionModes RecognitionFlags {get; set;}," which specifies particular type of modes a recognition process should respect at the location in the document 1703 to which the AnalysisHint is applicable. Still further, this class may include a property entitled "SuffixText {get; set;}," which specifies the text that is written or typed after to a line of ink that is to be recognized, and a property entitled "WordList WordList {get; set;}," which specifies a particular set of words that should be used by a recognition analysis process. Word lists may be used when the expected recognition results are known before the user has actually written input data, such as a list of medical terms that are expected to be written inside a medical form.

Still further, this class may include a property entitled "WordMode {get; set}." If this value is "true," then the analysis process will bias itself to return a single word for the entire analysis region. It may also include a property entitled "Coerce {get; set}," which, if "true," will force the analysis process to confine its result to any factoid or wordlist value set in the relevant hint. This class may also include a property entitled "AllowPartialDictionaryTerms {get; set}." If this property value is "true," then the recognition analysis process will be allowed to return partial words from its recognition dictionary.

According to various examples of the invention, the Ink Analysis API may further include an Analysis Region class. This class may include, for example, multiple constructors for constructing an AnalysisRegion object. For example, it may contain a first constructor for constructing an AnalysisRegion object having any region, a second constructor for constructing an AnalysisRegion object based upon the parameters for a two-dimensional rectangle, and a third constructor for constructing an AnalysisRegion object based upon four spatial coordinates. The default constructor may, for example, create an empty region. This class may also include a number of properties. For example, this class may include a property entitled "Rectangle Bounds {get;}," which retrieves the bounding rectangle for the AnalysisRegion, a property entitled "IsEmpty {get;}," which indicates whether the relevant AnalysisRegion object has an empty interior, and a property entitled "IsInfinite {get;}," which indicates whether the relevant AnalysisRegion is set to infinite or not.

This class may also include a number of methods, such as a method entitled "AnalysisRegion Clone( )," which clones the relevant AnalysisRegion object. This class may also include a method entitled "Equals(AnalysisRegion otherRegion)," which tests whether the specified AnalysisRegion object (referred to as the otherRegion) is identical to the relevant AnalysisRegion object. This method returns a value of "true" if the interior of the specified Analysis Region object is identical to the interior of the relevant Analysis Region object, and otherwise returns a value of "false."

This class may further include a method "Intersect(AnalysisRegion regionToIntersect)," which crops down the relevant AnalysisRegion object to the specified analysis region. Thus, the resulting AnalysisRegion object will only include areas that overlapped or intersected the specified analysis region. This class may also include the method entitled "Intersect (Rectangle rectangle)," which crops down the relevant AnalysisRegion object to the specified rectangle. Again, the resulting AnalysisRegion object will only include areas that overlapped or intersected the specified rectangle. It may also include the method entitled "MakeEmpty( )," which initializes the relevant AnalysisRegion object to an empty interior, and the method entitled "MakeInfinite( )," which sets the area occupied by the relevant AnalysisRegion to be infinite. It may further include various methods for uniting or separating differently defined areas, such as method entitled "Union (AnalysisRegion regionToUnion)," which specifies an AnalysisRegion object to union or add to the relevant AnalysisRegion object, and the method entitled "Union(Rectangle rectangle)," which unions a specified rectangle to the relevant Analysis Region object. With this method, the rectangle may be specified in terms of the coordinate space for the relevant AnalysisRegion object. Of course, this class may include numerous other methods for combining areas or extracting one area from another based upon any desired definition for the areas.

The Ink Analysis API may also have a Recognition Result class. As with many of the previously discussed classes, the Recognition Result class may include one or more constructors. For example, this class may include a constructor entitled "RecognitionResult(Stream lattice)", which constructs a RecognitionResults object from a given recognition lattice. With various examples of the invention, a recognition lattice is a serialized form of the results from a recognition process. This method may, for example, specify a recognition lattice as a byte array to be used for the construction of the relevant RecognitionResult object. It may also include a constructor entitled "RecognitionResult(ContextNode node)," which constructs a RecognitionResults object from a given context node. It may also include a constructor entitled "RecognitionResult(string Text, int StrokeCount)," which constructs a RecognitionResults object from a specified text value, which in turn is associated to a specified number of strokes and might be used for correction if the recognition process did not come up with an alternate recognition value corresponding to the actual handwritten ink data. Still further, this class may include a constructor entitled "RecognitionResult(RecognitionResult leftRecognitionResult, RecognitionResult rightRecognitionResult)," which constructs a RecognitionResults object by merging two existing Recognition Results objects together.

The Recognition Result class may also include one or more properties, such as a property entitled "StrokeCollection StrokeCollection {get;}," which provides an array of stroke indexes representing a collection of strokes that are contained in a single ink object, and a property entitled "RecognitionAlternate TopAlternate {get;}," which provides the best alternate of the recognition result. This class may also include the property entitled "RecognitionConfidence RecognitionConfidence {get;}," which provides the level of confidence (e.g., strong, intermediate, or poor) of the top alternate selection for the current results from a recognition analysis process, and a property entitled "string TopString {get;}," which returns the best result string of the analysis results from a recognition analysis process.

The Recognition Results class may also include a number of methods, such as a method entitled "public RecognitionAlternateCollection GetAlternateCollectionFromSelection (selectionStart, selectionLength, maximumAlternates)," which specifies a collection of alternates from a selection within the best result string of analysis results from a recognition analysis process, where each alternate corresponds to only one segment of ink. The input parameters for this method may include, for example, a value which specifies the start of the text selection from which the collection of alternates is returned, a value that specifies the length of the text selection from which the collection of alternates is returned, and a value that specifies the maximum number of alternates to return. This method may then return the RecognitionAlternateCollection collection of alternates from a selection within the best result string of the recognition result.

The Recognition Results class may further include a method entitled "RecognitionResult Merge(RecognitionResult left, string separator, RecognitionResult right)." This method may be used to create a new RecognitionResult object from a single string, resulting in a flat lattice, append a single string to the beginning or end of an existing RecognitionResult object, or concatenate a single string in between two existing RecognitionResult objects. This class may also include a method entitled "ModifyTopAlternate(RecognitionAlternate alternate)," which specifies the recognition result to be modified with a known alternate. With some embodiments of the invention, by default the best result string of the results of a recognition analysis process corresponds to the top alternate. However, this method can be used to specify that alternates other than the top alternate are used in the results of the recognition analysis process. If the new top alternate results in a different segmentation than the previous one, the ModifyTopAlternate method will automatically update the context nodes to reflect the changes. It should be noted that, in order to retrieve the alternates that can be used to modify the recognition result, this method call the GetAlternatesFromSelection method, discussed in detail below. This class may also have a method entitled "Stream Save( )," which persistently maintains the relevant RecognitionResults object in the form of a recognition lattice. A recognition lattice is a serialized format used to express the results from a recognition process.

The Ink Analysis API may also have an Analysis Options enumerated type. This type may contain one or more fields that specify how ink data will be analyzed by an analysis process, such a field entitled "const AnalysisOptions Default," which enables all available options for the analysis process. This field may, for example, enable text recognition, the use of tables, the use of lists, the use of annotations, the use of connectors and containers, and the use of intermediate results. This type may also include a field entitled "const AnalysisOptions EnableAnnotations," which enables and disables the detection of annotations, a field entitled "const AnalysisOptions EnableConnectorsAndContainers," which enables and disables the detection of connectors and containers, and a field entitled "const AnalysisOptions EnableIntermediateResults," enables and disables the return of analysis results to the software application 1701 between the use of different, sequential analysis processes (e.g., between a parsing process and a subsequent recognition process). This type may also have a field entitled "const AnalysisOptions EnableLists," which enables and disables the detection of lists, and a field entitled "const AnalysisOptions EnableTables," which enables and disables the detection of tables. This enumerated type may further include a field entitled "const AnalysisOptions EnableTextRecognition," which enables and disables a text recognition analysis process. It should be noted, however, that if additional analysis processes are available (or different versions of the same analysis process), then this type may include additional AnalysisOptions accordingly.

Still further, the Ink Analysis API may include an AnalysisResultsEventArgs class. This class may have a constructor entitled "public AnalysisResultsEventArgs( )," which creates a data structure that contains the analysis results and is returned to the software application 1701 when the AnalysisResults event is raised. This class may also include a property entitled "InkAnalyzer InkAnalyzer {get;}," which identifies the InkAnalyzer object that performed the analysis process.

The API may also have a Line class, which may be useful with some types of operating systems which recognize the use of a "Line" object representing a geometric line. This class may include a constructor, such as a constructor entitled "public Line(Point beginPoint, Point endPoint)," which creates a Line object. This class may also include various properties, such as a property entitled "public Point BeginPoint {get; set;}," which represents the beginning point of the line object and a property entitled "public Point EndPoint {get; set;}," which represents the ending point of the line object.

In addition to these classes, the Ink Analysis API may also contain a Recognition Alternate class. This class may include elements representing the possible word matches for segments of ink that are compared to a recognizer's dictionary. For example, this class may include a property entitled "Line Ascender {get;}," which provides the ascender line of a RecognitionAlternate object that exists on a single line (with a line being represented as two points), a property entitled "public Line Baseline {get;}," which provides the Baseline of a RecognitionAlternate object that exists on a single line, and a property entitled "Line Descender {get;}," which provides the descender line of a RecognitionAlternate object that exists on a single line. This class may also include a property entitled "RecognitionResult Extract {get;}," which provides a RecognitionResults object for the current RecognitionAlternate object. This property can be used, for example, to extract the RecognitionResult object for a word from the RecognitionResult object for a line containing that word.

It may also include the property entitled "Line Midline {get;}," which provides the midline for a RecognitionAlternate object that exists on a single line, a property entitled "StrokeCollection Strokes {get;}," which provides the collection of strokes that are contained in an ink object (that is, it provides a StrokeCollection representing the strokes that are associated to the RecognitionResult), and a property entitled "StrokeCollection[ ] StrokesArray {get;}," which provides a collection of strokes that are contained in one or more ink objects, representing the strokes that are associated with the RecognitionResult. This class also may include a property entitled "RecognitionConfidence RecognitionConfidence {get;}," which provides the level of confidence (e.g., strong, intermediate, or poor) that a recognition analysis process has determined in the recognition of a RecognitionAlternate object or of a gesture. For non-line nodes, the lowest RecognitionConfidence of the children of the relevant context nodes will be returned. It may also contain the property entitled "string RecognizedString {get;}" which specifies the result string of the alternate. Thus, for any context node above a word context node, the results string is concatenated together by this method. For example, a line node will contain a results string that in turn contains the results of all its children or word nodes. A paragraph node will then contain a results string that contains the results of all its children or line nodes.

The Recognition Alternate class may also contain one or more methods including, for example, a method entitled "StrokeCollection[ ] GetStrokesArrayFromTextRange(int selectionstart, int selectionlength)," which specifies a StrokeCollection from each ink object that corresponds to the known text range. This class may also contain a method entitled "StrokeCollection[ ] GetStrokesFromStrokesArrayRanges(StrokeCollection[ ] strokesArray)," which specifies the smallest collection of strokes that contains a known input collection of strokes and for which the recognizer can provide alternates. More particularly, the strokes are returned by an array of ink objects each containing an array of stroke indexes for the collection It should be noted that the collection of ink strokes returned by this method may match the input collection, or it may be larger if the input collection matches only part of the smallest recognition result that includes all of the input strokes. This class may further include a method entitled "StrokeCollection GetStrokesFromStrokesRanges(StrokeCollection strokes)," which specifies the smallest collection of strokes that contains a known input collection of strokes and for which the recognizer can provide alternates, and a method entitled "StrokeCollection GetStrokesFromTextRange(int selectionstart, int selectionlength)," which specifies the StrokeCollection that corresponds to the known text range.

This class may further include a method entitled "void GetTextRangeFromStrokes(ref int selectionstart, ref int selectionend, StrokeCollection strokes)," which specifies the smallest range of recognized text for which the recognizer can return an alternate that contains a known set of strokes, and a method entitled "void GetTextRangeFromStrokesArray(ref int selectionstart, ref int selectionend, StrokeCollection[ ] strokesarray)," which specifies the smallest range of recognized text for which the recognizer can return an alternate that contains a known set of strokes. It also may have a method entitled "RecognitionAlternateCollection SplitWithConstantPropertyValue(GUID propertyType)," which returns a collection of alternates, which are a division of the alternate on which this method is called. Each alternate in the collection contains adjacent recognition segments which have the same property value for the property passed into the method. For example, this method can be used to obtain alternates that divide an original alternate by level of confidence boundaries (strong, intermediate, or poor) in the recognition result, line boundaries, or segment boundaries. It may further include a method entitled "byte[ ] GetPropertyValue(GUID propertyType)," which specifies the value of a known property of the alternate, such as the recognizer's confidence in the alternate. Not all recognition analysis processes will provide a value for all property types, however. Thus, this method provides the data for the types supported by the relevant recognition analysis process.

The Ink Analysis API may also include a Recognition Alternate Collection class. Like many of the classes discussed above, this class may include a constructor, entitled "RecognitionAlternateCollection( )," for creating a RecognitionAlternateCollection object. This class may also include a number of properties, such as a property entitled "Count {get;}," which provides the number of objects or collections contained in a collection of alternate recognition values, a property entitled "IsSynchronized {get;}," which provides a value indicating whether access to the collection of alternate recognition values is synchronized with the software application 1701 (i.e., "thread safe"), and a property entitled "SyncRoot {get;}," which provides the object that can be used to synchronize access to the collection of alternate recognition values.

This class may also contain one or more methods, such as a method entitled "virtual void CopyTo(Array array, int index)," which copies all of the elements of the current collection of alternate recognition values to the specified one-dimensional array, starting at the specified destination array index, and a method entitled "IEnumerator IEnumerable.GetEnumerator( )," which is a standard implementation of IEnumerable that enables callers to use the for each construct to enumerate through each RecognitionAlternate in the collection of alternate recognition values. This class may also include a method entitled "RecognitionAlternateCollectionEnumerator GetEnumerator( )," which returns a RecognitionAlternateCollectionEnumerator that contains all of the objects within the collection of recognition alternate values. This method may be used, for example, to retrieve each object in the collection of recognition alternate values.

The Ink Analysis API may additionally include a Recognition Confidence enumeration and a Recognition Mode enumeration, each of which may contain one or more fields relating to a recognition analysis process. For example, the Recognition Confidence class may contain multiple fields, such as a field entitled "Intermediate," indicating that the recognition analysis process is confident that the correct result is in the list of provided alternate recognition values, a field entitled "Poor," which indicates that the recognition analysis is not confident that the result is in the list of provided alternate recognition values, and a field entitled "Strong," which indicates that the recognition analysis process is confident that the best alternate in the alternate recognition values is correct.

Likewise, the Recognition Mode class may include fields that that specify how a recognition analysis process interprets electronic ink data and thus determines a recognition result string. For example, this class may include a field entitled "Coerce," which specifies that the recognition analysis process coerce a recognition result based on a factoid that was specified for the context, and a field entitled "Line," which specifies that the recognition analysis process treat the electronic ink data as a single line. This class also may include a field entitled "None," which specifies that the recognition analysis process apply no recognition modes, and a field entitled "Segment," which specifies that the recognition analysis process treat the electronic ink data as forming a single word or character. Still further this class may include a field entitled "TopInkBreaksOnly," which disables multiple segmentation.

Still further, the Ink Analysis API may include a Context Link class, which defines how two context nodes may be linked together. The ContextLink object by itself represents which two context nodes are linked, the direction of the link, and the type of link. This class may include a property entitled "ContextNode SourceNode{get;}," which specifies the source context node that is being linked from another context node, a property entitled "ContextLinkType LinkType{get;}," which specifies the type of link relationship that exists between the source and destination context nodes, and a property entitled "CustomLinkType{get;}," which specifies that a custom link is being used. This situation would occur when an application decides to use the linking system of the Ink Analyzer API to represent application specific links beyond what the API can recognize.

This class may also include a property entitled "ContextNode DestinationNode {get;}," which specifies the destination context node that is being linked from another context node. There may be two constructors available to this class, which create a relationship between existing source and destination context nodes.

This class may also include an enumeration entitled "ContextLinkType enum," which defines the type of relationship shared by two context nodes. These various link types may include, for example, an "AnchorsTo" type, which describes that one node is anchored to the other node. Both nodes can use the SourceNode or DestinationNode property based on the parsing situation. The link types may also include the type "Contains," which describes that the one node contains the other node. With this relationship, the container node could be referenced as the SourceNode, while the containee node could be referenced as the DestinationNode. The link types may further include a "PointsTo" type, which describes that one node is pointing to another node. For this relationship, the node doing the pointing could be referenced as the SourceNode, while the node being pointed to could be referenced as the DestinationNode. Still further, the link types may have a "PointsFrom" type, which describes that one node is pointing from the other node. In this relationship, the node pointing away from the other node could be referenced as the SourceNode, while the node being pointed from could be referenced as the DestinationNode.

The link types may additionally include a "SpansHorizontally" type, which describes that one node runs the length horizontally of another node, and a "SpansVertically" type, which describes that one node runs the length vertically of another node. For these types, the node covering (strike out, underline, margin bar) the other node, usually written last, could be referenced as the SourceNode, while the node being spanned could be referenced as the DestinationNode. The link types may also include a "Custom" type, which describes that a custom link type has been used. When this value is used, the "CustomLinkType" property on the ContextLink object could provide more details as to the purpose of this link.

Accordingly, the Ink Analyzer API provides a variety of functions and services for asynchronously analyzing electronic ink in a document, and then subsequently reconciling the results of the analysis process with the current state of the document as described in detail above. Further, it should be appreciated that the various classes described above can be applied to a variety of operating systems and environments, such as the Microsoft Windows operating environment, the Microsoft COM operating environment, a Unix or Linux operating environment, or any other suitable computer operating environment. Moreover, it should be appreciated that an application programming interface according to various implementations of the invention may omit one or more of the class components described above, or may include additional components to provide a desired service or functionality.

Reconciliation

As discussed in detail above, various examples of the invention allow the software application 1701 to continue to operate while unanalyzed electronic ink in the document 1703 is analyzed by a background analysis process. Because of this, the software application 1701 may modify the document 1703 in a number of ways that will conflict with the results of analysis process. For example, the software application 1701 may enter new electronic ink data 1705 into the document 1703, or delete existing electronic ink data 1705 from the document 1703. Still further, the software application 1701 may edit existing electronic ink data 1705, such as by moving the position of existing electronic ink data 1705 or changing the properties of existing electronic ink data 1705. Still further, the software application 1701 may add, delete, or modify non-ink document elements 1707 in ways that impact existing electronic ink data 1705. For example, the software application 1701 may delete typewritten text that has been annotated with electronic ink data 1705.

The software application 1701 may additionally "pin" existing electronic ink data 1705, so as to prohibit its modification by the analysis process. For example, if a user manually specifies a layout or classification for a group of ink strokes, then the software application 1701 may designate that those ink strokes remain in that specific layout or with that classification regardless of the results produced by a parsing process. Referring to FIG. 11B, a user may designate that a group of strokes remain in the margin by pinning the node "Margin Comment". Similarly, a user may specify a particular recognition result for a group of ink strokes, regardless of the results produced by a recognition process.

Various types of pinning may be employed according to different implementations of the invention. For example, the ink analysis tool 1901 may allow the software application 1701 to "hard" pin ink. With this arrangement, no ink strokes can be added to any of the leaf nodes below the pinned node (thus assuming the node Margin Comment in FIG. 11B is pinned, no strokes can be added to the nodes for strokes 1-*n*), no strokes can be removed from any of the leaf nodes below the pinned node, no adding or removing of child nodes are permitted, and no re-parenting of any nodes below the pinned node are permitted. Alternately or additionally, the ink analysis tool 1901 may permit "hard" pinning with late strokes, which allows for late strokes to be added in under specified conditions, prohibits strokes from being removed from any of the leaf nodes below the pinned node, prohibits the addition or removal of child nodes, and prohibits re-parenting of any nodes below the pinned node. Still further, the ink analysis tool 1901 may allow the software application 1701 to alternately or additionally "soft" pin ink. With this arrangement, no strokes can be removed from any of the leaf nodes below the pinned node, there are specified rules to allow for adding of strokes (this allows for late strokes to be added in), and regrouping, adding, and removing of child nodes are allowed. It should be noted that pinning can be removed, and, once pinning has been removed, the formerly pinned nodes and their children may then be considered "dirty" or in need of a reanalysis.

Still further, the ink process according to various examples of the invention may employ multiple analysis processes, as discussed in detail above. Accordingly, the results of an earlier analysis process may modify electronic ink data 1705 while a second, subsequent analysis process is executing. Accordingly, the results of an analysis process must be reconciled with the current state of the document 1703, so that only those results that are valid for the current state of the document 1703 are applied to its analysis context object 1709. That is, the current analysis context object 1709 (and, in some cases, the results of the analysis process) is modified so as to omit discrepancies or "collisions" between the results of the analysis process and the current state of the document 1703.

It should be noted that, in order for the results of the reconciliation process to be valid, the state of the document 1703 should not change during the reconciliation process. The reconciliation process may thus be performed using the primary thread on which the software application 1701 is run, and executing the reconciliation process may temporarily halt the operation of the software application 1701. Alternately, other techniques, such as data structure locking, may be employed to ensure that the state of the document 1703 does not change during the reconciliation process. Accordingly, it is desirable to perform the reconciliation process as quickly as possible, in order to prevent a user from becoming dissatisfied with the performance of the software application 1701. Another consideration for the reconciliation process is its effect on the performance of the analysis process run on the separate background analysis thread. If discrepancies between the current analysis context object 1709 (that is, the analysis context object 1709 reflecting the current state of the document 1703) and the analysis results are too broadly defined, then large amounts of electronic ink will be reanalyzed unnecessarily. Of course, still other ways of protecting the integrity of the document during reconciliation may be used without departing from the invention.

With various examples of the invention, the analysis process and the reconciliation process may adhere to one or more of the following conventions in order improve the efficiency and convenience of the reconciliation process. First, the analysis process may reuse nodes for document element in the document independent analysis context object 1903 as much as possible. That is, collisions should not be avoided by creating new, unrelated nodes for document elements. In addition, the reconciliation process should respect "pinning" designated by the software application 1701. While that analysis process will typically comply with pinning designations by software application 1701, the software application 1701 may pin electronic ink data 1705 while the analysis process is being executed. Further, the reconciliation process should ensure that no empty nodes remain in the current analysis context object 1709 after the reconciliation process is completed. It should be noted, however, that one or more of these conventions may be omitted and not followed according to alternate implementations of the invention. For example, some implementations of the invention may allow the analysis object 1709 to contain empty nodes.

In addition to these conventions, the reconciliation process must typically comply with interface rules dictated by the analysis context object 1709. For example, with some implementations of the invention, the analysis context object 1709 may not allow a node for a document element to be deleted unless it has no child nodes.

As previously noted, a collision occurs when the analysis process makes a change to the document independent analysis context object 1903 that conflicts in some fashion with a change to the analysis context object 1709 that was made after the analysis process was initiated. Collisions can be divided into two types: mandatory collisions and discretionary collisions.

Mandatory collisions occur when it is impossible to apply a change made to the document independent analysis context object 1903 by the analysis process to the analysis context object 1709 for the current state of the document 1703. A mandatory collision will occur when, for example, the software application 1701 has "pinned" or fixed a node in the analysis context object 1709 and the analysis process has changed the corresponding node in the document independent analysis context object 1903. A mandatory collision will also occur when the analysis process has made any type of change to a node in the document independent analysis context object 1903 but the software application 1701 has deleted the corresponding node from the analysis context object 1709, and when the software application 1701 has added strokes or child nodes to a node in the analysis context object 1709 when the analysis process has deleted the corresponding node in the document independent analysis context object 1903. Further, a mandatory collision will occur when the software application 1701 has deleted a node in the analysis context object 1709 when the analysis process has reordered or created a link to the corresponding node in the document independent analysis context object 1903.

A discretionary collision occurs when the software application 1701 has changed a value in the analysis context object 1709 that is related to a value changed in the document independent analysis context object 1903 by the analysis process, but the pinning constraints, the element reuse constraints, and the inherent constraints of the interface for the analysis context object 1709 could still allow the application of the change made by the analysis process to the analysis context object 1709. A discretionary collision may still be applied as a change to the analysis context object 1709 or avoided. Further, the reconciliation process may simply ignore some types of discretionary collisions altogether.

One graphic example of a discretionary collision occurs when an original node in both the analysis context object 1709 and the document independent analysis context object 1903 has child nodes A and B for ink strokes A and B. The software application 1701 may then add a third child C node for the ink stroke C in the analysis context object 1709, while the analysis process adds a third child node D for an ink stroke D to the document independent analysis context object 1903.

With various embodiments of the invention, the reconciliation process may add the child node D to the parent node in the analysis context object 1709 based upon the analysis results. While this change to the parent node in the analysis context object 1709 is not prohibited, however, it still changes the characteristics of the parent node in a manner that may be undesired by the software application 1701. For example, the ink associated with the parent node may subsequently be considered analyzed, and may not be reanalyzed to take into account the effect of the ink C to the group of ink strokes. Further, the recognition results for the parent node might now be referring to the wrong child nodes or strokes, and that might never again be corrected as well.

Accordingly, various examples of the invention will not apply changes for a discretionary collision when updating the analysis context object 1709 based upon the results of an analysis process. While this criteria may require additional processing to identify and block changes based upon discretionary collisions, this criteria is relatively easy to implement and simple to maintain. Of course, still other examples of the invention may implement changes corresponding to discretionary collisions according to other criteria. More particularly, these alternate examples may implement changes from discretionary collisions that do not create permanent logically inconsistent relationships in the analysis context object 1709.

It should also be noted that collisions may have a transitive effect, in that one collision may create another. For example, an analysis process may create a node L for a line and then create a node W for a word as a child node of node L. If the creation of the node L was not applied to the analysis context object 1709 due to a collision of any kind, then the creation of the node W will be a mandatory collision.

Various examples of the invention may employ a log-based approach to reconcile the results of an analysis process with the current state of a document 1703. In this log-based approach, the document independent analysis context object 1903 includes a log of changes to the document independent analysis context object 1903 made by the analysis process. The log may be in the form of, for example, a list of change records. Each change record may then include the type of change that was made (by identifying, e.g., the method that was called to change the document independent analysis context object 1903), the document element upon which the change was made (by identifying, e.g., the node in the document independent analysis context object 1903 on which the method was called), and any information needed to recreate the arguments for the method call. Advantageously, because the document independent analysis context object 1903 is implemented by the ink analysis tool 1901 and the analysis processes, the change log may be invisible to the software application 1701 (although the log alternately may be exposed to the application 1701, if desired).

Figure 27:
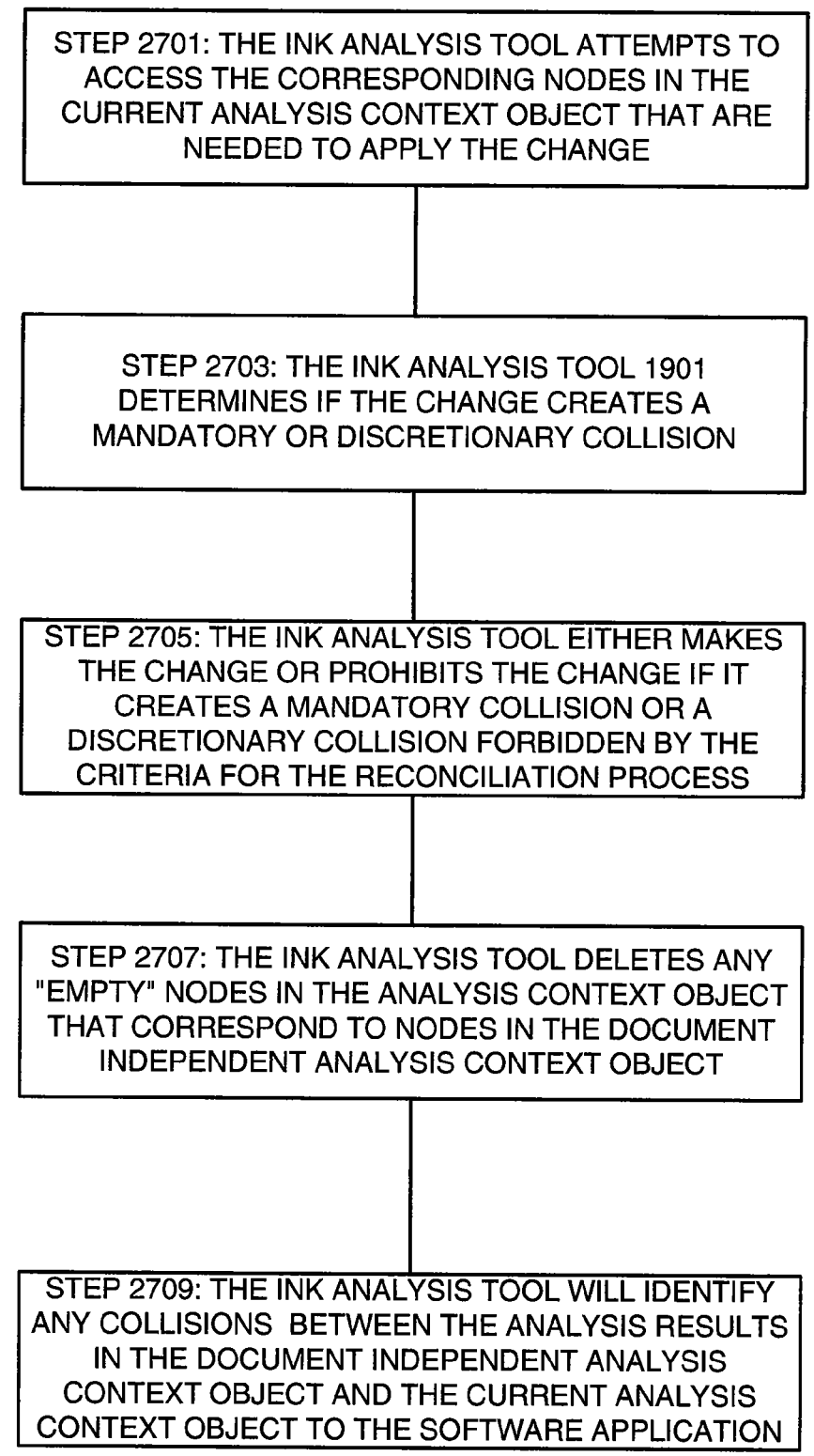
FIG. 27 illustrates a flowchart showing a method of reconciling analysis results with a current state of a document.

In order to execute the reconciliation process using the change log approach, the ink analysis tool 1901 examines each change record in the chronological order of the changes. That is, the ink analysis tool 1901 identifies each change made to the document independent analysis context object 1903. For each change, the ink analysis tool 1901 may implement the process illustrated in FIG. 27. First, in step 2701, the ink analysis tool 1901 attempts to access the corresponding nodes in the current analysis context object 1709 that are needed to apply the change. It should be noted that this retrieval step may fail if the software application 1701 has deleted one of more of the necessary nodes from the analysis context object 1709, resulting in a mandatory collision.

Next, in step 2703, the ink analysis tool 1901 determines if the change creates a mandatory or discretionary collision. The procedure for making this determination will be explained in more detail below. In step 2705, the ink analysis tool 1901 either makes the change or prohibits the change if it creates a mandatory collision or a discretionary collision forbidden by the criteria for the reconciliation process. For example, if the change creates a mandatory collision or a discretionary collision forbidden by the criteria for the reconciliation process, then the ink analysis tool 1901 may block changes to the nodes in the analysis context object 1709 representing the corresponding region of the document 1703 in which the change was to be made. If, on the other hand the change is applied, then the ink analysis tool 1901 may call the appropriate method to make the desired change to the necessary nodes in the analysis context object 1709.

If the analysis process adds a new element node to the analysis context object 1709 but then fails to move stroke nodes to the new node, then the analysis process also will not have tried to delete the element node on the assumption that stroke nodes were moved to the new nodes successfully. Thus, there will be an element node in the document independent analysis context object 1903 that corresponds to an empty node in the current analysis context object 1709. Accordingly, once all of the changes to the analysis context object 1709 have been processed, in step 2707 the ink analysis tool 1901 reviews the document independent analysis context object 1903 to delete any "empty" nodes in the analysis context object 1709 that correspond to nodes in the document independent analysis context object 1903. This empty node deletion step is optional and may be omitted without departing from the invention.

It should be noted that the document independent analysis context object 1903 should not contain any empty nodes, and the reconciliation process should prohibit empty nodes from being created in the document independent analysis context object 1903. It should also be noted that this step will not attempt to delete the root node of the analysis context object 1709, even if it is empty, as an exception. Lastly, in step 2709, the ink analysis tool 1901 will identify any collisions between the analysis results in the document independent analysis context object 1903 and the current analysis context object 1709 to the software application 1701, so that the software application 1701 can include the regions of the document 1703 affected by the collisions in a subsequent analysis process.

Returning now to the detection of collisions in step 2703 above, once all of the nodes in the analysis context object 1709 corresponding to changes in the document independent analysis context object 1903 are accessed, all other possible mandatory collisions for each node in the analysis context object 1709 can be detected statically (or, alternately, the absence of a mandatory collision may be detected for each node). More particularly, mandatory collisions can be detected based upon the rules designated by the interface for the analysis context object 1709.

Discretionary collisions, however, typically cannot be identified without additional state information regarding the document 1703, as these changes are not mandated by the interface of the analysis context object 1709 but instead are based upon discretionary choices about favoring changes made by the software application 1701 over the changes made by the analysis process when both have impacted the same node in the analysis context object 1709. These collisions can instead be detected by comparing the current analysis context object 1709 with the original version of the document independent analysis context object 1903, to determine which nodes in the analysis context object 1709 have been changed by the software application 1701.

For example, the reconciliation criteria may define that the addition or deletion of a child stroke node from a parent node by the software application 1701 is a discretionary collision for that parent node. To determine whether such a change has occurred, the ink analysis tool 1901 can review the child stroke nodes depending from the node in the current analysis context object 1709, and compare their number and Guids (or other unique identifier) to the child stroke nodes depending from the corresponding node in the original version of the document independent analysis context object 1903. If the child stroke nodes match in these aspects (and any other desired aspects), then the ink analysis tool 1901 can apply the changes made by the analysis process to the parent node in the analysis context object 1709.

Continuing this example, the next change in the log entry may consist of another stroke node being moved to depend from the parent node in the document independent analysis context object 1903. If there are no mandatory collisions from this change, then the ink analysis tool 1901 is allowed to make the corresponding change to the analysis context object 1709. When the ink analysis tool 1901 checks the original version of the document independent analysis context object 1903 to determine if a discretionary collision exists, however, it will conclude that the parent node in the current analysis context object 1709 has one more dependent stroke node than the parent node in the original version of the document independent analysis context object 1903, so it will erroneously determine that a discretionary collision exists (that is, it will determine that a collision exists based upon changes that it has made).

Accordingly, the log-based reconciliation process should exclude prior changes made by the reconciliation from the comparison between the analysis context object 1709 current and the original version of the document independent analysis context object 1903. With various examples of the invention, this exclusion can be made by comparing all nodes in the current analysis context object 1709 with their corresponding nodes in the original version of the document independent analysis context object 1903, before examining any change list entries, and keeping a list of the nodes that collided.

Alternately or additionally, various examples of the invention may maintain a cache of the elements in the current analysis context object 1709 corresponding to elements in the document independent analysis context object with the analysis results that is used whenever the corresponding elements are retrieved. There is no preliminary pass, but the cache is populated the first time a corresponding element has been determined to be free of discretionary collisions. Optionally, the cache can also keep track of which elements in results had discretionary collisions. This approach has better performance than the discretionary-collision-finding-pass approach when the change log is short, but may have worse performance if the document independent analysis context object 1903 with the analysis results contains many nodes. It is also no more complex than the other approach.

It should be noted that the parent context nodes of elements in the cache should also be cached. More particularly, a change to a child context node will be considered a change to the properties of its parent context node. Thus, the parent context node of a context node stored in the cache also needs to be evaluated for changes made by the software application 1701 at this point. The caching of parent nodes for each context node in the cache needs to be repeated up the tree (e.g., from parent node to grandparent node to great-grandparent node) until the root node is passed or until changes are detected. In many situations, however, this repetition is only a few nodes as a tree typically will not become very deep.

It also should be noted that, with various examples of the invention, the original version of the document independent analysis context object 1903 is only used for detecting discretionary collisions. If the detection of discretionary collisions is unnecessary with an example of the invention, then both the original version of the document independent analysis context object 1903 and the corresponding elements cache could be eliminated. This "log-based" approach may be easier to maintain than the "comparison-based" approach described below, as it requires less searching to determine what changes were made by the analysis process, and operations on the document independent analysis context object 1903 (such as "delete node," or "create node") are handled separately, so adding a new type of operation does not tend to affect the other operations.

Instead of the "log-based" technique for reconciling the analysis results with the current state of the document 1703, various examples of the invention may employ a "comparison-based" approach for reconciliation. The main distinguishing feature of the comparison-based approach is that no log is kept of the changes made to the document independent analysis context object 1903, so this technique does not collect information about what the analysis process did other than by comparing the document independent analysis context object 1903 containing the analysis results with the original version of the document independent analysis context object 1903. Therefore, with this approach, the original version of the document independent analysis context object 1903 is always required, irrespective of any judgments about discretionary collisions.

Using this approach, the ink analysis tool 1901 first builds a stroke map. That is, for every ink leaf node in the original version of the document independent analysis context object 1903, if there is a corresponding node in the current analysis context object 1709, then the leaf node is added to a hash table (or other suitable data structure). Thus, the hash table maps stroke GUIDs (or other unique node identifiers) in the original version of the document independent analysis context object 1903 to leaf node references in the current analysis context object 1709.

Next, the ink analysis tool 1901 identifies all nodes that the software application 1701 has changed in the analysis context object 1709. This may be done using the techniques for determining discretionary collisions described in detail above. For each node in the original version of the document independent analysis context object 1903, if there is a corresponding node in the current analysis context object 1709 and it differs from the node in the original version of the document independent analysis context object 1903 in some significant way, then the ink analysis tool 1901 determines that this node has been changed by the application and is a potential collision. References to such nodes are saved in a first list corresponding to analysis results nodes that should not be added to the analysis context object 1709 (hereafter referred to as the resultsNodesNotToAdd list) and a second list of nodes that create discretionary collisions.

For each node in the original version of the document independent analysis context object 1903, the ink analysis tool 1901 looks up the corresponding nodes in both the document independent analysis context object 1903 with the analysis results and the current analysis context object 1709. For each node in the analysis context object 1709, the ink analysis tool 1901 determines if the software application 1701 deleted the node. Such nodes exist in the original version of the document independent analysis context object 1903, but have no corresponding node in the analysis context object 1709. The corresponding node in the document independent analysis context object 1903 with the analysis results is added to the resultsNodesNotToAdd list if it exists.

Next, the ink analysis tool 1901 determines if the analysis process deleted the node from the document independent analysis context object 1903. This is detected when there is a corresponding node in the analysis context object 1709 current and it has not changed, but there is not a corresponding node in the document independent analysis context object 1903 with the analysis results. Nodes deleted by the analysis process may be saved in a list of deleted nodes. Such a node is not added to the analysis context object 1709 current, but it does not go in the resultsNodesNotToAdd list because there is no corresponding node in the document independent analysis context object 1903 with the analysis results.

If the software application 1701 has neither deleted nor changed the node, and the analysis process did not delete the node, then the ink analysis tool 1901 may determine if the analysis process has changed the node. The same techniques that were described above for use in detecting changes made by the software application 1701 can be used to detect changes made by the analysis process. Nodes that have been changed by the analysis process are added to the resultsNodesNotToAdd list, and the changes are propagated by calling appropriate methods on the nodes in the analysis context object 1709. If neither the software application 1701 nor the analysis process changed or deleted a node, then nothing has happened to that node, and the ink analysis tool 1901 add the node to the resultsNodesNotToAdd list, as the node exists in the document independent analysis context object 1903 with the analysis results and is not to be added to the analysis context object 1709.

Next, for each node in the document independent analysis context object 1903 with the analysis results, if the node is not in the resultsNodesNotToAdd list, then the ink analysis tool 1901 may propagate any changes to the node by the analysis process by creating a corresponding node in the analysis context object 1709. The traversal of the nodes in the analysis results may be performed using a top-down, pre-order traversal, so that parent nodes are guaranteed to be created before child nodes.

When creating a new leaf node in the analysis context object 1709, whatever ink strokes associated with the node that are contained in the analysis results may also be moved to the new node from other nodes in the analysis context object 1709. The stroke map discussed above may then be used to identify the source elements for moving the strokes. Ink strokes are not moved if the source element does not exist (creating a mandatory collision) or if the source element is contained in the discretionary collision list also noted above. To save unnecessary calls to the analysis context object 1709, this ink analysis tool 1901 may avoid calling the method to create a child context node if there is not at least one non-colliding stroke source node. The same stroke source checking is also performed on non-ink leaf nodes, so that a node for a line is not created unless at least one of the line's constituent words is going to contain at least one successfully moved stroke, for instance.

Other information then is also applied to the newly created node, such as a recognition lattice. The recognition lattice is still applied even if certain strokes could not be moved, creating an applied (that is, non-blocked) discretionary collision that results in a temporary logical inconsistency. However, since the failed stroke moves are reflected in the designation of the portion of the analysis context object 1709 corresponding to a region of the document for which changes are blocked, the inconsistency is temporary, as the software application 1701 is advised to re-analyze the blocked region.

For each node to be deleted from the analysis context object 1709, the ink analysis tool 1901 list checks to see if the node can actually be deleted now that all other edits and additions to the analysis context object 1709 have been performed. Nodes that are to be deleted and that are actually empty of all child nodes and strokes are deleted from the analysis context object 1709. Once such a node is deleted, all ancestor nodes (up to but not including the root node) are deleted in succession until an ancestor with other remaining children is encountered.

Finally, the ink analysis tool 1901 makes a global comparison of node ordering between the document independent analysis context object 1903 with the analysis results and the analysis context object 1709, so as to detect and propagate the changes to the analysis context object 1709 by the analysis process. It should be noted, however, that this comparison ignores the original version of the document independent analysis context object 1903, so it has no way of detecting changes to the ordering made by the software application 1701. Next, for each container node in the analysis results that has a corresponding node in the analysis context object 1709, the ordering of the container nodes' children is compared. If both container nodes have exactly the same set of children, then the ordering in the analysis results is propagated to the analysis context object 1709 by looping over the container's child list in the analysis results until a node is found at the same position in the container's list in the analysis context object 1709 that does not have the same GUID (or other type of identifier) as the child node in the analysis results. When such a mismatch is found, the corresponding node must be found further down in the child list in the analysis context object 1709. The ink analysis tool 1901 then searches the rest of the child list in the analysis context object 1709 for the node, and calls method to move the child node to correct the order for that node in the analysis context object 1709. The ink analysis tool 1901 then continues looping over nodes in the analysis results.

Of course, the assumption of identical lists does not hold true, since either the analysis list or the software application 1701 could have deleted or inserted nodes in either list. A "child list mapper" object is used to simulate the assumption holding true, by presenting "pruned" lists that only contain elements that are held in common. The procedure described above is then run on the mapped child lists, and the moves are translated to the real indexes and calls by the list mapper object.

Thus, the reconciliation techniques according to various examples of the invention described above allow the results of an analysis process to be applied to the current document elements in a document, even if the contents of the document have changed since the analysis process was initiated. These reconciliation techniques therefore allow electronic ink in a document to be analyzed asynchronously from the operation of the software application hosting the document. Further, these reconciliation techniques may advantageously be employed by a variety of different software applications, including existing multithreaded software applications with existing, proprietary locking or other synchronization strategies.

Event Driven System

As discussed above, various examples of the invention create a "snapshot" of the state of a document by copying a document independent analysis context object, and then asynchronously analyze the document independent analysis context object while the software application hosting the document continues to operation. Alternately, various examples of the invention may forego the use of the document independent analysis context object for asynchronous ink analysis. Instead, these examples of the invention may use a sealed component to store all ink and semantic data for a document. More particularly, these examples of the invention recognizes two types of modifications that can be made to a document: ink events, such as adding, deleting, or modifying strokes; and structure events, such as grouping strokes into words, adding semantic nodes, or associating text recognition results to strokes. Every event contains all data necessary to completely describe the event to an external listener. For example an "add stroke" event will include all of the stroke data. With these "rich" events, a listener can maintain an exact duplicate of an ink object by applying events in the order they were received.

Figure 28:
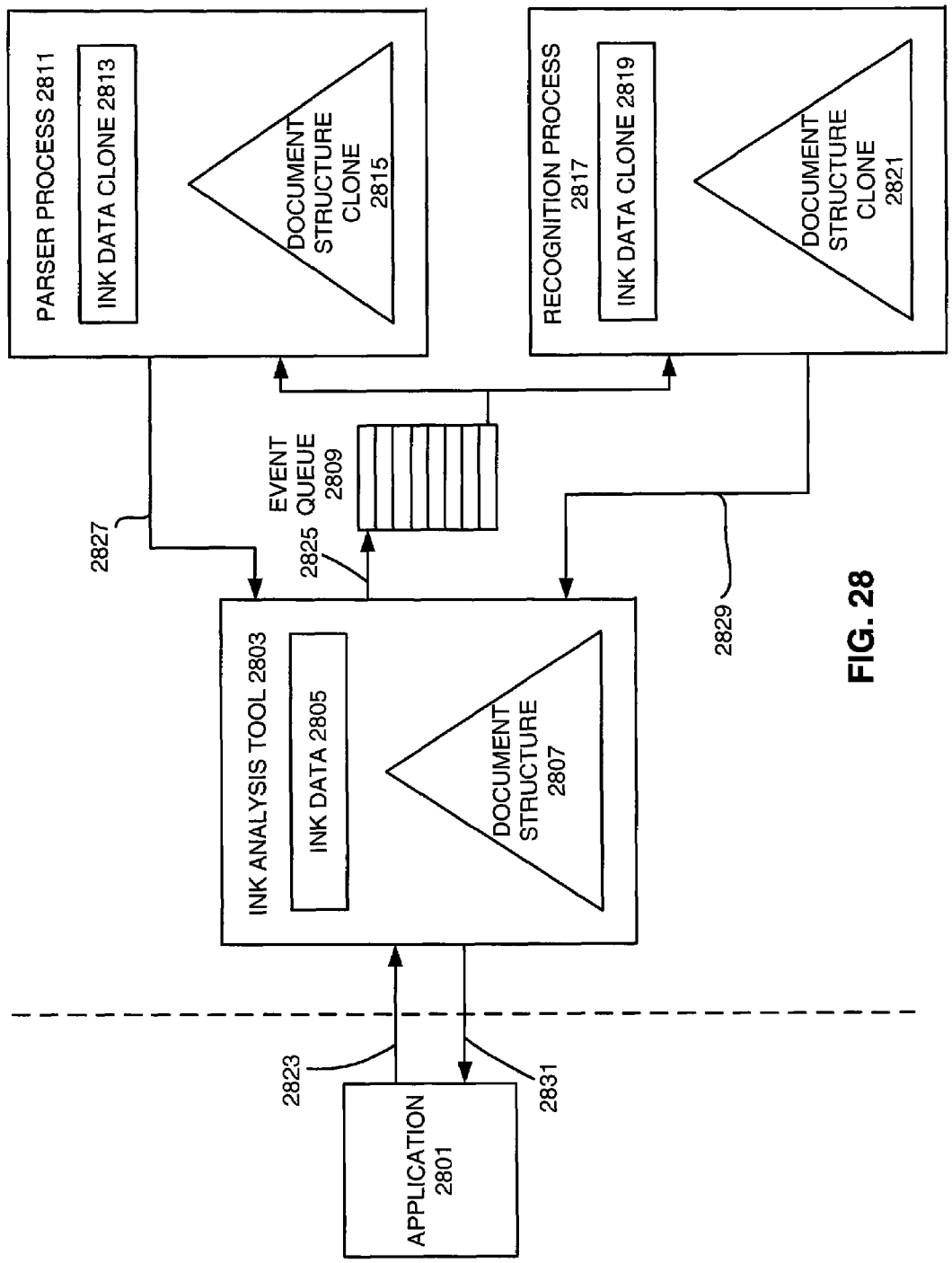
FIG. 28 illustrates an arrangement for asynchronously analyzing electronic ink according to still other examples of the invention.

FIG. 28 illustrates one example of how this arrangement may be employed, according to various examples of the invention. As seen in this figure, an application 2801 employs an ink analysis tool 2803. The ink analysis tool 2803 maintains ink data 2805 and a document structure 2807 (e.g., such as a tree structure) for the application 2801. The application also employs an event queue 2809, a parser process 2811 and a recognition process 2817. The parser process 2811 maintains a clone 2813 of the ink data 2805 and a clone 2815 of the document structure 2807. Similarly, the recognition process 2817 maintains a clone 2819 of the ink data 2805 and a clone 2821 of the document structure 2807.

When the application generates ink data, it provides the ink data to the ink analysis tool 2803 via a method 2823. In response, the ink analysis tool 2803 generates an event corresponding to a change in the ink data, adds a tag to every event, and defines the desired analysis process or processes as components that listen to the events with specified tags. For example, all user changes to ink may be marked with the tag "UserChange," and an event 2825 with this tag is sent to the event queue 2809 synchronously in response to the change. At some point in the future, the parser process 2811 and the recognition process 2817 will retrieve the tagged event from the event queue 2809.

A first analysis process (e.g., the parsing process 2811) would then listen to all events issued by the ink analysis tool 2803, and respond to those with the tag UserChange. The first analysis process would then apply the changes specified by the event to its internal copy of the ink data 2813 and the document structure 2815, analyze the data described in the event, and then create and tag events 2827 generated by its changes with the tag "Parser1Change." These events 2827 would be relayed by the ink analysis tool 2803 back to the event queue 2809. A second analysis process (e.g., the handwriting recognition process 2817) would then listen to events tagged with Parser1Change tag. In response, it would apply the changes specified by the event to its internal copy of the ink data 2819 and the document structure 2821, and analyze the data described in the events in response. The second analyzer would then create and tag an event 2829 with its analysis results with the tag "HandwritingRecognitionChange." As the ink analysis tool 2803 receives events from the parser process 2811 and the recognition process 2817, it sends events 2831 to the application 2801 to indicate a change in the document structure 2807.

These embodiments of the invention could also support each analysis process by listening to events with more than one event, and to tag the events from its changes with different tags based on internal processing. Accordingly, these alternate implementations of the invention may also allow for analysis of electronic ink in a document that is asynchronous from the operation of the software application hosting the document.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A computer-implemented method of reconciling a first data structure with a second data structure, each data structure initially comprising a plurality of corresponding nodes, the method comprising:
subsequent to an analysis that modifies the second data structure, creating a list of nodes that includes each of the following:
each node of the second data structure that has been changed by the analysis and for which a corresponding node in the first data structure was fixed;
each node of the second data structure that has been changed by the analysis and for which a corresponding node in the first data structure was deleted;
each node of the second data structure which was reordered by the analysis and for which a corresponding node in the first data structure was deleted;
each node of the second data structure which was linked to by the analysis and for which a corresponding node in the first data structure was deleted;
each node of the second data structure which was linked to another node by the analysis and for which a corresponding node in the first data structure was fixed;
each node of the second data structure which was linked to another node by the analysis and for which a corresponding node in the first data structure was deleted; and
each node of the second data structure which was deleted by the analysis and for which a corresponding node in the first data structure had a child node added;
accessing each node in the first data structure;
determining whether a change has been made to the node in the second data structure which corresponds to the each node in the first data structure;
determining whether the node is present in the created list of nodes; and
for each node in the second data structure that has been changed by the analysis and which is not in the created list, applying the change to a corresponding node in the first data structure;
wherein the method further comprises:
storing an identifier in a stroke map for each leaf node that existed in the second data structure prior to analysis for which there is a corresponding leaf node in the first data structure;
upon adding the node to the first data structure, accessing the stroke map to locate each leaf node that corresponds to the added node; and
adding each leaf node under the added node.

2. The method recited in claim 1 wherein the leaf nodes are located using the identifier.

* * * * *